(12) United States Patent
Liu et al.

(10) Patent No.: US 10,874,991 B2
(45) Date of Patent: Dec. 29, 2020

(54) FUNCTIONAL FILTERS FOR HYDROPHOBIC LIQUID/HYDROPHILIC LIQUID SEPARATIONS

(71) Applicant: Queen's University at Kingston, Kingston (CA)

(72) Inventors: Guojun Liu, Kingston (CA); Yu Wang, Kingston (CA); Zijie Wang, Kingston (CA); Shuaishuai Huang, Kingston (CA)

(73) Assignee: Queen's University at Kingston, Kingston (CA)

( * ) Notice: Subject to any disclaimer, the term of this patent is extended or adjusted under 35 U.S.C. 154(b) by 35 days.

(21) Appl. No.: 15/779,309

(22) PCT Filed: Nov. 28, 2016

(86) PCT No.: PCT/CA2016/051400
§ 371 (c)(1),
(2) Date: May 25, 2018

(87) PCT Pub. No.: WO2017/088070
PCT Pub. Date: Jun. 1, 2017

(65) Prior Publication Data
US 2018/0333683 A1   Nov. 22, 2018

Related U.S. Application Data

(60) Provisional application No. 62/405,014, filed on Oct. 6, 2016, provisional application No. 62/260,397, filed on Nov. 27, 2015.

(51) Int. Cl.
*B01D 69/12* (2006.01)
*B01D 39/00* (2006.01)
(Continued)

(52) U.S. Cl.
CPC ............. *B01D 69/12* (2013.01); *B01D 39/00* (2013.01); *B01D 71/40* (2013.01); *B01D 71/70* (2013.01);
(Continued)

(58) Field of Classification Search
CPC ........ B01D 39/00; B01D 69/12; B01D 71/70; B01D 71/40; B01D 2325/38;
(Continued)

(56) References Cited

FOREIGN PATENT DOCUMENTS

| CA | 2850442 A1 | 4/2013 |
| EP | 2905374 A2 | 8/2015 |

OTHER PUBLICATIONS

International Search Report and Written Opinion for corresponding International Patent Application No. PCT/CA2016/051400.
(Continued)

*Primary Examiner* — Vishal V Vasisth
(74) *Attorney, Agent, or Firm* — Angela Lyon

(57) ABSTRACT

A composite material is described that is an effective filter to separate oil from an oil and water emulsion or other mixtures of oil and water. The composite material has a permeable substrate, such as fabric, that is coated with a selectively-permeable coating. The composite material allows only oil to pass through, while water is prevented from passing through. The composite material has two main components, a hydrophobic component and an emulsion-destabilizing component.

12 Claims, 19 Drawing Sheets

(51) Int. Cl.
    *B01D 71/40*     (2006.01)
    *B01D 71/70*     (2006.01)
    *C08L 33/14*     (2006.01)
    *C08L 83/04*     (2006.01)

(52) U.S. Cl.
    CPC ...... *B01D 2257/80* (2013.01); *B01D 2323/04* (2013.01); *B01D 2325/38* (2013.01); *C08L 33/14* (2013.01); *C08L 83/04* (2013.01)

(58) Field of Classification Search
    CPC . B01D 2257/80; B01D 2323/04; C08L 83/04; C08L 33/14
    See application file for complete search history.

(56) References Cited

OTHER PUBLICATIONS

Gu, J. et al., "Janus Polymer/Carbon Nanotube Hybrid Membranes for Oil/Water Separation", ACS Applied Materials and Interfaces, vol. 6, pp. 16204-16209, (2014).

Wang, Z., et al., "In Situ Generated Janus Fabrics for the Rapid and Efficient Separation of Oil-in-Water Emulsions", Angewandte Chemie International Edition, vol. 55, Issue 47, pp. 14610-14613, (2016).

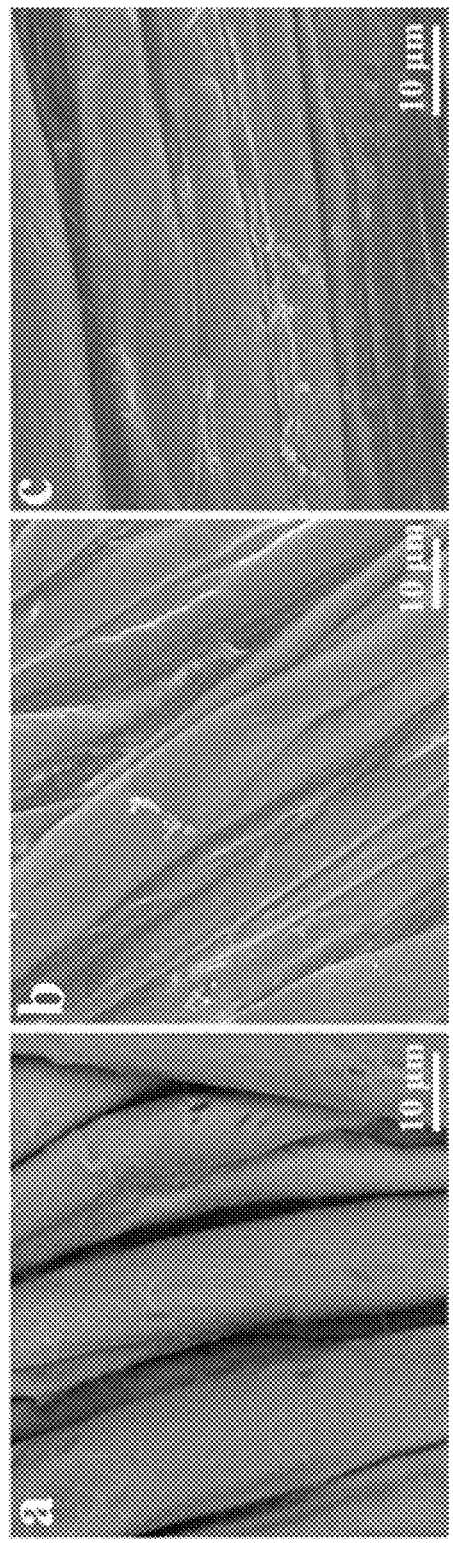

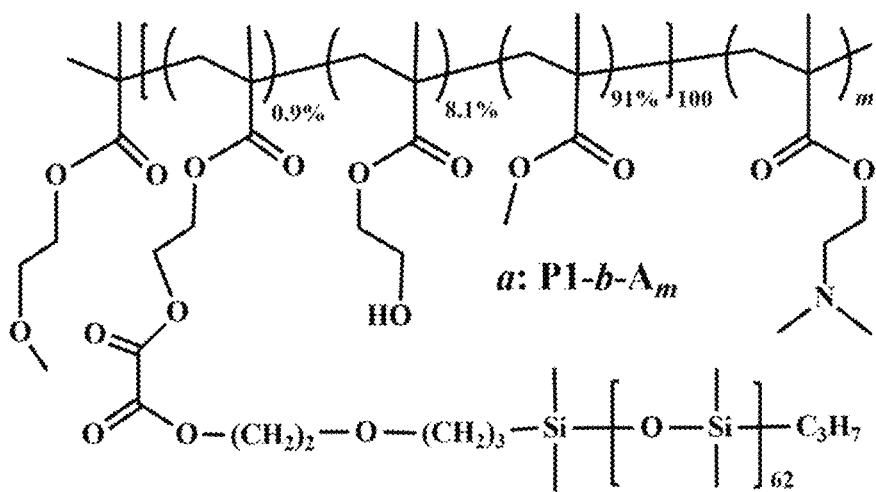
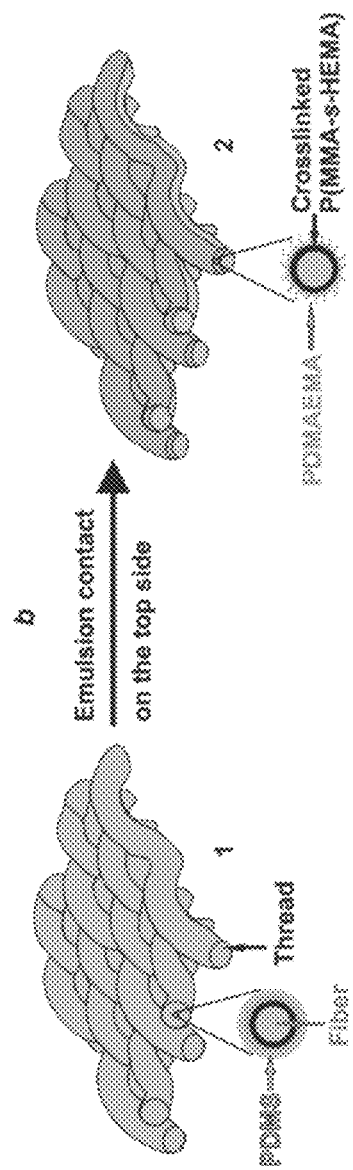
Fig. 12

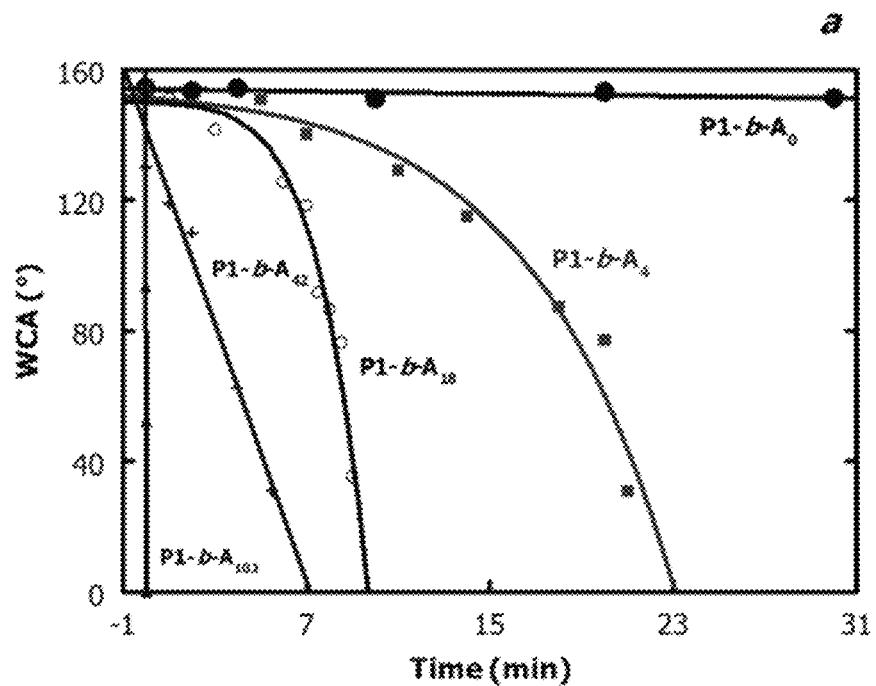
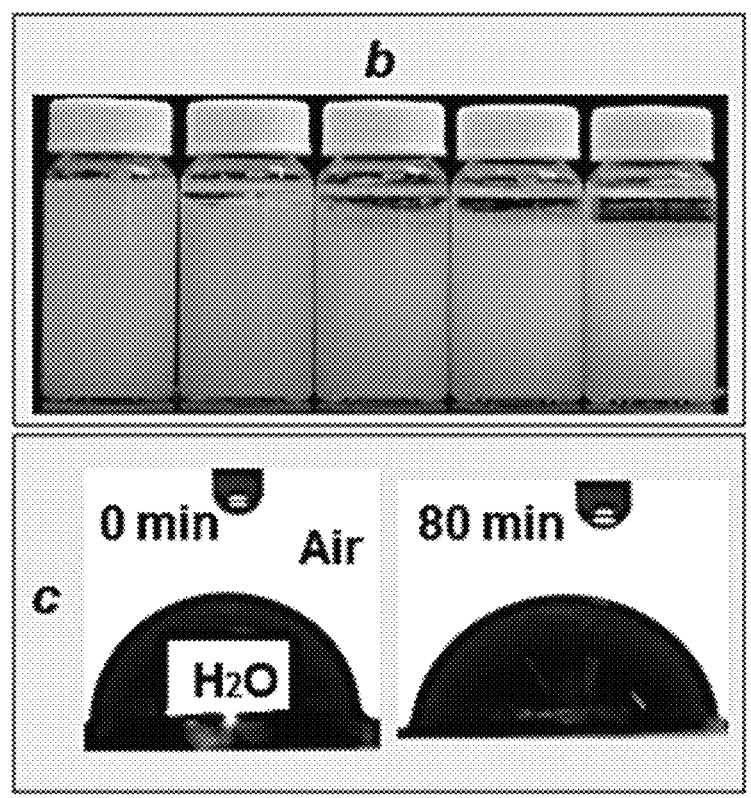
Fig. 13

FUNCTIONAL FILTERS FOR HYDROPHOBIC LIQUID/HYDROPHILIC LIQUID SEPARATIONS

This application is a 371 of PCT/CA2016/051400, filed Nov. 28, 2016 which claims benefit of 62/405,014, filed Oct. 6, 2016 and claims benefit of 62/260,397, filed Nov. 27, 2015.

FIELD OF THE INVENTION

The field of the invention is composite materials that can be used as filters. More specifically, the present invention pertains to the field of filters and filter material capable of separating hydrophobic liquids from hydrophobic liquid/hydrophilic liquid mixtures.

BACKGROUND OF THE INVENTION

Separation of oil (e.g., a hydrophobic liquid) from emulsions is industrially important. For example, during oil production, hot steam is used to extract oil from oil sands in Alberta, Canada resulting in an emulsion. To separate oil, current methods involve adding chemicals to destabilize an emulsion and then separating the coalesced oil using sedimentation or centrifugation. However, these methods are costly. Many chemical processes may require sample purification via extraction of an oily phase with water. In these cases, persistent or un-breakable emulsions may impede or inhibit industrial processes.

Further, oil (e.g., a hydrophobic liquid) can be separated from a simple oil/water (e.g., a hydrophilic liquid) mixture using a fabric or metal mesh that is superhydrophobic/oleophilic (Z. L. Chu, et al., *Angew. Chem. Int. Ed.* 2015, 54, 2328-2338; Y. Z. Zhu, et al., *NPG Asia Mater.* 2014, 6, e101; B. Wang, et al., *Chem. Soc. Rev.* 2015, 44, 336-361; T. Darmanin, F. Guittard, *J. Mater. Chem.* A 2014, 2, 16319-16359; L. Feng, et al., *Angew. Chem. Int. Ed.* 2004, 43, 2012-2014). Oil droplets that lack an adsorbed surfactant readily coalesce and said coalesced oil then fills the filter's oleophilic pores and selectively permeates them. Water is rejected because of the hydrophobicity of such an oil-impregnated filter. These separations are typically rapid because the filter pores may be orders of magnitude larger than non-aggregated oil droplets. However, it is difficult to achieve such high-flux separation of oil from an oil-in-water emulsion. Surfactant-stabilized oil droplets with diameters that are typically less than ten micrometers (M. Cheryan, N. Rajagopalan, *J. Membr. Sci.* 1998, 151, 13-28) do not readily coalesce. If a superhydrophobic filter that has pore sizes reaching hundreds of micrometers is used, individual stable oil droplets surrounded by water appear as water to the filter and are rejected by it. For separation, polymer membranes with pore sizes that are smaller than or comparable with the droplets would need to be used (M. Cheryan, N. Rajagopalan, *J. Membr. Sci.* 1998, 151, 13-28; W. B. Zhang, et al., *Adv. Mater.* 2013, 25, 2071-2076; A. K. Kota, et al., *Nat. Comm.* 2012, 3, 1025). To use metal meshes or fabrics as filters, their pore sizes would normally need to be reduced first via nanostructure growth or polymer deposition onto the mesh wires or fabric fibers (A. K. Kota, et al., *Nat. Comm.* 2012, 3, 1025; F. Zhang, et al., *Adv. Mater.* 2013, 25, 4192-4198). At small filter pore sizes, droplets easily deform, fill pores, and then permeate them. However, decreasing filter pore size also reduces an oil's permeation rate (Z. L. Chu, et al., *Angew. Chem. Int. Ed.* 2015, 54, 2328-2338; Y. Z. Zhu, et al., *NPG Asia Mater.* 2014, 6, e101; B. Wang, et al., *Chem. Soc. Rev.* 2015, 44, 336-361; T. Darmanin, F. Guittard, *J. Mater. Chem.* A 2014, 2, 16319-16359).

There exists a need for inexpensive, facile, and fast separation of oil (e.g., a hydrophobic liquid) from oil and water (e.g., a hydrophilic liquid) mixtures and/or emulsions

SUMMARY OF THE INVENTION

An aspect of the present application provides a composite material, comprising a permeable substrate, and a coating that is disposed on the substrate to form a coated substrate, wherein the coating comprises a hydrophobic component and a destabilizing component, and wherein the coated substrate is selectively-permeable for hydrophobic liquid and is impermeable to aqueous liquid. In an embodiment of this aspect, the hydrophobic component and destabilizing component of the composite material of the above aspect are discrete components relative to each other. In another embodiment of this aspect, the hydrophobic component and destabilizing component of the composite material of the above aspect are disposed on opposing surfaces of the substrate. In certain embodiments of this aspect, the hydrophobic component and destabilizing component of the composite material of the above aspect are associated with each other. In an embodiment of this aspect, the hydrophobic component and destabilizing component are disposed on the same surfaces of the substrate. In certain embodiments of this aspect, the hydrophobic component comprises at least one hydrophobic polymer. In an embodiment of this aspect, the destabilizing component comprises at least one polymer that destabilizes emulsions. In an embodiment of this aspect or of any of the above embodiments, the destabilizing component comprises polyamine; polyacid, polyelectrolyte, poly(N,N-dimethylaminoethyl methacrylate) (PDMAEMA), poly(N-[3-(dimethylamino)propyl] methacrylamide) (PDMAPMAm), a copolymer comprising amino, imino, tertiary amine, carboxyl, sulfonic acid, phosphonic acid, or charged moieties, or any combination thereof. In an embodiment of this aspect or any of the above embodiments, the hydrophobic component comprises poly(dimethyl siloxane) (PDMS), poly(diphenyl siloxane), fluorinated polymer, polystyrene, poly(alkyl styrene), poly(alkyl methacrylate), poly(alkyl acrylate), nylon, polyester, a copolymer comprising oligo(dimethyl siloxane), oligo(diphenyl siloxane), fluorinated oligomer, styrene moieties, alkyl styrene moieties, alkyl methacrylate moieties, or alkyl acrylate moieties, or any combination thereof.

In an embodiment of this aspect or of any of the above embodiments thereof, the permeable substrate comprises fabric, cotton, metal, glass, wire mesh, sintered glass, fused glass beads, fused glass fibers, porous polymer membrane, or a combination thereof. In an embodiment of this aspect, the coating comprises P(DMAEMA-r-MMA-r-HEMA)-g-PDMS, PDMAEMA-b-[P(MMA-r-HEMA)-g-PDMS], [P(MMA-r-HEMA)-g-PDMS]-b-PDMAEMA, PDMAEMA-b-[P(MMA-s-HEMA)-g-PDMS], P[DMAEMA-r-MMA-r-(PDMS-MA)], or a combination thereof. Here MMA HEMA, r, g, s, and b denotes methyl methacrylate, 2-hydroxyethyl methacrylate, random, graft, statistical, and block, respectively.

In another aspect, the present application provides a method of separating a hydrophobic liquid from an emulsion, comprising contacting a first side of the composite material of any of the described embodiments or aspects with an emulsion and collecting substantially pure hydrophobic liquid from a second side of the composite material.

In an aspect, the present application provides a method of making a filter, comprising adding a permeable substrate to a solution of polymer that is adapted to be disposed on the permeable substrate, removing the substrate from the polymer solution, and heating the substrate, wherein the polymer comprises at least one component that destabilizes emulsions and at least one component that is hydrophobic. In an embodiment of this method aspect, the polymer comprises hydroxyethyl methacrylate, hydroxyethyl acrylate, glycidyl methacrylate, glycidyl acrylate, or a combination thereof. In an embodiment of this aspect, heating of the substrate occurs at about 120 degrees Celsius to about 170 degrees Celsius. In embodiments of this aspect, a polymer of the polymer solution comprises P(DMAEMA-r-MMA-r-HEMA)-g-PDMS, PDMAEMA-b-[P(MMA-r-HEMA)-g-PDMS], [P(MMA-r-HEMA)-g-PDMS]-b-PDMAEMA, PDMAEMA-b-[P(MMA-s-HEMA)-g-PDMS], P[DMAEMA-r-MMA-r-(PDMS-MA)], PEI-g-PDMS, or a combination thereof.

In an aspect, the invention provides use of P(DMAEMA-r-MMA-r-HEMA)-g-PDMS, PDMAEMA-b-[P(MMA-r-HEMA)-g-PDMS], P(MMA-r-HEMA)-g-PDMS]-b-PDMAEMA, PDMAEMA-b-[P(MMA-s-HEMA)-g-PDMS], or P[DMAEMA-r-MMA-r-(PDMS-MA)] as a coating on a permeable substrate, wherein a coated substrate that is selectively permeable to hydrophilic liquids is obtained.

In an aspect, the present application provides P(DMAEMA-r-MMA-r-HEMA)-g-PDMS.

In another aspect, the present application provides PDMAEMA-b-[P(MMA-r-HEMA)-g-PDMS]. In another aspect, the present application provides P(MMA-r-HEMA)-g-PDMS]-b-PDMAEMA. In another aspect, there is provided PDMAEMA-b-[P(MMA-s-HEMA)-g-PDMS], or P[DMAEMA-r-MMA-r-(PDMS-MA)].

In another aspect, the present application provides composite material, comprising a permeable substrate, at least one coating that is disposed on the substrate, a hydrophobic component, and an emulsion-destabilizing component, wherein the composite material is selectively-permeable for hydrophobic liquid and is impermeable to aqueous liquid, and wherein at least one of the hydrophobic component and the emulsion-destabilizing component is disposed on the at least one coating.

In yet another aspect, the present application provides a method of making a composite material, comprising adding a permeable substrate to a polymer solution, removing the substrate from the polymer solution, and heating the substrate, wherein the polymer is adaptable to becoming disposed on the substrate, and wherein the composite material comprises at least one component that destabilizes emulsions and at least one component that is hydrophobic.

In an aspect, the present application provides a method of making a filter, comprising adding hexane to a tetrahydrofuran solution of PDMS-b-PCEA to yield a micellar coating solution, adding a permeable scaffold into the coating solution to form a coated scaffold, removing the coated scaffold from the coating solution, irradiating one face of the coated scaffold with UV light, soaking the irradiated scaffold in tetrahydrofuran to remove PDMS-b-PCEA that was not crosslinked on the un-irradiated side of the scaffold, adding the coated scaffold to a mixture comprising TMSPMA, acetic acid, and THF, optionally heating the mixture, isolating and heating the coated scaffold under reduced pressure, adding the coated scaffold to a THF solution of DMAEMA, deoxygenating the THF solution, adding a de-oxygenated solution of AIBN in THF to form a reaction mixture, optionally heating the reaction mixture, isolating the coated scaffold, heating the coated scaffold, and drying the coated scaffold under reduced pressure, wherein a filter that has a hydrophobic polymer on a first face and an emulsion-destabilizing polymer on a second face is obtained.

In an aspect of the present application, there is provided a composite material, comprising: a coating comprising a hydrophobic component and a destabilizing component, and a permeable substrate; the coating being disposed on the substrate to form a coated substrate; and the coated substrate being selectively-permeable for hydrophobic liquid and impermeable to aqueous liquid.

In another aspect, there is provided a composite material, comprising: a coating, and a permeable substrate; the coating being disposed on the permeable substrate to form a coated substrate; the coated substrate comprising a hydrophobic component and a destabilizing component, the hydrophobic component and destabilizing component rendering the coated substrate selectively permeable to hydrophobic liquid and impermeable to aqueous liquid.

In another aspect of the present application, there is provided a composite material, comprising: a coating, and a permeable substrate; the coating being disposed on the permeable substrate to form a coated substrate; the coated substrate comprising a hydrophobic component and a destabilizing component, wherein the coated substrate is selectively permeable to hydrophobic liquid and impermeable to aqueous liquid.

In embodiments of the above aspects, there is provided a composite material wherein the coated substrate further comprises a binding component. In other embodiments, any one, or combination of the coating, the permeable substrate, the hydrophobic component, or the destabilizing component comprise the binding component.

In embodiments, there is provided a composite material wherein the hydrophobic component and destabilizing component are separate and discrete relative to each other. In some embodiments, the hydrophobic component and destabilizing component are disposed on opposing surfaces of the coated substrate. In other embodiments, the hydrophobic component and destabilizing component are disposed on the same surface of the coated substrate.

In embodiments, there is provided a composite material wherein the hydrophobic component comprises a hydrophobic oligomer, a hydrophobic polymer, a hydrophobic copolymer; a cross-linked hydrophobic oligomer, a cross-linked hydrophobic polymer, a cross-linked hydrophobic copolymer; or, a combination thereof. In some embodiments, the hydrophobic component comprises: a poly(alkylacrylate); poly(isobutylene), poly(alkyl vinyl ether), poly(alkyl vinyl ester), a poly(alkylmethacrylate); a poly(dialkylsiloxane); poly(diarylsiloxane); a fluorinated polymer; a polystyrene; a poly(alkylstyrene); a poly(alkylmethacrylate); a poly(alkylacrylate); a nylon; a polyester; a copolymer comprising oligo(dialkylsiloxane), oligo(diarylsiloxane), fluorinated oligomer, styrene moieties, alkyl styrene moieties, alkyl methacrylate moieties, alkyl acrylate moieties; an oligomer of any one of the foregoing or of any combination thereof; each of which optionally forms part of a copolymer; each of which is optionally substituted, grafted, or crosslinked; or, any combination thereof. In some embodiments, the hydrophobic component comprises: a poly(alkylacrylate); poly(isobutylene), poly(alkyl vinyl ether), poly(alkyl vinyl ester), a poly(alkylmethacrylate); a poly(dialkylsiloxane); poly(diarylsiloxane); a fluorinated polymer; a polystyrene; a poly(alkylstyrene); a nylon; a polyester; a copolymer comprising an oligo(dialkylsiloxane), an oligo(diarylsiloxane), a fluorinated oligomer, styrene moieties, alkyl styrene moieties, alkyl methacrylate moieties, alkyl acrylate moieties; an oligomer of any one of the foregoing or of any combination thereof; each of which optionally forms part of a copolymer; each of which is optionally substituted, grafted, or crosslinked; or, any combination thereof. In an embodiment, the hydrophobic component comprises PDMS, PDMS-MA; or, crosslinked polymers comprising PDMS or PDMS-MA.

In embodiments, there is provided a composite material wherein the destabilizing component comprises an emulsion-destabilizing oligomer, an emulsion-destabilizing polymer, an emulsion-destabilizing copolymer; a cross-linked emulsion-destabilizing oligomer, a cross-linked emulsion-destabilizing polymer, or a cross-linked emulsion-destabilizing copolymer; or, a combination thereof. In some embodiments, the destabilizing component comprises: a grafted anionic surfactant, a grafted cationic surfactant, a grafted non-ionic surfactant, a grafted amphoteric surfactant, a grafted biosurfactant, or a surfactant-like moiety thereof; a polyglycol; polyamine; a polyimine; a polypyridine; a polyallylurea; a polyacid; a polyelectrolyte; a copolymer comprising amino, imino, tertiary amine, carboxyl, sulfonic acid, phosphonic acid, or charged moieties, or any combination thereof; an oligomer of any one of the foregoing of or any combination thereof; each of which optionally forms part of a copolymer; each of which is optionally substituted, grafted, or crosslinked; or, any combination thereof. In another embodiment, the destabilizing component comprises PDMAEMA; PDMAPMAm; or oligo(ethylene glycol) monolaurate.

In embodiments, there is provided a composite material wherein the permeable substrate is the hydrophobic component. In some embodiments, the permeable substrate comprises a hydrophobic fabric. In another embodiment, the fabric comprises nylon.

In embodiments, there is provided a composite material wherein the permeable substrate is the destabilizing component. In some embodiments, the permeable substrate comprises an emulsion-destabilizing membrane. In another embodiment, the membrane comprises a fluorinated polymer having charged side groups.

In embodiments, there is provided a composite material wherein the hydrophobic component and destabilizing component generate a hydrophobicity gradient across the coated substrate.

In other embodiments of the above aspects, there is provided a composite material wherein the coating of the coated substrate comprises the hydrophobic component and destabilizing component. In embodiments, there is provided a composite material wherein hydrophobic component and destabilizing component are associated with each other via intramolecular forces, intermolecular forces, or a combination thereof. In other embodiments, the hydrophobic component and destabilizing component are associated through covalent bonds. In yet other embodiments, the coating is disposed on all surfaces of the coated substrate.

In embodiments, there is provided a composite material wherein the hydrophobic component comprises a hydrophobic oligomer, a hydrophobic polymer, a hydrophobic copolymer; a cross-linked hydrophobic oligomer, a cross-linked hydrophobic polymer, a cross-linked hydrophobic or copolymer; or, a combination thereof. In some embodiments, the hydrophobic component comprises: a poly(alkylacrylate); poly(isobutylene), poly(alkyl vinyl ether), poly(alkyl vinyl ester), a poly(alkylmethacrylate); a poly(dialkylsiloxane); poly(diarylsiloxane); a fluorinated polymer; a polystyrene; a poly(alkylstyrene); a poly(alkylmethacrylate); a poly(alkylacrylate); a nylon; a polyester; a copolymer comprising oligo(dialkylsiloxane), oligo(diarylsiloxane), fluorinated oligomer, styrene moieties, alkyl styrene moieties, alkyl methacrylate moieties, alkyl acrylate moieties; an oligomer of any one of the foregoing or of any combination thereof; each of which optionally forms part of a copolymer; each of which is optionally substituted, grafted, or crosslinked; or, any combination thereof. In some embodiments, the hydrophobic component comprises: a poly(alkylacrylate); poly(isobutylene), poly(alkyl vinyl ether), poly(alkyl vinyl ester), a poly(alkylmethacrylate); a poly(dialkylsiloxane); poly(diarylsiloxane); a fluorinated polymer; a polystyrene; a poly(alkylstyrene); a nylon; a polyester; a copolymer comprising an oligo(dialkylsiloxane), an oligo(diarylsiloxane), a fluorinated oligomer, styrene moieties, alkyl styrene moieties, alkyl methacrylate moieties, alkyl acrylate moieties; an oligomer of any one of the foregoing or of any combination thereof; each of which optionally forms part of a copolymer; each of which is optionally substituted, grafted, or crosslinked; or, any combination thereof.

In embodiments, there is provided a composite material wherein the destabilizing component comprises an emulsion-destabilizing oligomer, an emulsion-destabilizing polymer, an emulsion-destabilizing copolymer; a cross-linked emulsion-destabilizing oligomer, a cross-linked emulsion-destabilizing polymer, or a cross-linked emulsion-destabilizing copolymer; or, a combination thereof. In some embodiments, the destabilizing component comprises: a grafted anionic surfactant, a grafted cationic surfactant, a grafted non-ionic surfactant, a grafted amphoteric surfactant, a grafted biosurfactant, or a surfactant-like moiety thereof; a polyglycol; polyamine; a polyimine; a polypyridine; a polyallylurea; a polyacid; a polyelectrolyte; a copolymer comprising amino, imino, tertiary amine, carboxyl, sulfonic acid, phosphonic acid, or charged moieties, or any combination thereof; an oligomer of any one of the foregoing or of any combination thereof; each of which optionally forms part of a copolymer; each of which is optionally substituted, grafted, or crosslinked; or, any combination thereof.

In embodiments, there is provided a composite material wherein the coating is a copolymer comprising the hydrophobic component and the destabilizing component. In some embodiments, the copolymer is a block copolymer comprising the hydrophobic component in one block and the destabilizing component in another block. In some embodiments, the length of the block comprising the destabilizing component is 10-90% the length of the block comprising the hydrophobic component. In other embodiments, the length of the block comprising the destabilizing component is 10%-80%; or 10%-70%; or 15%-60%; or 15%-50%; or 20%-50%, 20%-40%; or 30%-40% of the length of the hydrophobic component.

In an embodiment, there is provided a composite material wherein the coating comprises P(DMAEMA-r-MMA-r-HEMA)-g-PDMS, PDMAEMA-b-[P(MMA-r-HEMA)-g-PDMS], PDMAEMA-b-[P(MMA-s-HEMA)-g-PDMS], [P(MMA-r-HEMA)-g-PDMS]-b-PDMAEMA, P[DMAEMA-r-MMA-r-(PDMS-MA)], or a combination thereof.

In embodiments of the above aspects, there is provided a composite material wherein the permeable substrate comprises paper, fused carbon black, fused silica, glass wool, ceramic, fabric, metal mesh, polymer meshes, sintered glass, porous polymer membrane, stainless steel mesh, sintered glass filter, sintered glass filters made of fused glass beads, or a combination thereof.

In embodiments, there is provided a composite material wherein the hydrophobic liquid is an oil, or combination of oils. In some embodiments, there is provided a composite material wherein the aqueous liquid is water, or an aqueous solution.

In another aspect of the present application, there is provided a composite material, comprising: a coating, and a permeable substrate; the coating being disposed on the permeable substrate to form a coated substrate; the coated substrate comprising a hydrophobic component and a destabilizing component, the destabilizing component comprising a surfactant; wherein the coated substrate is selectively permeable to hydrophobic liquid and impermeable to aqueous liquid.

In embodiments of the above aspect, there is provided a composite material further comprising a binding component. In some embodiments, there is provided a composite material wherein any one, or combination of the coating, the permeable substrate, the hydrophobic component, or the destabilizing component comprise the binding component.

In embodiments, there is provided a composite material wherein the hydrophobic component and destabilizing component are separate and discrete relative to each other. In some embodiments, the hydrophobic component and destabilizing component are disposed on opposing surfaces of the coated substrate.

In embodiments, there is provided a composite material wherein the coating of the coated substrate comprises the hydrophobic component and destabilizing component. In some embodiments, the hydrophobic component and destabilizing component are associated with each other via intramolecular forces, intermolecular forces, or a combination thereof. In some embodiments, the hydrophobic component and destabilizing component are associated through covalent bonds. In some embodiments, the coating is disposed on all surfaces of the coated substrate.

In embodiments, there is provided a composite material wherein the hydrophobic component comprises a hydrophobic oligomer, a hydrophobic polymer, a hydrophobic copolymer; a cross-linked hydrophobic oligomer, a cross-linked hydrophobic polymer, a cross-linked hydrophobic or copolymer; or, a combination thereof. In some embodiments, the hydrophobic component comprises: a poly(alkylacrylate); poly(isobutylene), poly(alkyl vinyl ether), poly(alkyl vinyl ester), a poly(alkylmethacrylate); a poly(dialkylsiloxane); poly(diarylsiloxane); a fluorinated polymer; a polystyrene; a poly(alkylstyrene); a poly(alkylmethacrylate); a poly(alkylacrylate); a nylon; a polyester; a copolymer comprising oligo(dialkylsiloxane), oligo(diarylsiloxane), fluorinated oligomer, styrene moieties, alkyl styrene moieties, alkyl methacrylate moieties, alkyl acrylate moieties; an oligomer of any one of the foregoing or of any combination thereof; each of which optionally forms part of a copolymer; each of which is optionally substituted, grafted, or crosslinked; or, any combination thereof. In some embodiments, the hydrophobic component comprises: a poly(alkylacrylate); poly(isobutylene), poly(alkyl vinyl ether), poly(alkyl vinyl ester), a poly(alkylmethacrylate); a poly(dialkylsiloxane); poly(diarylsiloxane); a fluorinated polymer; a polystyrene; a poly(alkylstyrene); a nylon; a polyester; a copolymer comprising an oligo(dialkylsiloxane), an oligo(diarylsiloxane), a fluorinated oligomer, styrene moieties, alkyl styrene moieties, alkyl methacrylate moieties, alkyl acrylate moieties; an oligomer of any one of the foregoing or of any combination thereof; each of which optionally forms part of a copolymer; each of which is optionally substituted, grafted, or crosslinked; or, any combination thereof.

In embodiments, there is provided a composite material wherein the destabilizing component comprising a surfactant comprises a surfactant-grafted emulsion-destabilizing oligomer, a surfactant-grafted emulsion-destabilizing polymer, a surfactant-grafted emulsion-destabilizing copolymer; a crosslinked surfactant-grafted emulsion-destabilizing oligomer, a crosslinked surfactant-grafted emulsion-destabilizing polymer, or a crosslinked surfactant-grafted emulsion-destabilizing copolymer; or, a combination thereof. In some embodiments, the surfactant is an anionic surfactant, a cationic surfactant, an amphoteric surfactant, a biosurfactant, or a combination thereof. In an embodiment, the surfactant is oligo(ethylene glycol) monolaurate.

In another aspect of the present application, there is provided a method for making a composite material as herein described, comprising: adding a permeable substrate to a solution comprising at least one coating component, the at least one coating component being adapted to be disposed on the permeable substrate; removing the permeable substrate from the solution; and drying the permeable substrate to form a coated substrate, the coated substrate being selectively permeable to hydrophobic liquid and impermeable to aqueous liquid.

In embodiments of the above aspect, there is provided a method, further comprising selectively crosslinking the at least one coating component on a first surface of the coated substrate. In some embodiments, there is provided a method further comprising grafting at least a second coating component to a second surface of the coated substrate. In further embodiments, there is provided a method further comprising solvent extracting the coated substrate to remove undisposed coating components.

In embodiments, there is provided a method wherein drying comprises heating the substrate at above ambient temperatures. In some embodiments, ambient temperatures comprise temperatures of about 100-200° C.; or, about 120-180° C.

In embodiments, there is provided a method wherein the at least one coating component comprises a hydrophobic component, a destabilizing component, or a combination of both. In other embodiments, the at least one coating component further comprises a binding component.

In other aspects of the present application, there is provided a use of the composite material as described herein for separating a hydrophobic liquid from a mixture comprising the hydrophobic liquid and an aqueous liquid. In embodiments of this aspect, there is provided a use wherein the mixture is a simple mixture of the hydrophobic liquid and the aqueous liquid. In embodiments, there is provided a use wherein the mixture is an emulsion comprising the hydrophobic liquid and aqueous liquid. In some embodiments, the emulsion is a hydrophobic liquid-in-aqueous liquid emulsion (e.g., oil-in-water emulsion); or, an aqueous liquid-in-hydrophobic liquid emulsion (e.g., water-in-oil emulsion). In embodiments, there is provided a use wherein the hydrophobic liquid is an oil, or a mixture of oils; or, wherein the aqueous liquid is water or an aqueous solution.

In another aspect, there is provided a method of utilizing the composite material as described herein, the method comprising separating a hydrophobic liquid from a mixture comprising the hydrophobic liquid and an aqueous liquid with a composite material as described herein. In embodiments of this aspect, there is provided a method wherein the mixture is a simple mixture of the hydrophobic liquid and the aqueous liquid. In embodiments, there is provided a method wherein the mixture is an emulsion comprising the hydrophobic liquid and aqueous liquid. In some embodiments, the emulsion is a hydrophobic liquid-in-aqueous liquid emulsion (e.g., oil-in-water emulsion); or, an aqueous liquid-in-hydrophobic liquid emulsion (e.g., water-in-oil emulsion). In embodiments, there is provided a method wherein the hydrophobic liquid is an oil, or a mixture of oils; or, wherein the aqueous liquid is water or an aqueous solution.

BRIEF DESCRIPTION OF THE DRAWINGS

For a better understanding of the invention and to show more clearly how it may be carried into effect, reference will now be made by way of example to the accompanying drawings, which illustrate aspects and features according to embodiments of the present invention, and in which:

FIGS. 4A-C depicts SEM images of (a) uncoated cotton fabric, (b) PDMS-b-PCEA coated side, and (c) PDMAEMA-coated side of composite material Janus cotton fabric.

FIG. 12 depicts a) chemical structures of P1-b-$A_m$; and b) schematic structures of a P1-b-$A_m$-coated fabric in air and after contact with an emulsion on an upper side. Thicknesses of polymer trilayers and fiber diameter not shown to scale.

FIG. 13 depicts a) variations of water contact angles (WAC, °) with time on composite material fabrics that were coated by P1-b-$A_m$ with m=0, 4, 18, 43, and 103, respectively; b) photograph of $f_{HD}$=20% emulsions 15 min after addition of a 1.5×1.5-cm² fabric swatch to each vial, where from left to right, the composite material fabric was coated by P1-b-$A_m$ with m=4, 18, 23, 43, and 103, respectively; and c) shapes of water droplets in air that had been contacting a P1-b-$A_{18}$-coated fabric impregnated with HD for 0 and 80 min, respectively.

DETAILED DESCRIPTION OF THE INVENTION

Definitions

Figure 1A:
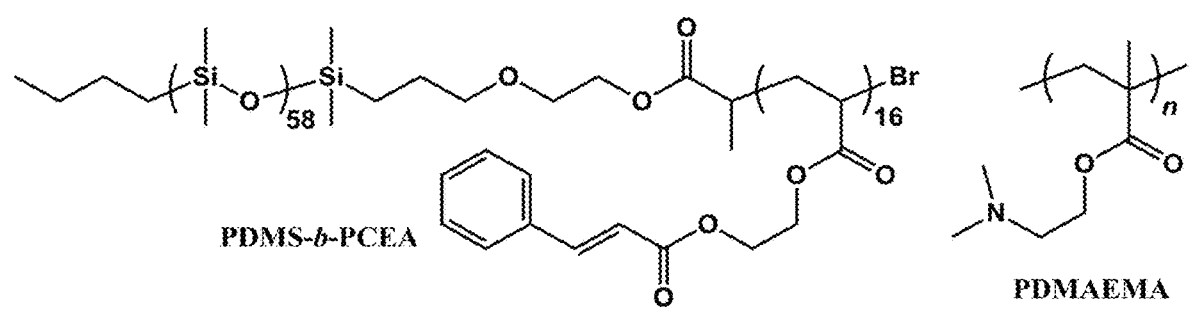
FIG. 1A depicts structural formulae for PDMS-b-PCEA and PDMAEMA.

Unless defined otherwise, all technical and scientific terms used herein have the same meaning as commonly understood by one of ordinary skill in the art to which this application belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

As used herein, the term "unsubstituted" refers to any open valence of an atom being occupied by hydrogen. Also, if an occupant of an open valence position on an atom is not specified then it is hydrogen.

As used herein, "substituted" means having one or more substituent moieties present that either facilitates or improves desired reactions and/or functions of the invention, or does not impede desired reactions and/or functions of the invention. Examples of substituents include, but are not limited to, alkyl, alkenyl, alkynyl, aryl, aryl-halide, heteroaryl, cyclyl (non-aromatic ring), $Si(alkyl)_3$, $Si(alkoxy)_3$, halo, alkoxyl, amino, amide, amidine, hydroxyl, thioether, alkylcarbonyl, alkylcarbonyloxy, arylcarbonyloxy, alkoxycarbonyloxy, aryloxycarbonyloxy, carbonate, alkoxycarbonyl, aminocarbonyl, alkylthiocarbonyl, phosphate, phosphate ester, phosphonato, phosphinato, cyano, acylamino, imino, sulfhydryl, alkylthio, arylthio, thiocarboxylate, dithiocarboxylate, sulfate, sulfato, sulfamoyl, sulfonamide, nitro, nitrile, azido, heterocyclyl, ether, ester, silicon-comprising moieties, thioester, or a combination thereof. Certain substituents, such as, but not limited to, alkyl halides, are known to be quite reactive, and are acceptable so long as they do not interfere with the desired reaction.

As used herein, a "functional group" is a specific atom or group of atoms within a molecule that are responsible for characteristic chemical reactions or properties. Thus functional groups are moieties within a molecule that are likely to participate in chemical reactions.

As used herein, "aliphatic" refers to hydrocarbon moieties that are straight chain, branched or cyclic, may be alkyl, alkenyl or alkynyl, and may be substituted or unsubstituted. "Short chain aliphatic" or "lower aliphatic" refers to $C_1$ to $C_4$ aliphatic. "Long chain aliphatic" or "higher aliphatic" refers to $C_5$ to $C_{25}$ aliphatic.

As used herein, "alkyl" refers to a linear, branched or cyclic, saturated hydrocarbon, which consists solely of single-bonded carbon and hydrogen atoms, which can be unsubstituted or is optionally substituted with one or more substituents; for example, a methyl or ethyl group. Examples of saturated straight or branched chain alkyl groups include, but are not limited to, methyl, ethyl, 1-propyl, 2-propyl, 1-butyl, 2-butyl, 2-methyl-1-propyl, 2-methyl-2-propyl, 1-pentyl, 2-pentyl, 3-pentyl, 2-methyl-1-butyl, 3-methyl-1-butyl, 2-methyl-3-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl and 2-ethyl-1-butyl, 1-heptyl and 1-octyl. As used herein the term "alkyl" encompasses cyclic alkyls, or cycloalkyl groups.

As used herein, "alkenyl" refers to a hydrocarbon moiety that is linear, branched or cyclic and comprises at least one carbon to carbon double bond and can be unsubstituted or optionally substituted with one or more substituents.

"Alkynyl" refers to a hydrocarbon moiety that is linear, branched or cyclic and comprises at least one carbon to carbon triple bond and can be unsubstituted or optionally substituted with one or more substituents.

As used herein, the term 'composite material' refers to a material made from two or more constituent materials, which may each have different physical or chemical properties.

As used herein, the term "emulsion" refers to a colloidal dispersion or suspension of a liquid in another liquid. Typically, an emulsion refers to an 'oil-in-water emulsion', which is a dispersion or suspension of hydrophobic liquid (e.g., oil) in water (e.g., hydrophilic/aqueous liquid) whereas the term "reverse emulsion" or 'water-in-oil emulsion' refers to a dispersion or suspension of water (e.g., hydrophilic/aqueous liquid) in a hydrophobic liquid (e.g., oil). As further used herein, the phrase 'oil and water mixtures' refer to simple mixtures (e.g., wherein the oil and water mixture is not surfactant-stabilized) or surfactant-stabilized emulsions, wherein the emulsion may be a 'oil-in-water'-type emulsion or a 'water-in-oil'-type emulsion.

As used herein, the term "destabilizing" refers to upsetting the stability of, or causing unrest in. "Destabilizing an emulsion" refers to formation of a mixture of two distinct liquids wherein there is no longer a colloidal dispersion or suspension of one liquid in another liquid. For example, such destabilization of an emulsion can comprise macroscopic phase separation between two distinct liquids, like oil and water. By way of further example, oil droplets (for oil-in-water emulsions) or water droplets (for water-in-oil emulsions) may coalesce on a herein described composite material's surface(s), after which the coalesced phase may become large enough to fill the material's pores.

As used herein, the term "destabilizing component" or "destabilizing moiety" is a component of a coating as described herein that destabilizes or breaks emulsions, and is either a discrete polymer, or is part of a discrete polymer. In some embodiments, the component is a homopolymer or copolymer. In other embodiments, the component is a polymeric block of a copolymer. In yet other embodiments, the component is a functional group or side chain of a polymer, wherein the polymer may be a homopolymer, copolymer, a block of a copolymer, etc.

As used herein, the term "hydrophobic component" or "hydrophobic moiety" is a component of a coating as described herein that repels water, and that is either a discrete polymer, or is part of a discrete polymer. In some embodiments, the component is a homopolymer or copolymer. In other embodiments, the component is a polymeric block of a copolymer. In yet other embodiments, the component is a functional group or side chain of a polymer, wherein the polymer may be a homopolymer, copolymer, a block of a copolymer, etc.

As used herein, the term "binding component" or "binding moiety" is a component of a coating as described herein that facilitates binding or grafting of a coating or coating component to a substrate, and that is either a functional group, a functional moiety, a discrete polymer, or is part of a discrete polymer. In some embodiments, the component is a homopolymer or copolymer. In other embodiments, the component is a polymeric block of a copolymer. In yet other embodiments, the component is a functional group or side chain of a polymer, wherein the polymer may be a homopolymer, copolymer, a block of a copolymer, etc.

As used herein, the term "surfactant-like moiety" refers to a moiety (e.g., a component, a compound, a functional group, etc.) that has surface active properties, and may act like a surfactant under certain conditions.

As used herein, the term "hydrophobic liquid" refers to a liquid that is immiscible in water or aqueous solutions. Hydrophobic liquids are usually nonpolar and non-hydrogen bonding. The degree of hydrophobic character of a molecule/liquid, or hydrophobicity, can be quantified by a log P value. The log P is the logarithm of the lipid-water partition coefficient, P, of a molecule/liquid. The lipid-water partition coefficient seeks to determine the ratio of solubilities of a molecule/liquid in a lipid environment and a hydrophilic aqueous environment. The lipid-water partition coefficient is the equilibrium constant calculated as the ratio of the concentration of the molecule in the lipid phase divided by the concentration of the molecule in the aqueous phase.

As used herein, "immiscible" means unable to merge into a single phase. Thus two liquids are described as "immiscible" if they form two phases when combined in a proportion. This is not meant to imply that combinations of the two liquids will be two-phase mixtures in all proportions or under all conditions. The immiscibility of two liquids can be detected if two phases are present, for example via visual inspection. The two phases may be present as two layers of liquid, or as droplets of one phase distributed in the other phase.

As used herein, the term "aqueous liquid" refers to a hydrophilic liquid that is of, or containing water. In some embodiments, the aqueous liquid is water. In other embodiments, it is a liquid wherein water is the solvent or medium. As used herein, "hydrophilic" refers to a property of a molecule/liquid allowing it to be dissolved in or miscible with a mass of water, typically because the molecule/liquid is capable of transiently bonding with water through hydrogen bonding. Hydrophilic molecules are usually polar. Such molecules may thus be compatible with other polar molecules.

As used herein, the term "disposed on" refers to placement or adherence of, for example, a polymer, on or contiguous to a substrate, but does not exclude impregnation, and may refer to attachment of the polymer to the substrate via a covalent bond, or a non-covalent force, such as, for example, absorption, impregnation, chemisorption, physisorption, and/or inter- and intra-molecular bonds. In some cases, "disposing" may refer to a polymer becoming connected or attached to a substrate by coating and/or encasing the substrate and then bonding to itself through crosslinking.

As used herein, the term "permeable substrate" refers to a material having pores or openings that permit liquids or gases to pass through it, which acts as a support or scaffold for the herein described coatings, which comprise at least a hydrophobic component and a destabilizing component. Used herein, with reference to the "permeable substrate" is the term "face(s)", which references outward-facing surfaces of the permeable substrate. However, as would be understood by one skilled in the art, the herein described substrates are three-dimensional, not two dimensional. As such, when a 'face' of a 'substrate' is referred to as being coated (e.g., with a hydrophobic component, a destabilizing component, a combination thereof, or, grafted with a polymer), one skilled in the art would understand that there may still be a distribution of the coating or grafted polymer into the interior of the substrate, forming a gradient from one outward-facing surface of a substrate to another. In some embodiments, such a distribution may be deliberately crafted to generate a gradient of, for example, hydrophobicity between outward-facing surfaces, wherein one face is hydrophobic and the other face is hydrophilic. In other embodiments, such a distribution may be a natural consequence of the coating or grafting process. However, in embodiments of the present application, such a distribution would either serve to facilitate/improve function of the herein described composite materials; or, would have no impeding impact on the composite materials' function. In embodiments of the present application, such a distribution would not inhibit or prevent function to the point of inutility.

The term "Janus" refers to having two contrasting aspects or characteristics and is used to mean having two opposite faces. It is used herein in reference to a substrate (e.g., piece of fabric) with one type of coating on one face and another type of coating on the opposing face.

As used herein, the term "coating" refers to a covering that is located at least at the surface of substrate.

As used herein, the term "permeable" refers to a material or membrane having pores or openings that permit liquids or gases to pass through it.

As used herein, the term "selectively permeable" refers to allowing only substances of a particular character to pass through its pores or openings.

As used herein, the term "polymer" refers to a large molecule, or macromolecule, composed of many repeated units. As used herein, 'polymer' also refers to a homopolymer or copolymer. As used herein, the term "oligomer" means a molecule of composed of a smaller number of repeat units relative to a polymer. A polymer can be regarded as having a high relative molecular mass, as the addition or removal of one or a few of the units has a negligible effect on its molecular properties. An oligomer can be regarded as having an intermediate relative molecular mass, as it has molecular properties which do vary significantly with the removal of one or a few of the units.

As used herein, the term "homopolymer" refers to a polymer having only one type of monomer unit.

As used herein, the term "copolymer" refers to a polymer having more than one type of monomer units. As used herein, the term "co" refers to copolymer. The term 'copolymer' as used herein encompasses the various types of copolymers, such as but not limited to grafted copolymers, block copolymers, statistical copolymers, etc.

As used herein, the term "grafted copolymer" refers to a copolymer with a linear backbone of one polymer and randomly distributed side chains of another polymer.

As used herein, the term "b" refers to block.

As used herein, the term "g" refers to graft.

As used herein, the terms 's' and 'r' denote statistical and random, respectively; and can be used interchangeably.

As used herein, the term "grafted" or "grafting" refers to connecting a thing to another thing. For example, as used herein, the term comprises connecting a coating to a substrate; a coating component to a substrate; a coating component to a coating; a coating component to another coating component; etc. In the context of grafted or grafting, 'connecting' refers to forming a chemical bond between things; or physically adhering or encapsulating a thing with another thing, such as by crosslinking. By way of further example, 'grafted' refers to a functional group, monomer, oligomer, polymer, or copolymer being connected to another oligomer, polymer, or copolymer. In some embodiments described herein, the 'binding component' facilitates grafting a coating or coating component to a substrate.

As used herein, the term "surfactant-grafted" or "grafted surfactant" refers to a surfactant, or surfactant-like moiety that has been connected/grafted to a coating, coating component, or substrate as described herein.

As used herein the term "block copolymer" refers to a type of copolymer that is made up of blocks of different polymerized monomers. Block copolymers may be prepared by first polymerizing a first monomer, and then subsequently polymerizing a second monomer from the reactive end of the first polymer. The resultant polymer is a "diblock copolymer" because it contains two different chemical blocks. Triblocks, tetrablocks, multiblocks, etc. can also be made.

As used herein, the term "$f_H$" refers to a volume fraction of oil in an oil-in-water emulsion.

As used herein, the term "AIBN" refers to azobisisobutyronitrile.

As used herein, the term "PDMS" refers to poly(dimethyl siloxane).

As used herein, the term "PCEA" denotes poly(2-cinnamoyloxyethyl acrylate).

As used herein, the term "PHEMA" denotes poly(2-hydroxyethyl methacrylate).

As used herein, the term "DMF" refers to N,N-dimethylformamide.

As used herein, the term "THF" refers to tetrahydrofuran.

As used herein, the term "MMA" refers to methyl methacrylate.

As used herein, the term "PEI" refers to poly(ethylene imine).

As used herein, the term "PDMAEMA" refers to poly(N,N-dimethylaminoethyl methacrylate).

As used herein, the term "HEMA" refers to 2-hydroxyethyl methacrylate.

As used herein, the term "HD" refers to hexadecane.

As used herein, the term "ATRP" refers to atom transfer radical polymerization.

As used herein, the term "SEM" refers to scanning electron microscope.

As used herein, the term "SEC" refers to size-exclusion chromatography.

As used herein, the term "SDS" refers to sodium dodecyl sulfate.

As used herein, the term "CTAB" refers to cetyltrimethylammonium bromide.

As used herein, the term "TWEEN-80" refers to polyethylene glycol sorbitan monooleate.

As used herein, the term "TGA" refers to thermogravimetric analysis.

As used herein, the term "TMSPMA" refers to trimethoxysilyl propyl methacrylate.

As used herein, the term "P(DMAEMA-r-MMA-r-HEMA)-g-PDMS" refers to a simple graft copolymer wherein the main chain of the graft copolymer is a random copolymer of DMAEMA, MMA and HEMA, while the side chains are PDMS.

As used herein, the term "PDMAEMA-b-[P(MMA-r-HEMA)-g-PDMS]" refers to a diblock copolymer wherein the first block is PDMAEMA, and the second block is a graft copolymer having a main chain that is a random copolymer of MMA and HEMA, and the side chains that are PDMS.

As used herein, the term "[P(MMA-r-HEMA)-g-PDMS]-b-PDMAEMA" refers to a diblock copolymer wherein the second block is PDMAEMA, and the first block is a graft copolymer having a main chain that is a random copolymer of MMA and HEMA, and the side chains that are PDMS.

As used herein, the term "PDMAEMA-b-[P(MMA-s-HEMA)-g-PDMS]" refers to a diblock copolymer wherein the first block is PDMAEMA, and the second block is a graft copolymer having a main chain that is a statistical copolymer of MMA and HEMA, and the side chains that are PDMS.

As used herein, the term "P[DMAEMA-r-MMA-r-(PDMS-MA)]" has been used interchangeably with P[DMAEMA-s-MMA-s-(PDMS-MA)] and refers to a statistical copolymer consisting of DMAEMA and MMA units in the backbone and PDMS as side chains.

As used herein, the term "hydrophobic" refers to tending to repel, or failing to mix with water.

As used herein to refer to material or surfaces, the term "superhydrophobic" refers to repelling of water such that droplets do not simply flatten, but roll off instead.

As used herein, the term "polyacid" refers to a polymer bearing more than one acidic group. Acidic groups include, for example, carboxyl, sulfonic acid, or phosphonic acid, As used herein, the term "polyamine" refers to a polymer bearing more than one basic nitrogen atom. Examples include amine, imine, and tertiary amine groups, as well as pyridine groups.

As used herein, the term "polyelectrolyte" refers to a polymer bearing more than one charged functional groups. Acid groups at high pH values and amine groups at low pH values are charged groups. Other examples include quaternary amines, ionic liquid functionalities, sulfate groups, and zwitterionic groups.

Embodiments

An aspect of the present application provides a composite material, comprising a coating, and a permeable substrate; the coating being disposed on the permeable substrate to form a coated substrate; the coated substrate comprising a hydrophobic component and a destabilizing component, and being selectively permeable to hydrophobic liquid and impermeable to aqueous liquid. Another aspect of the present application is use of said composite material for separating hydrophobic liquids from hydrophobic liquid and aqueous liquid mixtures. In embodiments, the hydrophobic liquid is an oil, or mixtures thereof. In other embodiments, the aqueous liquid is water or aqueous solutions thereof. In embodiments, the hydrophobic and aqueous liquid mixtures are surfactant-stabilized emulsions. In some embodiments, the surfactant-stabilised emulsions are oil-in-water emulsions; or, water-in-oil emulsions. In other embodiments, the hydrophobic and aqueous liquid mixtures are not surfactant-stabilized. In embodiments, the amount of hydrophobic liquid in the mixtures is approximately 1%-99%; or, 2%-98%; or, 3%-97%; or, 4%-96%; or, 5%-95%. In other embodiments, the amount of hydrophobic liquid is approximately 10%-80%; or, 20%-70%; or, 20%-60%; or, 20%-50%; or, 20%-40%; or, 20%.

Embodiments of the present application provide a composite material (e.g., Janus fabric) wherein one side was coated with a hydrophobic component; for example, a polymer comprising hydrophobic characteristics, the polymer being crosslinked on one side of the Janus fabric such that the crosslinked polymer was grafted to (e.g., surrounded/wrapped around) the fabric's fibers. The fabric's second side was then coated with a destabilizing component; for example, a polymer comprising functional groups/moieties that facilitated breaking emulsions through destabilization of said emulsions. In another embodiment, the fabric is first coated on one side with a destabilizing component; and then, is coated with a polymer comprising hydrophobic characteristics, the polymer being crosslinked on the other side. Studies described herein show that the thus-coated Janus fabric worked as a filter, separating hydrophobic liquids (e.g., oil) from a hydrophobic liquid (i.e., oil) and hydrophilic/aqueous liquid (i.e., water) mixture.

For convenience, the term "oil" is used herein to represent any hydrophobic liquid or combination of hydrophobic liquids, and is not intended to limit the present application in any way. Likewise, the term "water" is used herein to represent aqueous/hydrophilic liquid and is not intended to be limiting. Further, as used herein, the term 'mixture' in the context of hydrophobic (i.e., oil) and hydrophilic/aqueous liquid (i.e., water) mixtures comprises surfactant-stabilized mixtures, and mixtures that are not surfactant-stabilized. In embodiments where the mixture is surfactant-stabilized, the mixture may be an oil-in-water emulsion. In other embodiments, the mixture is a water-in-oil emulsion.

Another design for a composite material described herein comprises at least a hydrophobic component and destabilizing component, wherein both components are present on the same side of a permeable substrate (e.g., filter scaffold). For example, a two polymer filter wherein two polymers, a hydrophobic polymer and an emulsion-destabilizing polymer, are both attached to a face/surface (e.g., fibers) on the same side of a composite material filter, and could separate oil from an oil and water mixture. By way of further example, when two different polymers are attached to the same side of a substrate (e.g., fabric), a first polymer, for example P(MMA-r-HEMA)-g-PDMAEMA, is grafted onto one face of the fabric at a lower surface density. A second polymer, for example P(MMA-r-HEMA)-g-PDMS, is then grafted onto the same face of the fabric in a second step. The result is both polymers grafted to one face/side of the fabric, thus forming a composite material as described herein. In an embodiment, a permeable substrate may first be coated with a binding component, to which a destabilizing component and hydrophobic component may be grafted on only one side/face of the substrate. In another embodiment, the binding component may comprise any one of the destabilizing component and hydrophobic component, or vice versa; said binding component then being grafted to only one side of the substrate. Following the grafting of said binding component, the remaining destabilizing or hydrophobic component may then be grafted to the same side of the substrate to form a composite material as described herein. In a further embodiment, a uniform coating as described herein may be used to coat only one side/face of a permeable substrate, thus forming a herein described composite material; for example, to produce a filter.

Finally, further studies conducted and described herein provided a third design for a composite material capable of separating oil from an oil and water mixture. This third design is referred to herein as a uniform coating, as it comprises a polymer on a permeable substrate (e.g., filter scaffold), wherein the polymer bears the following three functionalities:
(1) a binding component that can bind to the scaffold;
(2) a hydrophobic component; and
(3) an emulsion-destabilizing component.

In an alternative embodiment of the above designs, the hydrophobic component is replaced with a hydrophilic component, resulting in a composite material capable of selectively separating water from an oil and water mixture. Without wishing to be bound by theory, it was considered that, by replacing the hydrophobic component with a hydrophilic component, a resulting composite material would be hydrophilic enough to repel hydrophobic liquids (e.g., oil), allowing only hydrophilic/aqueous liquids (e.g., water) to permeate the composite material and separate oil and water from an oil and water mixture. In such alternative embodiments, the hydrophilic component is a component of a coating as described herein that attracts water, and that is either a discrete polymer, or is part of a discrete polymer. In some embodiments, the component is a homopolymer or copolymer. In other embodiments, the component is a polymeric block of a copolymer. In yet other embodiments, the component is a functional group or side chain of a polymer, wherein the polymer may be a homopolymer, copolymer, a block of a copolymer, etc. In some embodiments, the hydrophilic component may be part of, or comprise a binding component. In other embodiments, the hydrophilic component may be crosslinked, or lightly crosslinked, or not crosslinked at all. Non-limiting examples of a hydrophilic component include water soluble polymers, such as polyacrylamide, polyethylene glycol, oligo(ethylene glycol), hydroxylethylacrylate (HEA), polyvinylalcohol, or polyethyleneoxide, etc.

Accordingly, composite material (i.e., filter) designs have been made and tested as described herein.

In embodiments of the present application, composite materials that are described herein are suitable for use as filters, referred to herein as "functional filters," to destabilize emulsions and selectively allow only oil and substantially no water to pass through pores of the filter scaffold. Use of these functional filters to separate oil from an oil/water mixture, resulted in collection of a clear oil, with no cloudiness (for example, see FIGS. 2A and 2B). It was possible to separate oil from mixtures of oil and water and from oil and water emulsions using the functional filters described herein. Details are provided in the Working Examples.

Embodiments of the functional filters described herein, irrespective of design, provided a composite material that comprises: a permeable substrate; at least one coating disposed on the substrate; a hydrophobic component; and a destabilizing component, wherein at least one of the hydrophobic component and the destabilizing component is present in the at least one coating. As described above, and detailed herein, the composite material can be manufactured having different designs, however, in embodiments described herein, the filter material functions to destabilize, break or suppress formation of oil/water emulsions and to facilitate selective separation of the oil from the water (or aqueous/hydrophilic liquid). As such, embodiments of herein described composite materials comprise a destabilizing component, which serves to destabilize (or break or suppress formation of) oil/water emulsions, and a hydrophobic component, which serves to attract the oil from an oil/water mixture and to repel the water. The inclusion of both of these components in the composite material aids in the effective separation of the oil from oil and water mixtures. In some embodiments described herein, the composite materials may further comprise a binding component, which facilitates binding or grafting a coating or coating component to a substrate.

In embodiments of the present application, the hydrophobic component is a component of a coating as described herein that repels water, and that is either a discrete polymer, or is part of a discrete polymer. In some embodiments, the component is a homopolymer or copolymer. In other embodiments, the component is a polymeric block of a copolymer. In yet other embodiments, the component is a functional group or side chain of a polymer, wherein the polymer may be a homopolymer, copolymer, a block of a copolymer, etc. In other embodiments, the hydrophobic component may comprise two or more different hydrophobic components. Non-limiting examples of a hydrophobic component as described herein include: poly(isobutylene), poly(alkyl vinyl ether), poly(alkyl vinyl ester), poly(alkyl acrylate) with alkyl groups of greater than 2 carbon atoms, trifluoroethyl methacrylate, poly(dimethyl siloxane), poly (diphenyl siloxane), fluorinated polymers such as, for example, poly(n-hexafluoropropylene oxide), poly(hexafluoroisopropylene oxide), poly(1H, 1H-perfluorooctyl methacrylate), or poly(2, 2, 2-trifluoroethyl methacrylate), polystyrene, poly(alkyl styrene) such as, for example, poly[4-(3-perfluorooctyl)propylstyrene] or poly (para-tert-butyl styrene), poly(alkyl methacrylate) such as poly(butyl methacrylate), poly(hexyl methacrylate), poly(lauryl methacrylate), poly(hexadecyl methacrylate), poly(octadecyl methacrylate) or poly(2-ethylhexyl methacrylate), poly(alkyl acrylate) such as poly(butyl acrylate), poly(hexyl acrylate), poly(lauryl acrylate), poly(hexadecyl acrylate), poly(octadecyl acrylate), poly(2-ethylhexyl acrylate), a copolymer comprising segments of above mentioned oligo(dimethyl siloxane), oligo(diphenyl siloxane), or fluorinated oligomer, or a copolymer containing styrene units, alkyl styrene units, alkyl methacrylate units, or alkyl acrylate units, or a combination thereof.

In embodiments of the present application, the destabilizing component is a component of a coating as described herein that destabilizes or breaks emulsions, and is either a discrete polymer, or is part of a discrete polymer. In some embodiments, the component is a homopolymer or copolymer. In other embodiments, the component is a polymeric block of a copolymer. In yet other embodiments, the component is a functional group or side chain of a polymer, wherein the polymer may be a homopolymer, copolymer, a block of a copolymer, etc. In other embodiments, the destabilizing component may comprise two or more different destabilizing components. Non-limiting examples of a destabilizing component as described herein include surfactants or surfactant-like moieties as described herein, polyamines such as poly[N-(3-aminopropyl)methacrylamide], poly {N-[3-(dimethylamino) propyl] methacrylamide}, poly(ethylene imine), poly(allyl amine), poly(2-dimethylaminoethyl methacrylate), poly(4-vinyl pyridine), poly(2-vinyl pyridine), polyacrylamides or polyallylurea, polyacids such as poly(acrylic acid), poly(methacrylic acid), poly (vinyl phosphonic acid) or poly(4-styrenesulfonic acid), poly(methacryloyloxy ethylene phosphate), other polyelectrolytes such as poly(2-acrylamido-2-methyl-1-propanesulfonic acid), sodium polyacrylate, sodium polystyrene sulfonate, poly[(2-methacryloyloxy) ethyl trimethylammonium chloride], or poly[[(2-methacryloyloxy)-dimethyl(3-sulfopropyl) ammonium hydroxide].

In further embodiments of the present application, the destabilizing component becomes at least partially charged depending on a solution's pH. In some embodiments, the destabilizing component becomes at least partially positively charged depending on a solution's pH. In other embodiments, the destabilizing component becomes at least partially negatively charged depending on a solution's pH. Without wishing to be bound by theory, it was considered that such destabilizing components destabilize emulsions by way of a charge-screening mechanism. In a non-limiting example in which the destabilizing component is PDMAEMA, the PDMAEMA becomes at least partially positively charged depending on solution pH. Emulsion droplets bearing surface-adsorbed ionic surfactants (e.g., negatively charged) do not typically coalesce because of different emulsion droplets electrostatically repelling one another due to an electrostatic double layer around them. However, charged PDMAEMA chains may facilitate coalescence of such droplets by way of a high, local ionic strength next to said PDMAEMA chains. This high ionic strength facilities screening out the electrostatic repulsion between different emulsion droplets; thus, emulsion droplets may approach one another and coalesce. Without further being bound by theory, it was considered that such a charge-screening mechanism would occur regardless of whether the destabilizing component or surfactant was positively charged or negatively charged, given that it has been demonstrated that at least partially positively charged PDMAEMA chains destabilize both anionic and cationic surfactant-stabilized emulsions (see Example 22).

Without wishing to be bound by theory, it was also considered that charged destabilizing components, such as PDMAEMA chains, may also facilitate droplet coalescence by way of a bridging effect: for example, positively charged PDMAEMA chains may electrostatically attract SDS-stabilized emulsion droplets that bear negative charge. Thus, a positively-charged PDMAEMA chain(s) may electrostatically attract one or more emulsion droplets, and facilitate the droplets' coalescence. Without wishing to be bound by theory, it was considered that a negatively charged destabilizing component may electrostatically attract cationic surfactant-stabilized emulsion droplets via a similar bridging effect.

In other embodiments of the present application, the destabilizing component comprises a surfactant, or surfactant-like moiety (i.e., a surfactant-based destabilizing component). Without wishing to be bound by theory, it was considered that such destabilizing components destabilize emulsions by way of competition: that the surfactant-based destabilizing component of the herein described composite materials competes with surfactant molecules on the surface of emulsion droplets for adsorption sites. It is considered that this competition brings emulsion droplets to a substrate's (e.g., fabric's) surface, and that adsorbed droplets then coalesce to form larger droplets, allowing oil to fill the coated substrate's pores on its hydrophobic or superhydrophobic side, and permeate it. For example, the surfactant-based destabilizing component draws emulsion droplets from the emulsion's aqueous phase and cause said droplets to coalesce or aggregate on a coated substrate's surface. Without wishing to be bound by theory, it was considered that the competition mechanism would occur whether the oil and water mixture was a surfactant-stabilized emulsion, or was a simple mixture (i.e., not surfactant-stabilized). Further, when the oil and water mixture comprises surfactant-stabilized emulsions, it was considered that the competition mechanism would occur whether the surfactant and surfactant-based destabilizing component were of a similar type (e.g., a cationic surfactant and a cationic surfactant-based destabilizing component), or of different types (e.g., a cationic surfactant and a non-ionic surfactant-based destabilizing component).

Thus, without wishing to be bound by theory, it was considered a consequence of the competition mechanism that the resultant composite materials comprising a surfactant-based destabilizing component would be rendered insensitive to the type of surfactant used to stabilize emulsions; and that, thus, the composite materials would be able to selectively separate oil from any surfactant-stabilized emulsion, regardless of the type of surfactant being used. Without wishing to be bound by theory, it was considered that regardless of the type of surfactant or surfactant-like moiety comprised by the destabilizing component, or the type of surfactant used to stabilize an emulsion, the destabilizing component would still compete with the surfactant molecules on the surface of emulsion droplets for adsorption sites, leading to coalescence and permeation. As demonstrated in Example 20, and further described below, a herein described composite material comprising a surfactant-based destabilizing component, separated oil from oil-in-water emulsions stabilized by non-ionic, anionic, and cationic surfactants.

In some embodiments, the surfactant or surfactant-like moiety comprises an anionic surfactant, which comprises anionic head groups (e.g., sulfates, sulfonates, phosphates, and carboxylates). Non-limiting examples of anionic surfactants include alkyl sulfates (e.g., ammonium lauryl sulfate, sodium lauryl sulfate), alkyl-ether sulfates (e.g., sodium myreth sulfate, sodium laureth sulfate), alkyl-aryl ether phosphates, alkyl ether phosphates, perfluoronated sulfonates (e.g., perfluorooctanesulfonate, perfluorobutane-sulfonate), alkyl carbonates (e.g., sodium stearate, sodium lauroyl sarcosinate), or carboxylate-based fluorosurfactants (e.g., perfluorononanoate, perfluorooctanoate).

In some embodiments, the surfactant or surfactant-like moiety comprises a cationic surfactant, which comprises cationic head groups (e.g., amines, ammonium salts). Non-limiting examples of cationic surfactants comprise linear alkyl-amines (e.g., dodecyl amine, tetradecyl methyl amine), alkyl ammoniums (e.g., cetyl trimethyl ammonium bromide (CETAB), hexadecyl trimethyl ammonium bromide (HTAB)), fatty amines (e.g., lauryl amine), linear diamines, aromatic or saturated heterocycles (e.g., n-dodecyl pyridinium chloride, imidazolium salts), or esterquats.

In some embodiments, the surfactant or surfactant-like moiety comprises an amphoteric surfactant, which comprise head groups that carry both a negative and positive charge. Typically, the cationic part is based on primary, secondary, or tertiary amines or quaternary ammonium cations. The anionic part is typically more variable, and can be based on anionic head groups such as carboxylates, sulfates, or sulfonates, etc. Non-limiting examples of amphoteric surfactants comprise betaines (e.g., alkyl betaines, cocamidopropyl betaine (CAPB)), or biological amphoteric surfactants, such as phospholipids phosphatidylserine, phosphatidylethanolamine, phosphatidylcholine, or sphingomyelins.

In some embodiments, the surfactant or surfactant-like moiety comprises biosurfactants, which are surface-active substances that may be synthesized by living cells (e.g., bacteria, yeasts). Non-limiting examples of biosurfactants comprise microbial biosurfactants, such as Emulsan produced by *Acinetobacter calcoaceticus*, Sophorolipids produced by several yeasts belonging to *candida* and starmerella clade, or Rhamnolipids produced by *Pseudomonas aeruginosa*; glycolipids (e.g., trehalolipids, sophorolipids); lipoproteins or lipopeptides (e.g., surfactin); fatty acids, phospholipids, neutral lipids; polymeric biosurfactants (e.g., liposan, alasan, lipomanan).

In some embodiments, the surfactant or surfactant-like moiety comprises a non-ionic surfactant, which do not comprise a charged head or moiety. Non-limiting examples of non-ionic surfactants comprise ethoxylates, long-chain alcohols (fatty alcohols, cetyl alcohol, stearyl alcohol, oleyl alcohol), polyalkylene glycol alkyl ethers (e.g., polyethylene glycol alkyl ethers, such as octaethylene glycol monododecyl ether; polypropylene glycol alkyl ethers), glucoside alkyl ethers (e.g., decyl glucoside, octyl glucoside), glycerol alkyl esters (e.g., glyceryl laurate), polyoxyethylene glycol sorbitan alkyl esters (e.g., polysorbate), or block copolymers of polyethylene glycol and polypropylene glycol (e.g., poloxamers). In a non-limiting example described herein, the destabilizing component comprised non-ionic surfactant oligo(ethylene glycol) monolaurate (OEG-LA). This surfactant has a hydrophobic tail comprising a lauryl group and a hydrophilic head comprising oligo(ethylene glycol). A terminal hydroxyl group of oligo(ethylene glycol) was used to graft the surfactant to P(MMA-r-HEMA) to prepare P(MMA-r-HEMA)-g-(OEG-LA). Using coating protocols described herein, P(MMA-r-HEMA)-g-(OEG-LA) was grafted onto one side of a permeable substrate (e.g., cotton fabric) and (PMMA-r-HEMA)-g-PDMS was grafted to the other side to form a Janus composite material comprising an emulsion-destabilizing side and superhydrophobic side.

For the above embodiments wherein the destabilizing component comprises a surfactant, or surfactant-like moiety, the surfactant or surfactant-like moiety comprises means for being incorporated into or onto a coating of a composite material as described herein; or, means for attaching to a substrate of a composite material as described herein. In an embodiment, the means for being incorporated, or means for attaching comprise means known in the art for incorporating or attaching a compound onto or into another compound or composite material; for example, via grafting. In another embodiment, the means for being incorporated, or means for attaching comprise functional groups that facilitate formation of at least one intermolecular or intramolecular bond with other coating components (e.g., hydrophobic component, binding component) or with the substrate of the herein described composite materials. In another embodiment, the means for being incorporated, or means for attaching comprise a binding component as described herein. In another embodiment, the surfactant or surfactant-like moiety is functionalized to comprise means for being incorporated into or onto a coating of a composite material as described herein; or, means for attaching to a substrate of a composite material as described herein. In some embodiments, the surfactant or surfactant-like moiety is comprised by a monomer that is incorporated into a polymer, copolymer, etc. that forms, at least in part, the coating of the composite materials described herein. In other embodiments, the surfactant or surfactant-like moiety is grafted onto a polymer, copolymer, etc. that forms, at least in part, the coating of the composite materials described herein.

In embodiments of the present application, the binding component is a component of a coating as described herein that facilitates binding or grafting of a coating or coating component to a substrate, and that is either a functional group, a functional moiety, a discrete polymer, or is part of a discrete polymer. In some embodiments, the component is a homopolymer or copolymer. In other embodiments, the component is a polymeric block of a copolymer. In yet other embodiments, the component is a functional group or side chain of a polymer, wherein the polymer may be a homopolymer, copolymer, a block of a copolymer, etc. In other embodiments, the binding component may comprise two or more different binding components. Non-limiting examples of a binding component include: functional groups that react to form covalent bonds with other functional groups, such as hydroxyl groups, carboxylic acid groups, isocyanate groups, functional groups that facilitate amide bond formation etc.; or, crosslinking/photocrosslinking polymers or copolymers, or crosslinking/photocrosslinking polymer or copolymer components, such as P(MMA-s-HEMA), polymers with pendant double bonds, poly(2-cinnamoyloxyethyl methacrylate) (PCEMA), or poly(2-cinnamoyloxyethyl acrylate) (PCEA).

In embodiments of the present application, the binding component, hydrophobic component, and destabilizing component may be discreet, separate polymers or copolymers relative to each other. In other embodiments, the binding component may comprise any one of the hydrophobic component and destabilizing component; or, any one of the hydrophobic component and destabilizing component may comprise the binding component. In other embodiments, the binding component, hydrophobic component, and destabilizing component may all be comprised within the same polymer or copolymer; for example: PDMAEMA-b-[P(MMA-s-HEMA)-g-PDMS], wherein PDMAEMA is a destabilizing component, P(MMA-s-HEMA) is a binding component, and PDMS is a hydrophobic component.

Unlike some functional filters where polymers bearing functional moieties are used to form filter scaffold, embodiments of the application as described herein provide for modifying existing permeable substrates or filter scaffolds (e.g., cloth) to provide them with functional coatings, and render them selectively permeable to oil. Substrates (e.g., scaffolds) that are suitable for this use are not limited, and include any material that is used for filters. For example, suitable substrates or scaffolds include paper, fused carbon black, fused silica, glass wool, ceramic, fabric (e.g., cotton, nylon, polyester, rayon), metal mesh, polymer mesh, sintered glass, porous polymer membrane (such as, for example, a polysulfone or TEFLON® membrane available from EMD Millipore used for solvent filtration), stainless steel mesh (for example, available from TWP Inc.), sintered glass filter (for example, available from Pyrex® Laboratory Glassware), sintered glass filters made of fused glass beads.

When coated, such substrates possess functionality. This functionality may be present on different faces/sides of the substrate (i.e., on different fibers), as described for the Janus filter composite material; on the same face/side of the substrate (i.e., on the same fibers) via different polymers; or, on every face/side of the substrate (i.e., on all the fibers) via a polymer that has different functional components, as described for the uniform coatings. Thus, functional components can be arranged as in the composite material Janus filters as described herein, or they can be randomly distributed on, for example, fiber scaffolds (fabric), metal scaffolds (meshes), or glass bead scaffolds (sintered glass).

With an appropriate relative amount of hydrophobic and emulsion breaking (i.e., destabilizing) components present, separation of oil and water emulsions and oil and water mixtures was effectively achieved with the herein described composite materials. In embodiments of the present application wherein the destabilizing component and hydrophobic component are comprised within a polymer (e.g., a diblock copolymer), an appropriate relative amount of hydrophobic component to destabilizing component comprises the length (i.e. chain-length) of the destabilizing component being 5%-100% the length (i.e., chain-length) of the hydrophobic component. In other embodiments, the length of the destabilizing component is 10%400% the length of the hydrophobic component (i.e., chain-length). In yet other embodiments, the length of the destabilizing component is 10%-90%, 10%-80%, 10%-70%, 15%-60%, 15%-50%, 20%-50%, 20%-40%, or 30%-40% of the length of the hydrophobic component, or any range there between. In other embodiments of the present application wherein the destabilizing component and hydrophobic component are comprised within a polymer (e.g., a diblock copolymer), an appropriate relative amount of hydrophobic component to destabilizing component comprises a weight ratio of the hydrophobic component to the destabilizing component of approximately 10/1 to 1/2; or, approximately 7/1 to 1/1; or, approximately 5/1 to 1/1; or, approximately 3/1 to 1/1; or approximately 2/1.

In embodiments of the present application, further to comprising an appropriate relative amount of each hydrophobic and destabilizing component to achieve effective oil separation, a composite material as described herein further comprises a destabilizing component with an appropriate degree of ionization (e.g., as achieved via a solution's pH). In some embodiments, the appropriate degree of ionization is one wherein the destabilizing component is at least partially ionized. As described herein, under certain conditions where the destabilizing component is substantially neutral, its destabilizing ability was reduced. In other embodiments, the appropriate degree of ionization is one wherein the destabilizing component has a degree of ionization that is <100%. Without wishing to be bound by theory, it was considered that, under conditions where the destabilizing component has a degree of ionization that is very high (e.g., approaching 100%), the composite material comprising said destabilizing component may become too hydrophilic, and may allow water to permeate along with oil, or prevent oil permeation entirely. As would be appreciated by one skilled in the art, the appropriate degree of ionization would depend on the type of destabilizing component used. As would be further understood by one skilled in the art, an appropriate degree of ionization is typically determined via routine experimentation.

Further, it was considered that, for some embodiments, oil and water emulsions comprising a very high surfactant loading may impede effective oil separation. Without wishing to be bound by theory, it was considered that, at a high enough loading, surfactants may go into the oil phase of an oil and water emulsion, and become associated with the hydrophobic component of a composite material's coating. It was considered that such an association would render the composite material less than effective. However, without further being bound by theory, it was considered that use of a fluorinated hydrophobic component (e.g., highly fluorinated, perfluorinated, etc.) would prevent or impede such surfactant-associations; and, that thus, a composite material as described herein would maintain effective oil separation regardless of an emulsion's surfactant loading.

There are several ways that a coating as herein described can be disposed on a permeable substrate. In embodiments of the present application, depending on the nature of the substrate (e.g., scaffold) material, disposition/attachment of the coating on (e.g., disposed via direct grafting) or proximal to (e.g., disposed via a binding component) a substrate is possible via a covalent bond; non-covalent forces, such as, for example, absorption, adsorption, impregnation, chemisorption, physisorption; and/or, inter- and intra-molecular bonds. The coating may be disposed on the substrate via its hydrophobic component, its destabilizing component, a moiety of either the hydrophobic component or the destabilizing component for binding to the substrate, or a combination thereof. In other embodiments, the coating may be disposed on the substrate via a binding component, wherein any one, or combination of the hydrophobic or destabilizing components are grafted to said binding component. In yet other embodiments, the coating may be disposed on the substrate via a binding component that comprises any one, or combination of the hydrophobic or destabilizing components.

In some embodiments of the coating described herein, the hydrophobic component and/or destabilizing component comprises at least one polymer. In such embodiments, the at least one polymer may become disposed/connected to a substrate by coating and/or encasing the substrate and then bonding to itself through crosslinking. Another method of disposing the at least one polymer on or proximal to a scaffold is attachment by impregnation. Non-limiting examples of disposing a functional polymer on a scaffold are described below. If the polymer comprises a functional group binding component, such as hydroxyl groups, those hydroxyl groups may react with hydroxyl groups on cotton to form ether linkages. If the polymer comprises a binding component such as HEMA groups, those HEMA groups may react via ester exchange. Evidence of a bond between trimethoxysilylproypl methacrylate (TMSPMA), comprised by a polymer described herein, and cotton is described herein with reference to FIG. 5. Glycidyl methacrylate and glycidyl acrylate are further examples of binding components/moieties comprised by a polymer that are able to, or facilitate grafting/binding to substrates/scaffolds. Although not wishing to be bound by theory, it is considered that binding may occur through hydroxyl groups on fabric (e.g., cotton) surfaces opening the glycidyl epoxide rings. Generated hydroxyl groups from an initial ring-opening reaction can open other epoxide rings and thus trigger a crosslinking reaction. If glycidyl groups are used, binding may occur through both grafting and crosslinking reactions. If HEMA (2-hydroxyethyl methacrylate) or HEA (2-hydroxyl ethyl acrylate) are used as binding components, they react via ester exchange. Attack of an ester bond of one HEMA unit by a hydroxyl group of another HEMA unit leads to elimination of ethylene glycol and PHEMA- or PHEA-crosslinking. Thus, crosslinking occurs regardless of the substrate (i.e., scaffold). It is possible to photocrosslink PCEA around a substrate/scaffold such as, for example, fibers. Also, PEI-g-PDMS plus diacid can be mixed and then crosslinked around a scaffold such as, for example, fibers and/or glass beads.

It is also possible to graft a first polymer to the substrate/scaffold and, optionally, graft a second functional polymer to the scaffold. Many established methods and reactions can be used for polymer grafting. Aside from the "graft to" approach, in which one starts by making a functional polymer and then grafts the functional polymer to a surface, one can also use the "graft from" approach. In the "graft from" approach, one attaches an initiator to a surface of interest (i.e., scaffold) in a first step. One then grows a polymer chain from the initiator. In addition, one can use the "graft through" approach. In this case, one grafts a monomer on the scaffold surface. For example, in making the Janus fabric described herein, TMSPMA was grafted onto the cotton fabric surface as a first step. One then does polymerization and some polymerized chains are grafted because of incorporation of the grafted monomer into a chain via copolymerization.

One can also use a mixture of reactants rather than a single polymer to achieve a crosslinking reaction; for example, when PEI-g-PDMS is mixed with some di-acid. Spraying this mixture on substrates (e.g., filter scaffolds) and then heating it under vacuum leads to formation of PEI-crosslinks. While PEI destabilizes emulsions, PDMS is a hydrophobic moiety and effects the separation of oil from an oil and water emulsion.

In other embodiments of the present application, a substrate is used that possesses either hydrophobic or emulsion destabilizing character by the nature of what it is made from. In these cases, it is possible obtain the second component/functionality by, for example, disposing a functional polymer on to the existing substrate. For example, a substrate/scaffold that is made of hydrophobic polymers can have emulsion-destabilizing polymers disposed on it. Likewise, a substrate that possesses emulsion-destabilizing character by its nature, can have hydrophobic components (e.g., polymers) disposed on it. In this way, composite materials having two characteristics are obtained. It is possible to add the other character on one side only.

For example, a (hydrophobic) nylon fabric can have emulsion-destabilizing polymers such as those listed above disposed on it, on one face. Alternatively, a scaffold that possesses emulsion-destabilizing character such as a NAFION® membrane can have hydrophobic polymers such as those listed above disposed on it, on one face (NAFION® is a commercially available sulfonated tetrafluoroethylene based fluoropolymer-copolymer). Sintered glass filters treated in base, fiber glass filters treated in base, can have hydrophobic polymers such as those listed above disposed on it. Regarding glass in base, silanol groups are deprotonated under basic conditions to generate negative charges.

As described herein, separation of oil from oil and water mixtures using the composite materials described herein was rapid because permeable substrates (e.g., fabrics) were used that had pores with side lengths reaching 200 µm. Pores that were larger than the emulsified droplets could be used because the side of the coated substrate (e.g., fabric) comprising a destabilizing component (e.g., a polymer comprising emulsion-destabilizing moieties) destabilized emulsions and caused the micrometer-sized oil droplets to coalesce. The coalesced oil then readily filled the substrate (e.g., fabric) pores on the hydrophobic side. Although not wishing to be bound by theory, it was considered that impregnating oil on a coated substrate blocked water permeation and served as a site for additional oil deposition. Accordingly, the impregnated oil reservoirs fueled selective oil transport through the hydrophobic side of the composite material (i.e., filter). Separation of oil was thus clean because water had a low solubility in the oil and bulk water could not enter the oil-filled substrate (e.g., fabric) pores on the hydrophobic side of the substrate.

Previously, superhydrophobic/oleophilic or superoleophobic/hydrophilic filters consisting of surface-treated fabrics and metal meshes have been used for the purpose of oil and water separations. These filters are particularly effective in separating simple emulsions that are created by shearing oil/water mixtures without a surfactant. In such a simple emulsion, droplets of the minority phase readily coalesce and do so particularly facilely on fabrics and meshes that act as nucleation sites for coalescing. Because of droplet aggregation, the coalesced oil phase of an oil-in-water simple emulsion, for example, readily fills the pores of the superhydrophobic filters, and the oil plugs produced then reject water entrance but allow selective oil permeation. In the case of a superoleophobic/hydrophilic filter, water fills the pores of the filter and the water plugs produced block oil entrance but allow selective water permeation.

However, traditional large-pore filters cannot be used to separate oil or water from an emulsion stabilized by a surfactant. Surfactant-stabilized droplets normally have diameters less than ten micrometers and do not readily coalesce. Should such a filtration be undertaken using a superhydrophobic fabric with pores sized at hundreds of micrometers, emulsified oil droplets would not coalesce and could not plug the fabric pores. Rather, they would be rejected together with their surrounding water by the filter.

To separate components of an emulsion, pore sizes of filters traditionally used need to be comparable with or smaller than those of the emulsified droplets. Under these conditions, filling pores would not require droplet fusion but only slight droplet deformation. Thus, polymer membranes with pore diameters smaller than several micrometers have been used for this task. To use metal meshes, their pore sizes of tens of micrometers had to be first reduced. This was achieved via deposition of a surface-active polymer onto the mesh wires or via growth of inorganic nanostructures from them. However, separation rates of a filter are proportional to the cross-sectional area of its pores and decreasing the pore sizes decreases the filter's separation rate.

As described by studies herein, emulsified oil was separated at large filter pore sizes with a herein described composite material: a Janus fabric scaffold, which coalesced emulsified oil droplets on one side and provided selective oil permeation on the other side. In an embodiment of preparing this composite material, a Janus fabric, PDMAEMA and PDMS were grafted onto opposite faces of a cotton fabric. That is, PDMAEMA was grafted on one face of the fabric, and PDMS was grafted on the other face of the fabric. PDMAEMA was selected because it could ionize in water and coalesce emulsion droplets by screening electrostatic repulsion. PDMS was used because of its low surface tension of 20 mN/m and its ability to render cotton fabrics superhydrophobic.

Figure 1B:
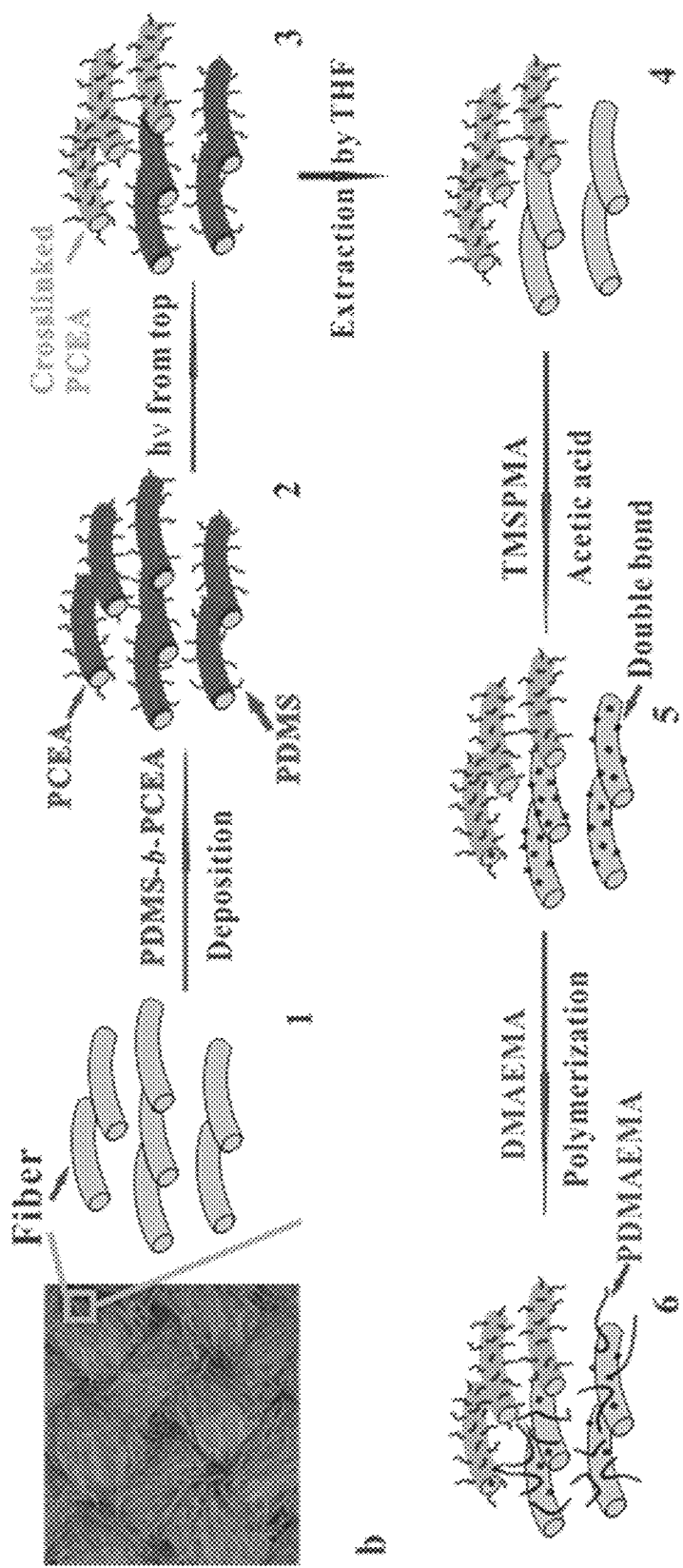
FIG. 1B depicts a schematic view of events occurring on surfaces of a short section of seven fibers in a fabric thread during composite material Janus fabric preparation.

To prepare such a Janus cotton fabric, all fibers of the fabric were first coated with a brush layer of a diblock copolymer PDMS-b-PCEA (see structural formula in FIG. 1). In this brush layer, PCEA preferentially coated the individual cotton fibers and PDMS chains were exposed to air (see 1→2 in FIG. 1B). To crosslink the PCEA layer on only one side of the fabric, one side of the coated fabric was irradiated with UV light (see 2→3). In the third step, the irradiated fabric was extracted in hot THF to remove any PDMS-b-PCEA that was not sufficiently crosslinked (see 3→4). This treatment yielded fabric with a hydrophobic gradient that decreased from being superhydrophobic on the irradiated side to water absorbing on the non-irradiated side. Subsequently, propyl methacrylate groups were grafted onto the fibers on the hydrophilic side using sol-gel chemistry of TMSPMA catalyzed by acetic acid (4→5). To graft PDMAEMA chains, the modified fabric was then immersed into a DMAEMA solution in THF containing initiator azobisisobutyronitrile. Free radical copolymerization of the propyl methacrylate double bonds on the fiber surfaces with DMAEMA yielded grafted PDMAEMA chains (5→6).

As described herein, a plain-weave fabric that had side lengths reaching 200 μm for inter-thread pores was used. To produce a Janus fabric, a PDMS-b-PCEA-coated fabric was irradiated on one side for 5 min and then any uncrosslinked polymer was extracted with hot THF. The amount of polymer retained at this stage was determined in two ways, first by monitoring weight gain with a microbalance [(4.8±1.3) wt %], and second, by thermogravimetric analysis (TGA) [(5.1±4.7) wt %]. To confirm the Janus property of the fabric, dyed water was dispensed on the irradiated and non-irradiated sides. While the water beaded up on the irradiated side of the fabric, it readily wetted the non-irradiated side.

Going through steps 4→6 of the reaction scheme in FIG. 1B allowed PDMAEMA to be grafted onto the fabric. The success of the grafting step was confirmed by infrared spectroscopic analysis. The amount of grafted PDMAEMA increased as monomer concentration in the solution of polymerizing DMAEMA increased. However, optimization experiments demonstrated that high grafted PDMAEMA amounts adversely affected oil/water separation (see FIG. 8). Without wishing to be bound by theory, it was considered that grafting too much PDMAEMA onto the fabric eventually forces some PDMAEMA chains into space occupied by existing PDMS chains, thus degrading the hydrophobicity of the PDMS side. It was also considered that too much PDMAEMA may make the hydrophilic side too hydrophilic for oil to permeate, particularly for at a low pH when PDMAEMA is protonated. Without wishing to be bound by theory, this was considered a consequence of preparation method, and that it could be addressed by using lower monomer concentrations or implementing other methods for making composite materials of the present application, as described herein. Thus, results other than those reported in FIG. 8 were obtained using fabrics that were treated under optimized conditions and had a grafted PDMAEMA mass fraction of (0.9±0.3) wt % and (0.8±0.1) wt % as determined by TGA and microbalance, respectively (see Examples 1-13).

Further visual evidence supporting PDMAEMA grafting was the pH dependence of the de-emulsification capability of PDMAEMA-bearing fabrics. In such an experiment, pristine cotton fabric swatches, at 1.5×1.5 cm² each, were grafted with PDMAEMA by going through steps 4→6 of FIG. 1B. Fabrics were then equilibrated with dilute HCl or NaOH solutions that had final solution pH values of 5.2, 8.3, 10.3, and 11.7, respectively. These swatches were subsequently rinsed in THF/water at v/v=5/5, dried under vacuum, and inserted into vials that each contained 20.0 mL of a HD-in-water emulsion at a hexadecane volume fraction $f_H$ of 20%. At 60 min after the addition of a fabric into each vial, the extent of phase separation or de-emulsification decreased as the fabric equilibration pH increased. Although not wishing to be bound by theory, it was considered that, in some embodiments, this behavior may be due to grafted PDMAEMA chains whose degree of protonation decreased as the fabric treatment pH increased.

Composite material Janus fabric samples thus prepared under optimized conditions remained superhydrophobic on the PDMS-coated side with a high water contact angle (153±2°). Thus, the fabric could be used to separate various simple oil/water mixtures (e.g., not surfactant-stabilized emulsions) by filtration regardless of whether its PDMS-coated side or its PDMAEMA-coated side faced the feed mixture. Fabric orientation was inconsequential in this case because the PDMAEMA-coated side had no selectivity towards either water or oil, as there was no surfactant to be destabilized and the PDMAEMA was not so highly protonated as to render its side too hydrophilic. When it faced a simple mixture, both HD and water permeated the PDMAEMA-coated side, and only HD then permeated the PDMS-coated side. When the PDMS-coated side faced the feed, only HD entered the fabric pores and permeated the fabric.

In contrast, however, it was found that the Janus fabric composite material separated oil from oil-in-water emulsions only if the PDMAEMA-coated side faced the feed emulsions. Fabric orientation was important in these cases because no liquid permeated the fabric when the PDMS-coated side faced a feed emulsion. The PDMS-coated side rejected emulsions including the HD droplets because the HD droplets were small at (3.7±0.6) μm and were too stable to coalesce. Although not wishing to be bound by theory, it was considered that only aggregates that had sizes larger than or comparable with the pore sizes would readily fill the pores surrounded by PDMS-coated fibers.

Figure 2A:
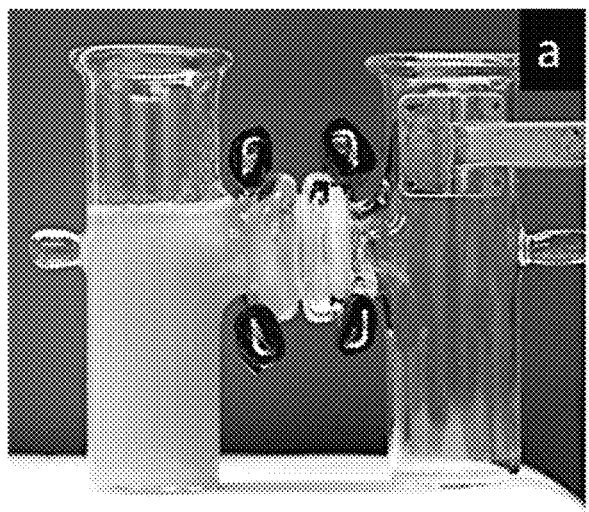
FIGS. 2A and 2B depicts photographs of a separation experiment at (A) time t=0 and (B) t=300 s after 40.0 mL of a hexadecane (HD) emulsion at $f_H$=20% (volume fraction of oil in an oil-in-water emulsion) was added into a left cell of a H-shaped device.
Figure 2B:
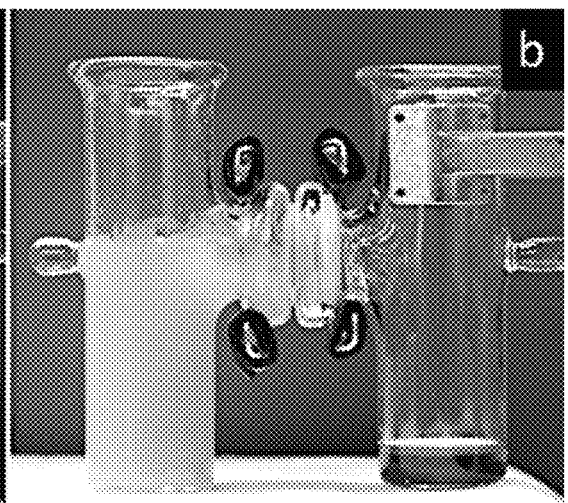

As described herein, two H-shaped devices (one small, one large) were used to separate oil and water mixtures, such as an HD-in-water emulsion at $f_H$=20%, using herein described composite materials. FIGS. 2A and 2B show a photograph of an H-shaped device. The two half-cells of each device were connected via two perforated rubber disks and were held in place with a clamp. Sandwiched between the perforated disks was a composite material fabric filter. To start an experiment, either 10.0 or 40.0 mL of the emulsion was poured into the left cell of the smaller H-shaped or the larger H-shaped device, respectively, and each was magnetically stirred. While the emulsion shown in FIG. 2A was cloudy as expected, it exhibited a reddish tint since the HD phase was doped with a hydrophobic red dye (Oil Red O, available from Sigma-Aldrich). FIG. 2B is a photograph that shows the system status 300 s after the emulsion was added to the left cell. A clear red liquid permeated the composite material fabric that was pre-treated at pH 11.7 and was collected in the right cell. Moreover, the residual mixture in the left cell had lost most of its reddish tint. These observations suggest the selective permeation of HD. $^1$H NMR analysis confirmed that the permeated liquid was HD that was free of detectable water.

As described above, a uniform coating approach for preparing effective oil-separating filters has been developed. In an example, all fibers of a fabric swatch were coated with a pre-made copolymer, specifically, PDMAEMA-b-[P(MMA-r-HEMA)-g-PDMS] or [P(MMA-r-HEMA)-g-PDMS]-b-PDMAEMA (where: for PDMAEMA-b-[P(MMA-r-HEMA)-g-PDMS], PDMAEMA was made first; and, for [P(MMA-r-HEMA)-g-PDMS]-b-PDMAEMA, PDMAEMA was made second). One of the copolymer's components (e.g., functional groups) was a binding component that allowed this copolymer to bind with the substrate/scaffold (i.e., P(MMA-r-HEMA)). In a non-limiting example, the binding component may comprise a hydroxyl group or P(MMA-r-HEMA). By way of further example, a polymer's hydroxyl groups may bind to cotton's hydroxyl groups via a grating reaction at temperatures of about 170° C.; or, HEMA and MMA units of different chains may condense to eliminate methanol and ethylene glycol to form a crosslinked layer on a substrate. The second component (e.g., type of functional group) was hydrophobic, for example, PDMS. The third component (e.g., type of functional group) was destabilizing (i.e., emulsion breaking), for example, PDMAEMA.

By adjusting relative chain lengths of the hydrophobic and emulsion breaking (i.e., destabilizing) polymer blocks it was possible to achieve the same effect as that seen with Janus fabric composite materials. For example, it was found that, when the repeat unit number of the hydrophobic component PDMS was, for example, about 3 times that of destabilizing component PDMAEMA, and the fabric was exposed to air, PDMS units covered the polymer coating and the fabric was superhydrophobic. It was considered that PDMS would occur on the surface of the coating because of its lower surface tension relative to PDMAEMA. It was further found that upon contacting an oil and water emulsion, a surface restructuring occurred where the water-soluble PDMAEMA units rose to the top (e.g., broke through the original PDMS layer and extended over the then sunken PDMS layer) and the touching side became hydrophilic. The emerged PDMAEMA chains then caused the emulsion droplets to coagulate and for aggregated oil to fill pores on the fabric's superhydrophobic side; and the oil-impregnated side remained hydrophobic even upon long contact with water. Without wishing to be bound by theory, it is expected that such surface restructuring occurs in any coating having polymer blocks comprising a destabilizing component or hydrophobic component. In a non-limiting example, surface restructuring is expected to occur in a coating made from P(MMA-r-DMAEMA)-g-PDMS or P(DMAEMA-r-MMA-r-HEMA)-g-PDMS. Although P(MMA-r-DMAEMA) is a random copolymer, DMAEMA may still exist as blocks if the molar fraction of DMAEMA $f_D$ is high. For example, the average repeat units of such blocks is given by $1/(1-f_P)$, where at $f_P$=90%, the average length is 10.

By way of further example, it was found that shorter PDMAEMA chains (i.e., destabilizing component) lowered the demulsification efficiency, but resulted in a higher hydrophobicity of the final coated cotton. However, if a PDMAEMA chain is too long, it may affect the hydrophobicity of the final composite material coated cotton, although demulsification efficiency would be higher. As would be understood by one skilled in the art, modulating relative amounts of hydrophobic and destabilizing components in a coating (e.g., in this embodiment, by varying chain length of polymer components) would provide a final coated substrate with efficient function. Different types of architectures for such tri-functional polymers are described herein.

In an embodiment of the above-described uniform coating, a first type of architecture used for trifunctional polymers was PDMAEMA-b-[P(MMA-r-HEMA)-g-PDMS] or [P(MMA-r-HEMA)-g-PDMS]-b-PDMAEMA, which is a diblock copolymer. One of its blocks is PDMAEMA, and the other block is graft copolymer [P(MMA-r-HEMA)-g-PDMS]. While the main chain of the graft copolymer is a random copolymer of MMA and HEMA, the side chains are PDMS. A second type of architecture used for trifunctional polymers was P(DMAEMA-r-MMA-r-HEMA)-g-PDMS or P(DMAEMA-r-MMA)-g-PDMS, which is a simple graft copolymer. The main chain of the graft copolymer is a random copolymer of DMAEMA, MMA and HEMA, while the side chains are PDMS. Composite material coated fabrics with such trifunctional copolymers were able to de-emulsify and separate oil from oil-in-water emulsions (see FIG. 10A).

Referring to FIG. 1A, structural formulae are shown for PDMS-b-PCEA and PDMAEMA. Referring to FIG. 1B, a schematic view is shown of events occurring on surfaces of a short section of seven fibers in a fabric thread during Janus fabric composite material preparation. Although PCEA crosslinking density on the fibers should decrease gradually from the top to the bottom of a thread (i.e., a distribution that generates a hydrophobicity gradient between outward-facing surfaces, wherein one face is hydrophobic and the other face is hydrophilic), the abrupt decrease shown is an intentional exaggeration.

Referring to FIGS. 2A and 2B, shown are photographs of a separation experiment at (A) time t=0 and (B) t=300 s after 40.0 mL of a HD emulsion at $f_H$=20% was added into the left cell of a larger H-shaped device.

Figure 3A:
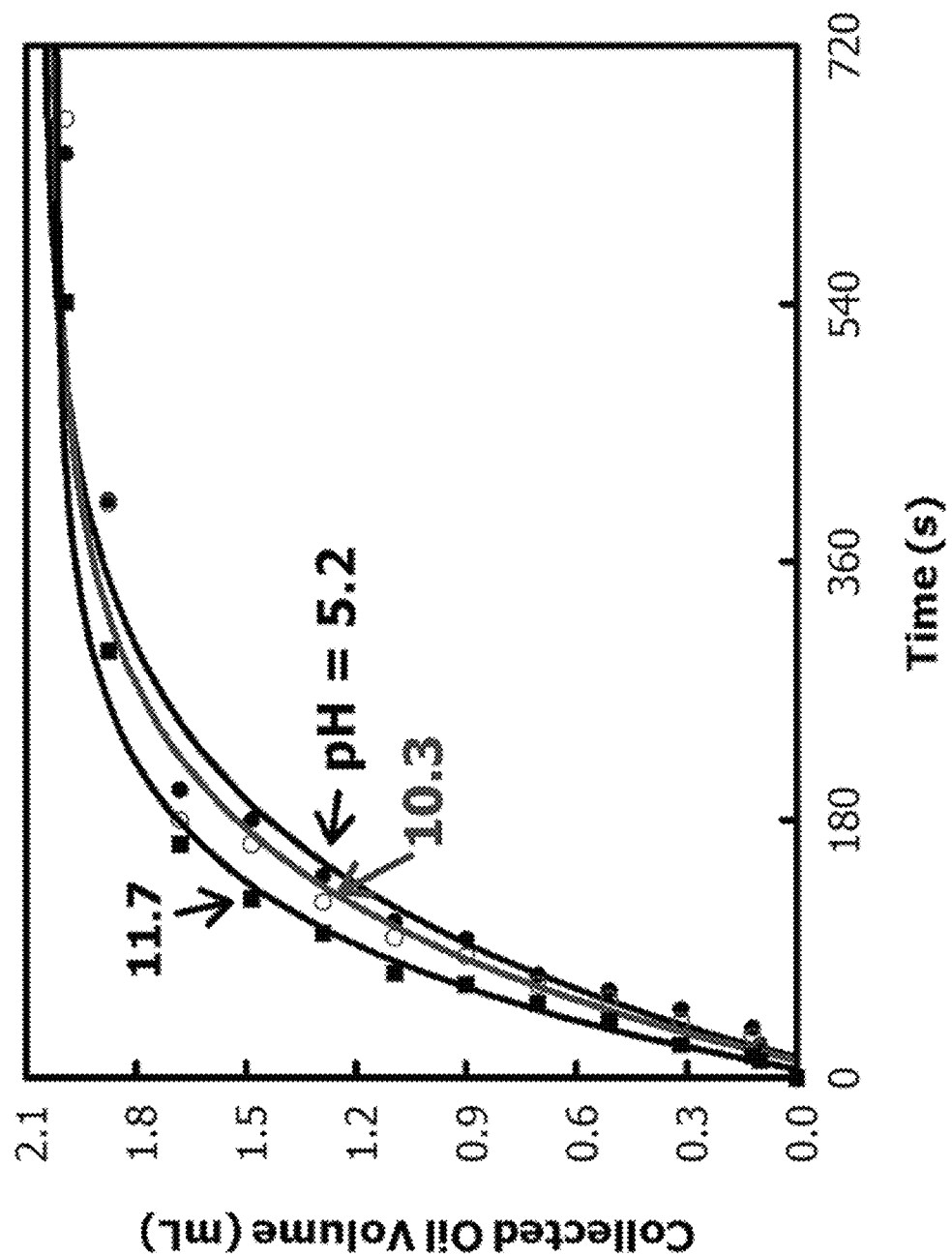
FIG. 3A graphically depicts increases in volume of HD collected in right cell after 10.0 mL of a HD emulsion at $f_H$=20% was added into left cell of a smaller H-shaped device. pH values denote those of aqueous solutions in which the fabric samples were equilibrated before they were cleaned, dried, and used.
Figure 3B:
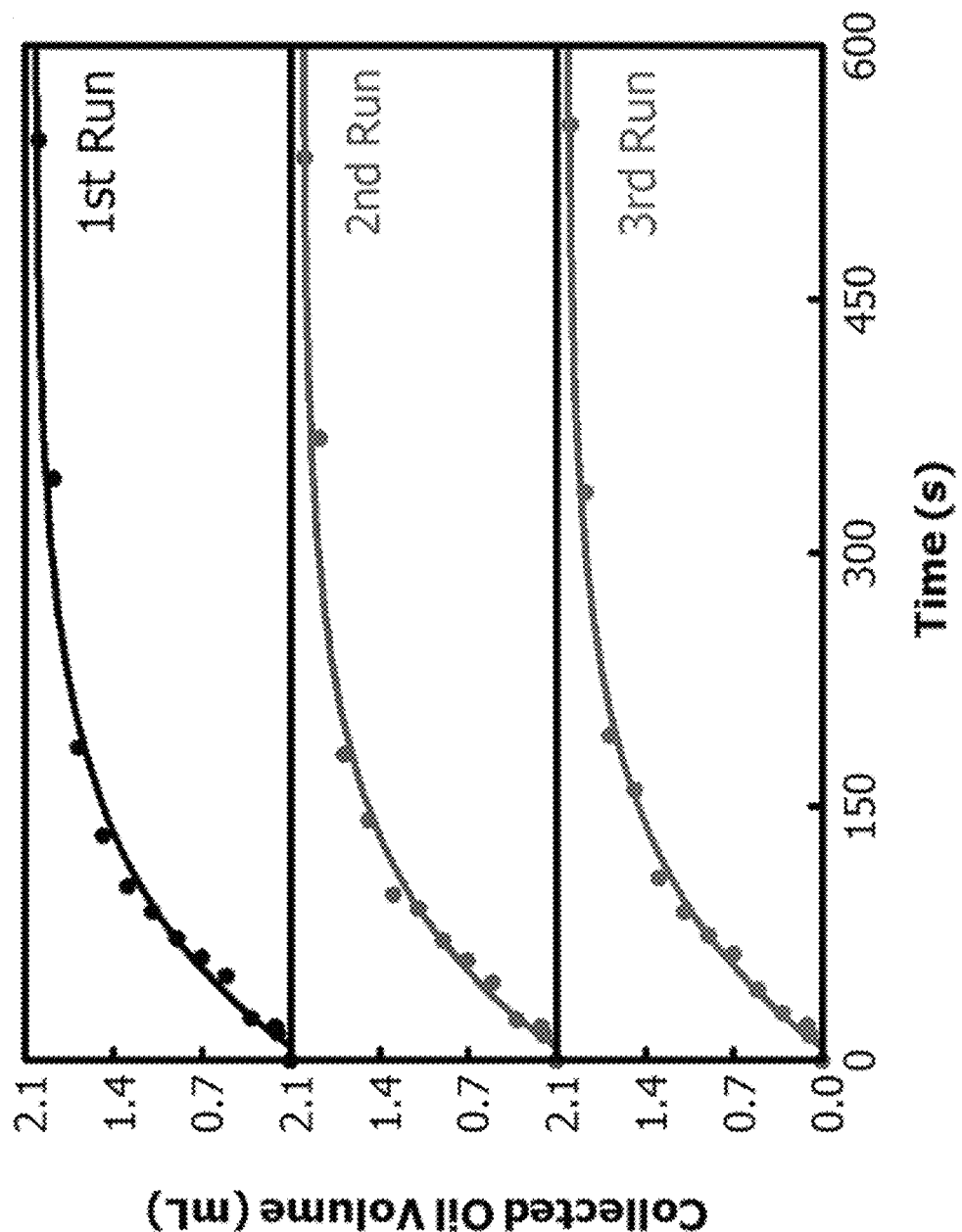
FIG. 3B depicts data for three consecutive experiments showing increases with time in volume of HD collected in right cell of the smaller H-shaped device.

Referring to FIGS. 3A and 3B, plots of data collected using a smaller H-shaped device is shown. The volume of HD collected in the right cell increased with time after 10.0 mL of a HD emulsion at $f_H$=20% was added to the left half cell. The three sets of data were obtained using composite material (i.e., fabric) swatches that had been previously equilibrated in water at pH values of 5.2, 10.3, and 11.7, respectively. Oil separation rate was constant within experimental error or increased slightly as the fabric treatment pH increased. These trends differed from other studies where the de-emulsification ability of the fabric samples decreased as the fabric treatment pH increased. Although not wishing to be bound by theory, this discrepancy may be explained by the fact that, for at least this embodiment, HD separation involved more than just de-emulsification, but involved at least three steps: (i) diffusion of HD droplets to the vicinity of PDMAEMA chains; (ii) coalescence of HD droplets; and, (iii) transportation of the coalesced HD phase through the fabric with a hydrophobicity gradient. Thus, increasing the demulsification rate alone did not necessarily increase HD permeation rate. Rather, the increased number of charged DMAEMA units at lower composite material (i.e., fabric) treatment pH values could have inhibited HD transportation through the asymmetric fabric.

Using the slope of a straight line constructed from the initial three points of the permeation data of FIG. 3A, it was possible to obtain a permeation rate of 0.021 mL/s for the pH=11.7 fabric. This rate together with the permeation area of 0.50 cm² yielded a high flux of 1.5×10³ L·m⁻²·h⁻¹. Another important feature of the data of FIG. 3A was that the final collected HD volume approached the theoretical value of 2.0 mL in each trial. Thus, the separation was efficient.

Referring to FIG. 3B, data is shown for three consecutive separations that were performed using the same composite material fabric filter. In each case, reagents from a previous trial were removed before another 10.0 mL of emulsion was added to the feed side of the cell. The consecutive use of the composite material fabric filter did not change the oil permeation kinetics or the final collected oil volume, which was 2.0 mL. This conclusion was further confirmed by comparing fitting parameters generated from treating the different sets of experimental data.

For the separation of HD at $f_H$=1.0%, a 500-mL three-neck round-bottomed flask with one mouth covered by an asymmetric (i.e., Janus) composite material fabric filter was used. Starting with 300 mL of an emulsion, the separated HD amount reached 2.1 g by 1.5 h and 2.2 g by 15 h. The latter mass translated into a HD volume of 2.9 mL, which was very close to or the same as 3.0 mL that was in the original emulsion. Thus, by the end of the separation, no more than 0.1 mL of HD was present in 297 mL of water. Thus, the separation limit of this technique was below 0.03 vol % of HD. Thus, the separation was highly efficient (see FIG. 10B).

HD was also separated from HD-in-water emulsions at $f_H$=10% and 30% using the composite material Janus fabric comprising PDMS grafted onto one side, and PDMAEMA onto the other side. In addition, oil was separated from oil-in-water emulsions where "oil" was toluene and chlorobenzene (see FIG. 11).

Referring to FIGS. 4A-C, SEM images are shown of uncoated cotton fabric, PDMS-b-PCEA coated side, and PDMAEMA-coated side of Janus cotton fabric composite material. After being coated with PDMS-b-PCEA and PDMAEMA on different sides, the cotton fibers did not show obvious change in their surface morphologies.

Figure 5:
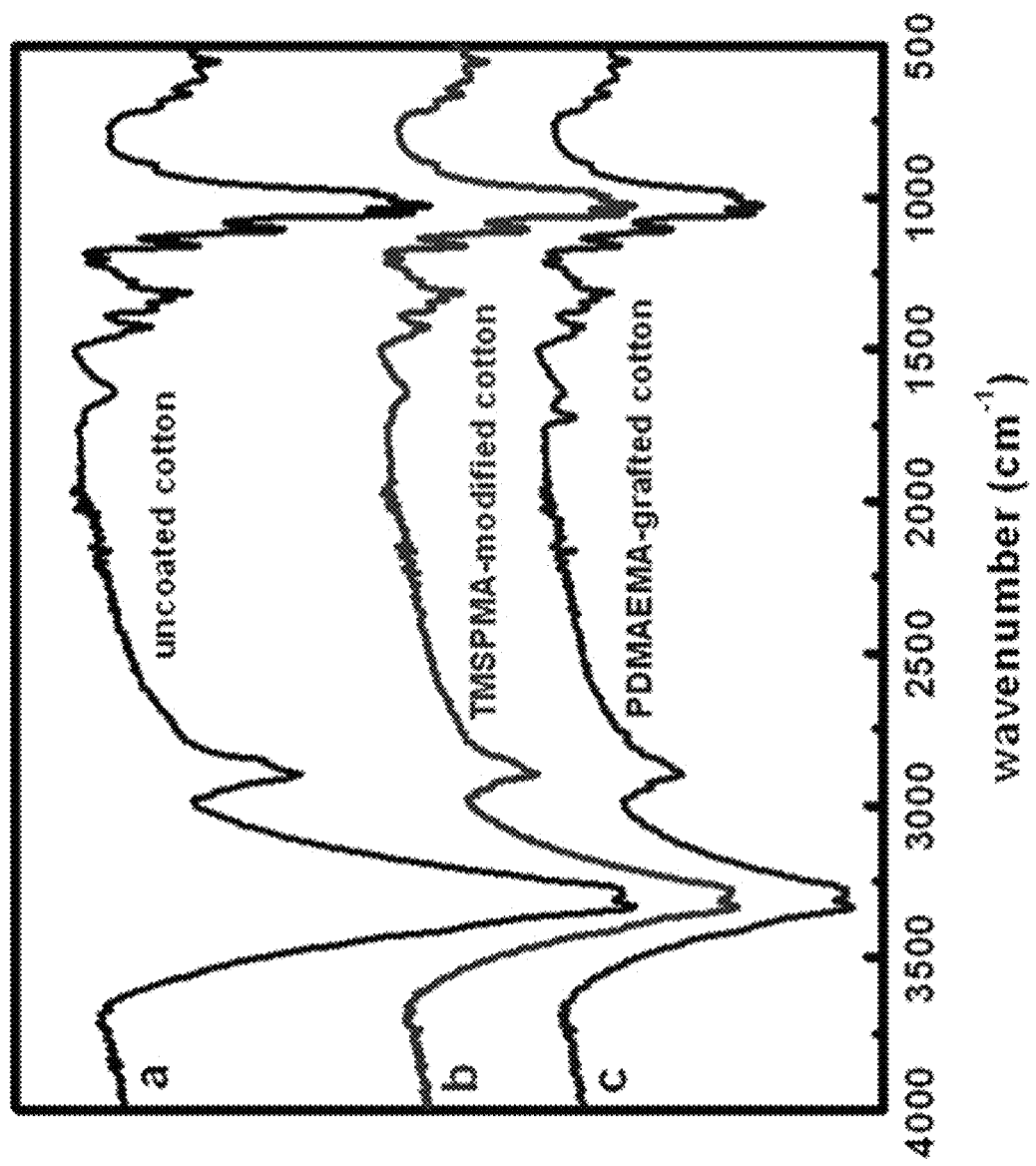
FIG. 5 (with traces a-c) depicts IR spectra of (a) uncoated cotton, (b) TMSPMA-modified cotton and (c) PDMAEMA grafted cotton.

Referring to FIG. 5, and its traces A-C, IR spectra are shown of uncoated cotton, a TMSPMA-modified cotton and a PDMAEMA grafted cotton. Interestingly, a new peak at 1730 cm⁻¹ appeared after grafting PDMAEMA. This peak was due to the stretching vibration of carbonyl groups of DMAEMA. This new peak indicated a successful grafting of PDMAEMA, and also indirectly confirmed the previous reaction between TMSPMA and cotton because PDMAEMA could not graft to or from a cotton surface in the absence of TMSPMA.

Figure 6A:
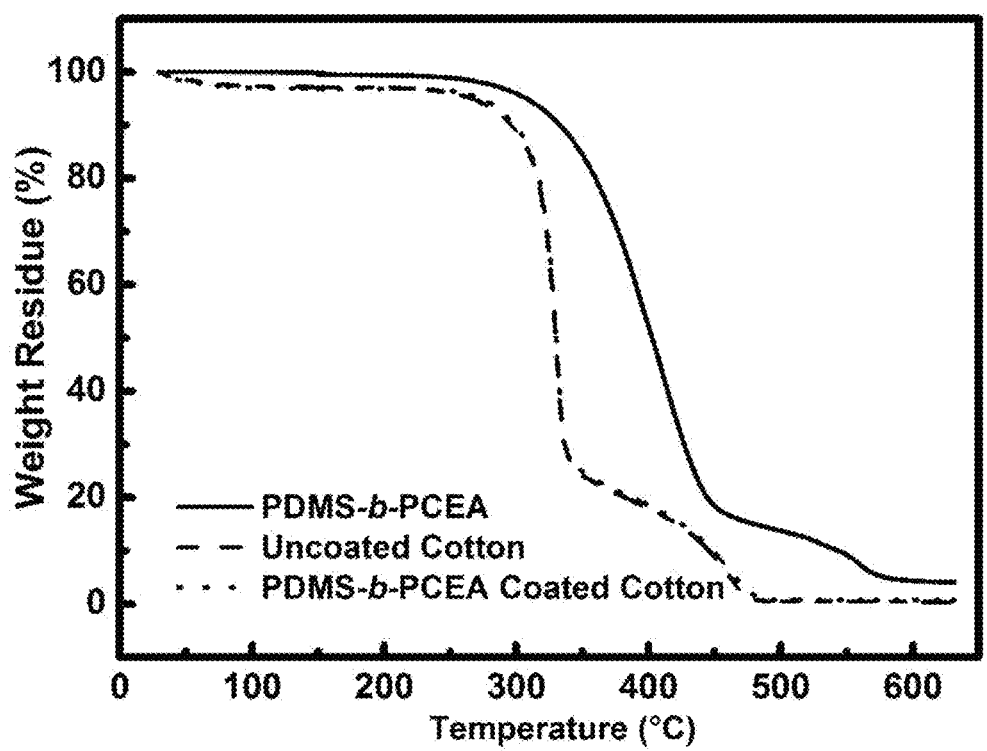
FIGS. 6A and 6B depict TGA traces of (a) uncoated cotton, PDMS-b-PCEA and cotton with one-side coated by PDMS-b-PCEA, and (b) TMSPMA-modified cotton, PDMAEMA homopolymer and PDMAEMA-grafted cotton.
Figure 6B:
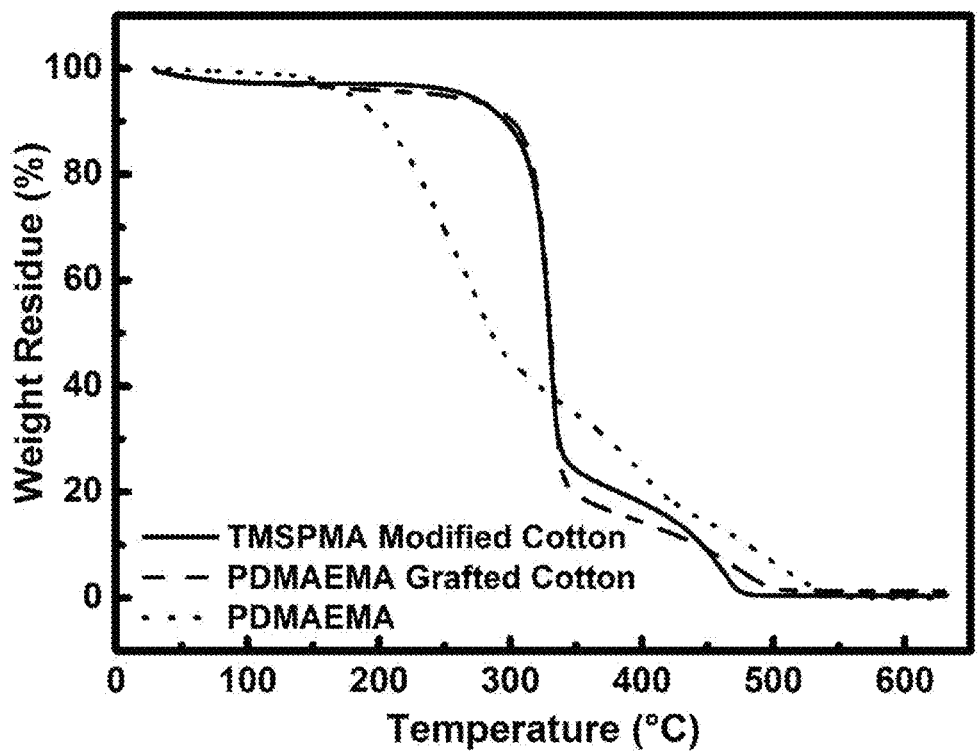

Referring to FIGS. 6A and 6B, TGA traces are shown of uncoated cotton, PDMS-b-PCEA, and cotton with one-side coated by PDMS-b-PCEA (FIG. 6A); and, TMSPMA-modified cotton, PDMAEMA homopolymer, and PDMAEMA-grafted cotton (FIG. 6B). To determine the weight fraction x of grafted PDMS-b-PCEA on half-coated cotton fabric, the residual weight percent was determined at 600° C. of the uncoated fabric ($R_c$), PDMS-b-PCEA ($R_p$), and cotton fabric half coated by PDMS-b-PCEA ($R_{pc}$). Then, eq. (S1) was used to calculate x.

$$(1-x)R_c + xR_p = R_{pc} \quad (S1)$$

Referring to FIG. 6A, $R_c$, $R_p$ and $R_{pc}$ values were determined to be (0.411±0.068)%, (3.874±0.341)%, and (0.589±0.024)%, respectively, from TGA analysis for each sample in triplet. The use of eq. (S1) yielded an x value of (5.1±4.7)%.

To determine the amount of PDMAEMA grafted in the last step of asymmetric (i.e., Janus) synthesis, the product at stage 5 in FIG. 1B (denoted as TMSPMA Modified Cotton in FIG. 6B) was used to yield the $R_c$ value. TGA analyses of PDMAEMA and the final asymmetric (i.e., Janus) fabric (denoted as PDMAEMA Grafted Cotton in FIG. 6B) yielded $R_p$ and $R_{pc}$, respectively. FIG. 6B shows TGA curves of TMSPMA-modified cotton, PDMAEMA homopolymer, and PDMAEMA-grafted cotton. Based on the $R_c$, $R_p$ and $R_{pc}$ of (0.916±0.006)%, (0.479±0.008)% and (0.912±0.010)% this time, the grafted PDMAEMA amount x of (0.9±0.3)% was calculated using eq. S1.

Figure 7A:
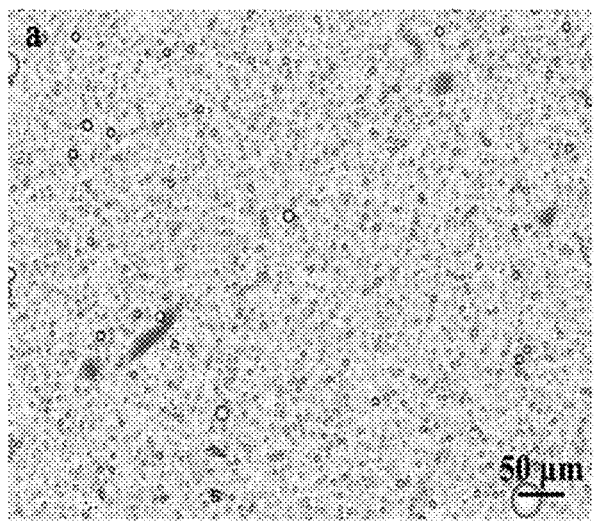
FIGS. 7A and 7B depict optical microscopy images of (a) 20:80 (v:v) hexadecane-in-water emulsion and (b) corresponding filtrate after emulsion was separated by a composite material Janus cotton fabric which was pre-processed in pH=11.7 water before cleaning, drying, and using.
Figure 7B:
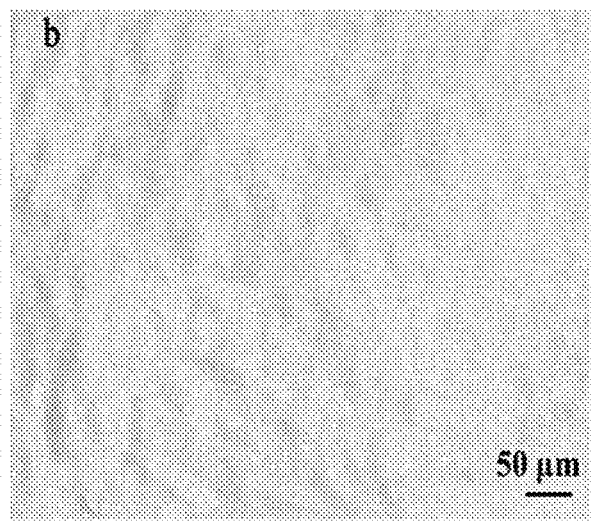

Referring to FIGS. 7A and 7B, optical microscopy images are shown of a hexadecane-in-water emulsion and a corresponding filtrate after the emulsion was separated by a Janus cotton fabric composite material which was pre-processed with pH=11.7. Both images were final images after background image deduction, which could minimize effects of dirt or scratches on lens. This study indicated that the hexadecane was well dispersed in water in the presence of SDS. After separation by the Janus cotton fabric composite material, no droplet could be observed in the filtrate under optical microscopy.

Figure 8:
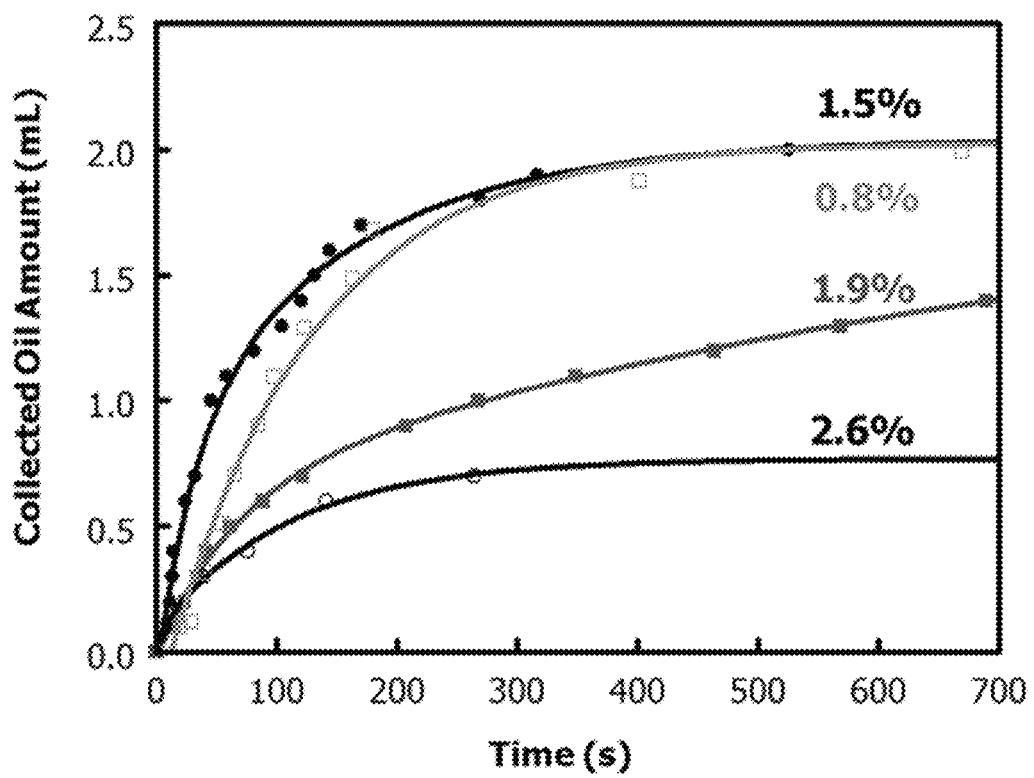
FIG. 8 graphically depicts effect of varying grafted PDMAEMA amount on hexadecane permeation (i.e. Collected oil amount, mL). Grafted PDMAEMA amounts were (□) (0.8±0.1) wt %, (●) (1.5±0.1) wt %, (■) (1.9±0.2) wt % and (○) (2.6±0.4) wt %, respectively. The smaller H-shaped cell was used for these experiments and initial feed solution had $f_H$=20% and a volume of 10.0 mL.

Referring to FIG. 8, a plot is shown quantifying effect of varying grafted PDMAEMA (i.e., destabilizing component) amount on hexadecane permeation. Grafted PDMAEMA amounts were (□) (0.8±0.1) wt %, (●) (1.5±0.1) wt %, (■) (1.9±0.2) wt % and (○) (2.6±0.4) wt %, respectively. A smaller H-shaped cell was used for these experiments and an initial feed solution had $f_H$=20% and a volume of 10.0 mL. First two composite material fabric filer samples at grafted PDMAEMA amounts of (0.8±0.1) wt % and (1.5±0.1) wt % performed essentially identically. By 700 s, hexadecane essentially fully permeated the fabric composite materials. On the other hand, the composite material fabric filer samples with the grafted PDMAEMA amounts of (1.9±0.2) wt % and (2.6±0.4) wt % did not allow full permeation of hexadecane by 700 s. In addition, the permeated hexadecane amount by 700 s decreased as the grafted PDMAEMA amount increased. For the sample at a grafted PDMAEMA amount of (2.6±0.4) wt %, permeation stopped after ~300 s.

Without wishing to be bound by theory, it was considered that the hexadecane permeation eventually stopped in the last two fabric composite material samples because water content in these fabrics eventually became too high. The fact that the water contact angle on the PDMS-coated side decreased as the grafted PDMAEMA amount increased suggested that PDMAEMA chains could be grafted not only on the side bearing regenerated cellulose fibers, wherein regenerated cellulose fibers refers to fibers from which un-crosslinked polymer has been removed, but also on fibers bearing pre-deposited PDMS chains; and, that increases in grafted PDMAEMA amounts inside fabric matrices decreased their water repellency and caused eventual formation of pore-filling water plugs on the PDMAEMA-coated side of the fabrics. Hexadecane permeation stopped because it could not permeate these water plugs. Therefore, experiments showed that a good balance of hydrophobicity and hydrophilicity across the fabric scaffold was important for good separation of oil from the emulsion.

Figure 9:
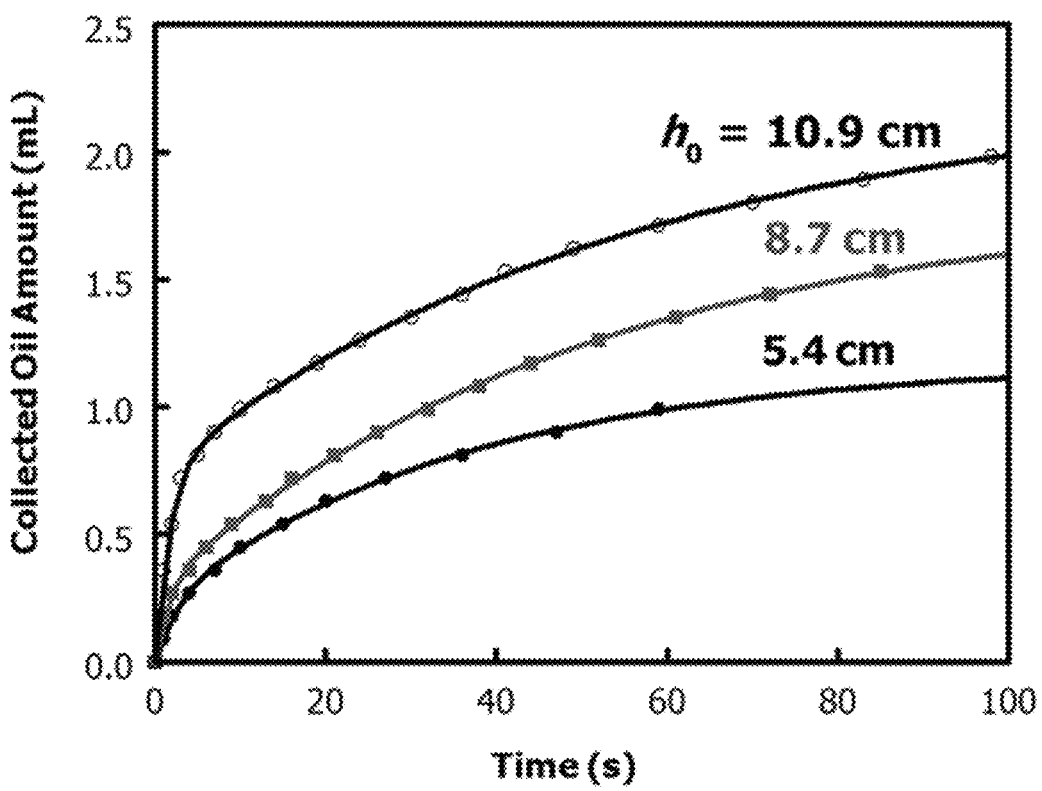
FIG. 9 graphically depicts effect of varying height or hydrostatic pressure of the emulsion on chlorobenzene permeation (i.e. Collected oil amount, mL). A burette was used for this experiment. Initial emulsion column height and volume were 5.4 cm and 5.0 mL, 8.7 cm and 8.0 mL, as well as 10.9 cm, and 10.0 mL, respectively, for three experiments. Volume fraction of chlorobenzene in the emulsion was always 20 vol %.

Referring to FIG. 9, a plot is shown quantifying an effect of varying height or hydrostatic pressure of an emulsion on chlorobenzene permeation. A burette was used for this experiment. Initial emulsion column height and volume were 5.4 cm and 5.0 mL, 8.7 cm and 8.0 mL, as well as 10.9 cm, and 10.0 mL, respectively, for the three experiments. Volume fraction of chlorobenzene in the emulsion was always 20 vol %. This data showed that full oil separation occurred in every case. The data also showed that rate of oil permeation increased as initial emulsion column height increased. Since this column height was directly proportional to hydrostatic pressure applied on the fabric or the permeating liquid, the oil permeation rate increased as the applied pressure increased.

Figure 10A:
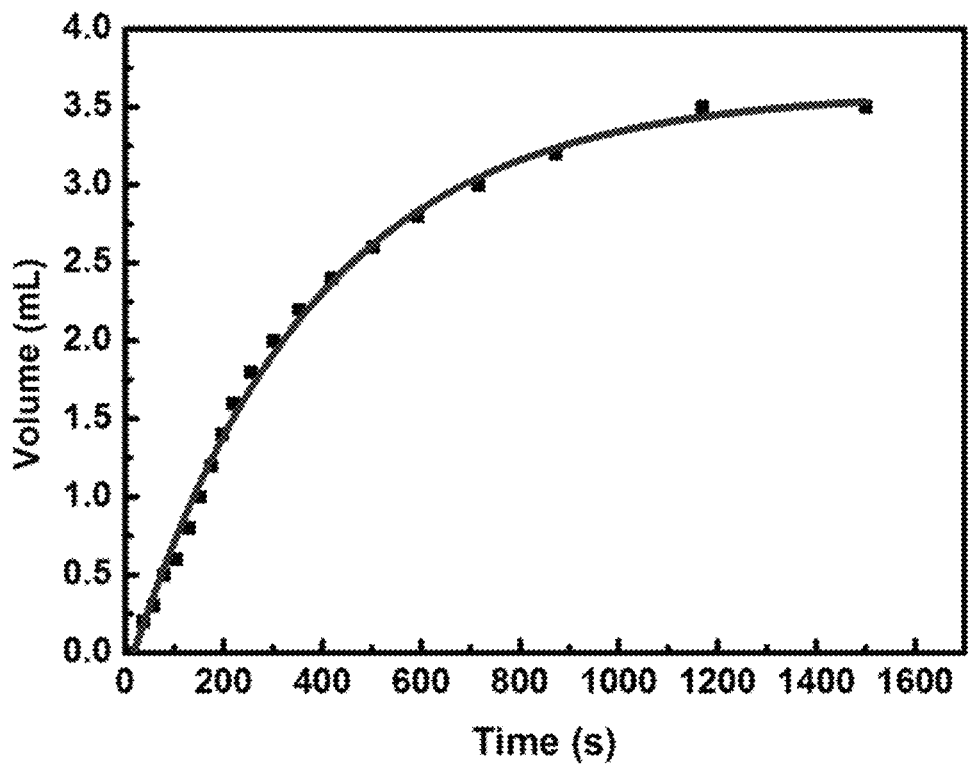
FIG. 10A graphically depicts an increase in permeated hexadecane volume (mL) as a function of time in a separation experiment using a composite material fabric coated by [P(MMA-r-HEMA)-g-PDMS]-b-PDMAEMA as a membrane. Feed emulsion was 20 mL and consisted of 20 vol % of hexadecane in water.
Figure 10B:
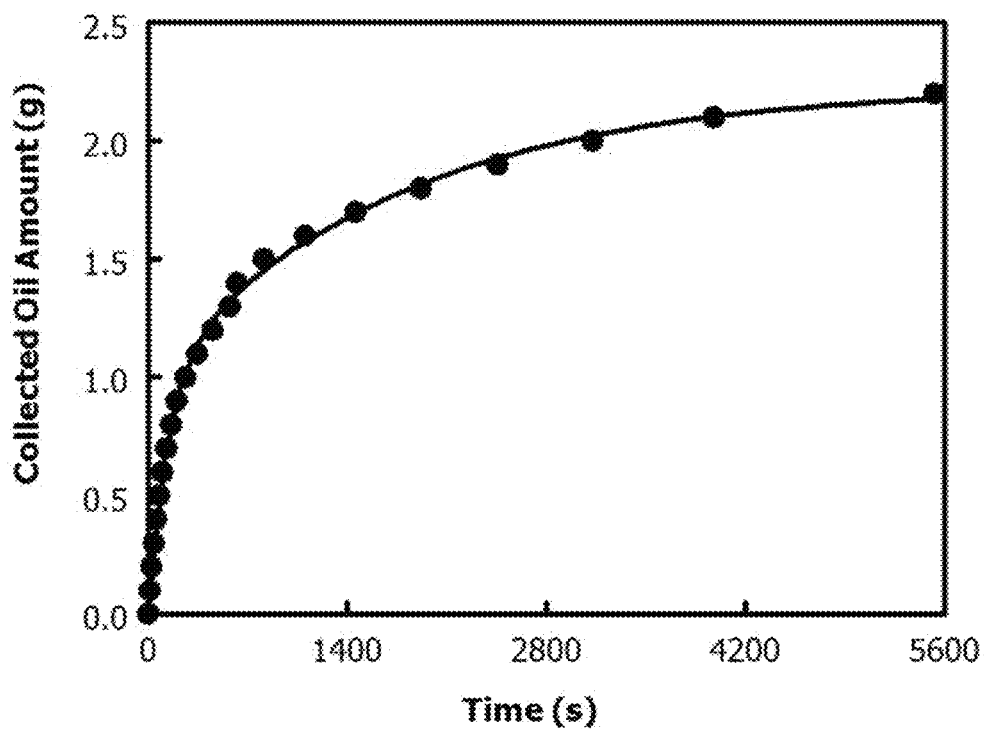
FIG. 10B graphically depicts variations in mass of HD collected (i.e. Collected oil amount, mL) in beaker as a function of time after a three-neck round-bottomed flask was tilted to start HD permeation of a composite material Janus coated cotton filter.

Referring to FIG. 10A, a plot is shown indicating an increase in permeated hexadecane volume as a function of time in a separation experiment using a composite material fabric coated by PDMAEMA-b-[P(MMA-r-HEMA)-g-PDMS] as the filter/membrane. The feed emulsion was 20 mL and consisted of 20 vol % of hexadecane in water. Referring to FIG. 10B, a plot is shown indicating variations in mass of HD collected in a beaker as a function of time after a three-neck round-bottomed flask was tilted to start HD permeation of a composite material (Janus) cotton filter.

Figure 11:
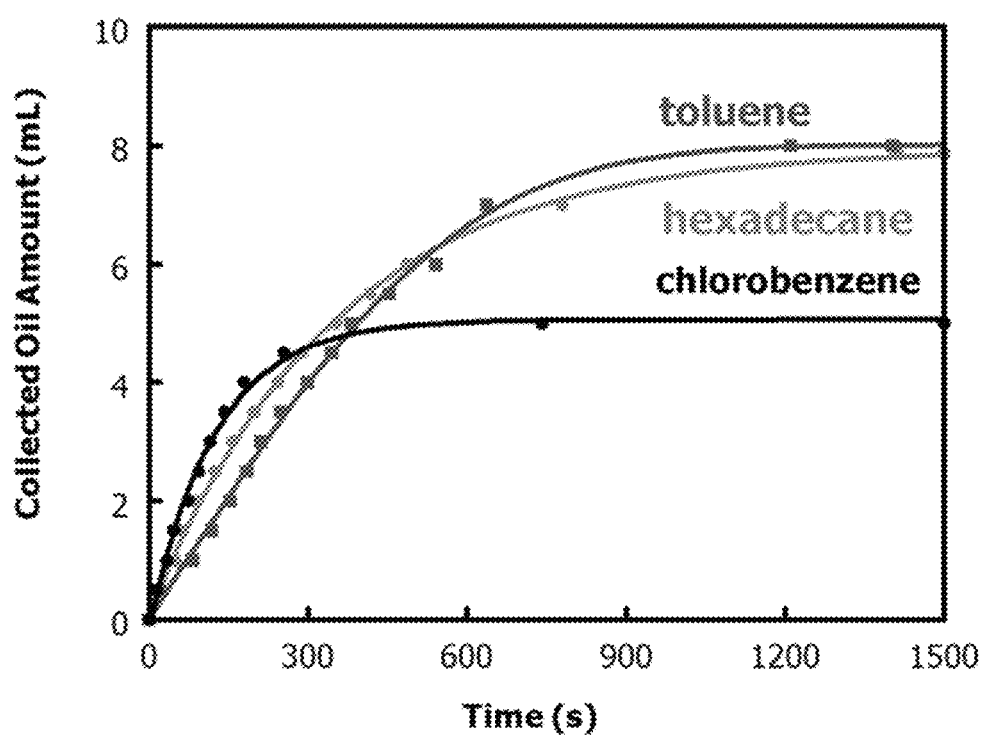
FIG. 11 graphically depicts effect of varying oil type (i.e., toluene, hexadecane, chlorobenzene) on oil permeation of a composite material cotton Janus fabric filter where a feed solution had 20 vol % of oil and a volume of 40.0 mL.

Referring to FIG. 11, a plot is shown indicating effect of varying oil type on oil permeation of a cotton Janus fabric composite material filter where a feed solution had 20 vol % of oil and a volume of 40.0 mL.

Referring to FIG. 12a, chemical structures of P1-b-$A_m$ are shown, where P1 denotes P(MMA-s-HEMA)-g-PDMS (i.e., a graft copolymer where the main chain is a random copolymer of MMA and HEMA, the side chains are PDMS) with molar fractions of 91%, 8.1%, and 0.9% for MMA (methyl methacrylate), HEMA (2-hydroxyethyl methacrylate), and PDMS-bearing HEMA units respectively. $A_m$, s, g, and b signify a PDMAEMA block of m repeat units, statistical, graft, and block, individually.

Referring to FIG. 12 b, schematic structures show the surface reconstruction that occurs when a P1-b-$A_m$-coated composite material fabric filter is first in air, and then contacted with an emulsion on an upper side. In air, the P1-b-$A_m$ coating is covered by sufficiently long, low-surface-tension PDMS chains (Structure 1, FIG. 12b). After contacting an emulsion, PDMAEMA chains rise to the top due to PDMAEMA's preferential solubility in water (Structure 2, FIG. 12b).

Referring to FIG. 13a, a plot shows variations of water contact angles with time on composite material fabric filters that were coated by P1-b-$A_m$ with m=0, 4, 18, 43, and 103, respectively. The data suggested that air-impregnated P1-b-$A_m$-coated fabrics with m>0 underwent surface reconstruction.

Referring to FIG. 13b, a photograph is shown of $f^{HD}$=20% emulsions 15 min after addition of a 1.5×1.5-cm$^2$ fabric swatch to each vial, where from left to right, fabric was coated by P1-b-$A_m$ with m=4, 18, 23, 43, and 103, respectively. The extent of HD phase separation increased as m increased; and, it was considered that de-emulsification was made possible by the PDMAEMA chains reaching the coating surface.

Referring to FIG. 13c, a photograph shows shapes of water droplets in air that had been contacting a P1-b-$A_{18}$-coated fabric impregnated with HD for 0 and 80 min, respectively. The droplets were considered to be essentially stable, exhibiting only a minor decrease from their initial contact angle of 88±2° to 82±2°.

Figure 14:
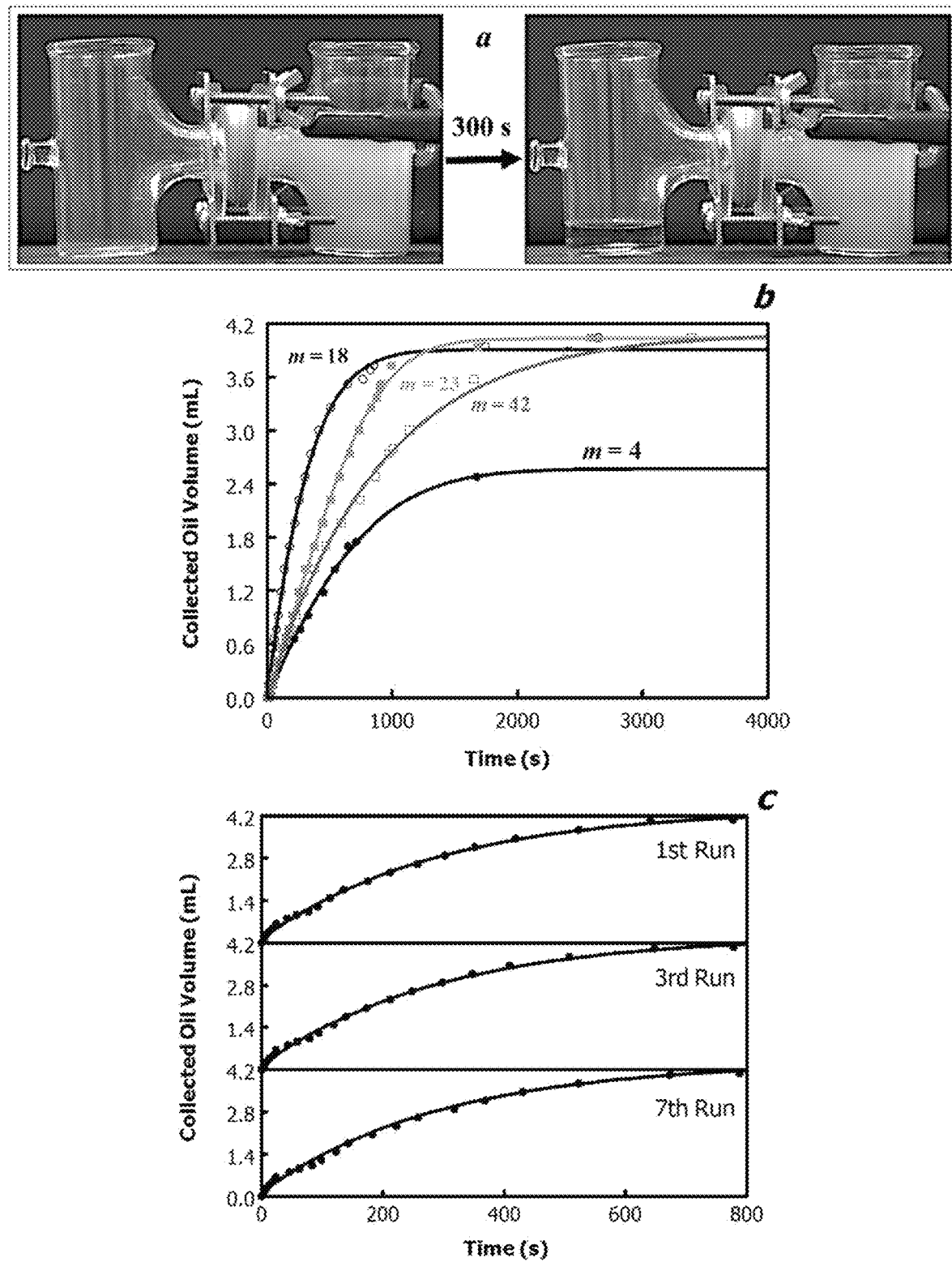
FIG. 14 depicts a) snapshots of a separation experiment immediately and 5 min after 20 mL of a dyed $f_{HD}$=20% emulsion was added into right cell of an H-shaped device; b) separation data for composite material fabrics coated by P1-b-$A_m$ at m=4, 18, 23, and 42, respectively; c) data for three separations in a series of seven consecutive trials using a P1-b-$A_{18}$-coated fabric; d) data for HD separation from 300 mL of an $f_{HD}$=1.00% emulsion; and e) separation data for emulsions containing toluene and chlorobenzene as an oily phase.
Figure 14:
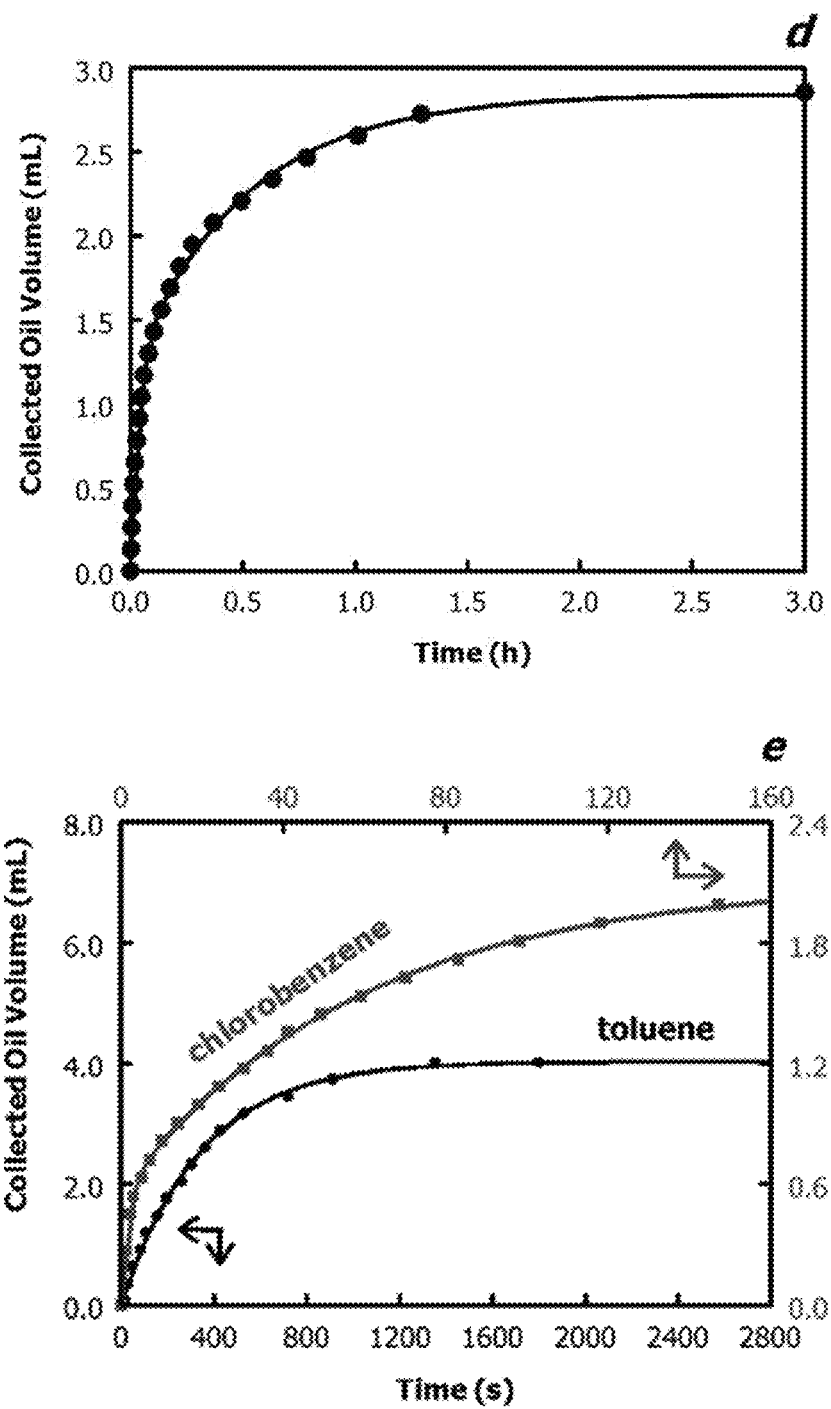

Referring to FIG. 14a, snapshots are shown of a separation experiment immediately and 5 min after 20 mL of a dyed $f_{HD}$=20% emulsion was added into right cell of an H-shaped device. Under vigorous stirring, the emulsion bombarded the composite material fabric filter and de-emulsification and separation occurred.

Referring to FIG. 14b, a plot of separation data is shown for fabrics coated by P1-b-$A_m$ at m=4, 18, 23, and 42. The plot shows how collected HD volume in the left half-cell increased with separation time when fabric swatches coated by P1-b-$A_m$ with m=4, 18, 23, and 42 were used. Data was not shown for the P1-b-$A_0$- and P1-b-$A_{105}$-coated fabric because no permeation occurred in the former case, and both de-emulsified HD and the emulsion permeated the latter fabric.

Referring to FIG. 14c, plots of data are shown for three separations in a series of seven consecutive trials using a P1-b-$A_{18}$-coated fabric. The plots compare data gathered from separations 1, 3, and 7. Even after 7 trials, it was observed that the filter's performance did not degrade.

Referring to FIG. 14d, a plot of data is shown for HD separation from 300 mL of an $f_{HD}$=1.00% emulsion. The separation occurred out of one mouth of a three-neck round-bottom flask that was covered with a coated composite material swatch: the flask was tilted so that HD could be separated.

Referring to FIG. 14e, a plot of separation data is shown for toluene-in-water and chlorobenzene-in-water emulsions containing 20 vol % of oil. A H-shaped cell was used for the former separation. The volume of fully separated toluene was expected to be 4 mL, and the volume of fully separated chlorobenzene was expected to be 2 mL; complete separation occurred in both cases.

Figure 15:
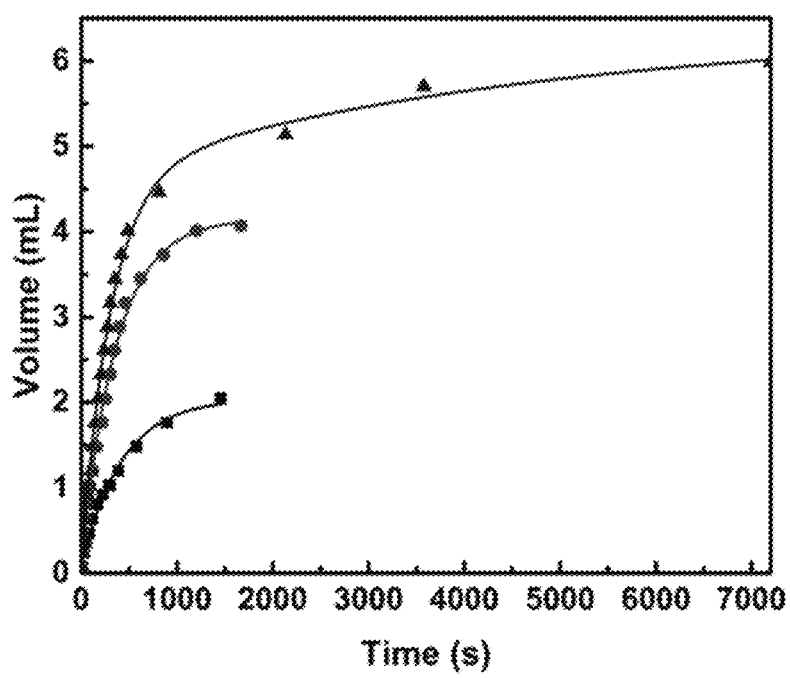
FIG. 15 graphically depicts data of HD separation using an H-shaped cell from HD-in-water emulsions at $f_{HD}$=10% (■), 20% (●), and 30% (▲), respectively.

Referring to FIG. 15, a plot of data is shown of HD separation using an H-shaped cell from HD-in-water emulsions at $f_{HD}$=10%, 20%, and 30%, respectively.

Figure 16:
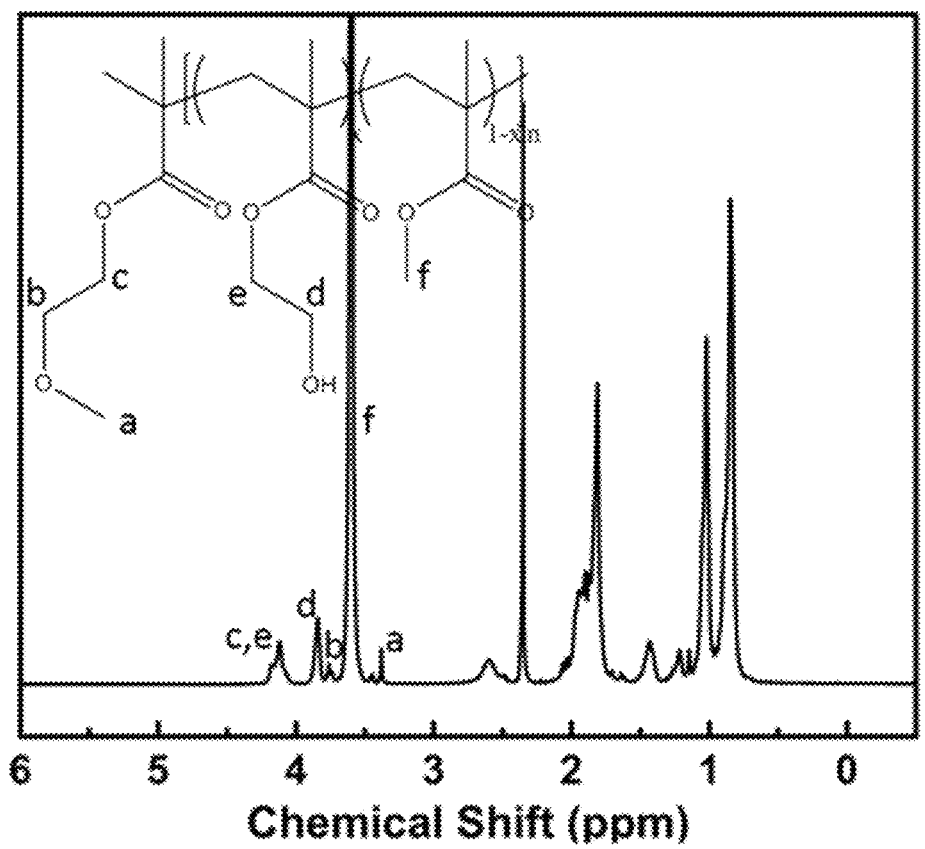
FIG. 16 depicts a ¹H NMR spectrum of P(HEMA-s-MMA)-Br measured in CDCl₃.

Referring to FIG. 16, a $^1$H NMR spectrum is shown of P(HEMA-s-MMA)-Br measured in CDCl$_3$, annotated with assignments for distinct peaks of MMA, HEMA, and the initiator fragment. Peaks a, d and f had integrated area ratios of 3.0/17.6/274, from which it was found that there were, on average, 9 HEMA units and 91 MMA units in each chain.

Figure 17:
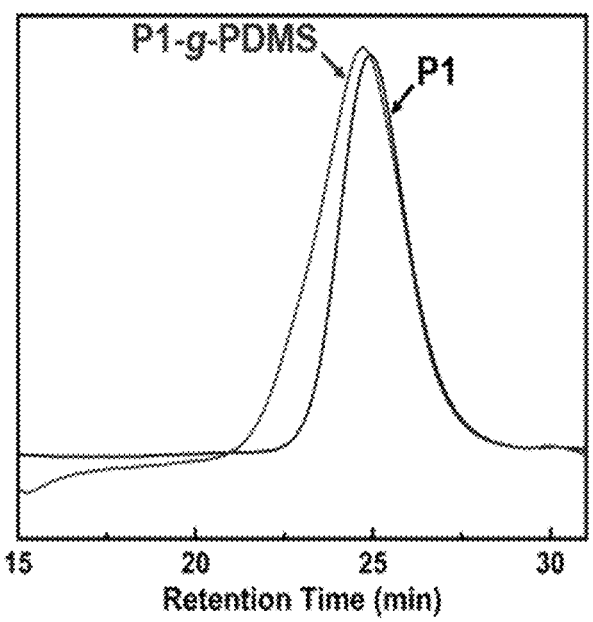
FIG. 17 depicts a size-exclusion chromatography (SEC) trace of [P(HEMA-s-MMA)-Br]-g-PDMS shown together with that of P(HEMA-s-MMA)-Br (P1) with CHCl₃ used as eluent.

Referring to FIG. 17, a size-exclusion chromatography (SEC) trace is shown of [P(HEMA-s-MMA)-Br]-g-PDMS shown together with that of P(HEMA-s-MMA)-Br (P1) with CHCl$_3$ used as eluent. The [P(HEMA-s-MMA)-Br]-g-PDMS peak was left-shifted relative to the P(HEMA-s-MMA)-Br peak in agreement with a higher molecular weight for the former.

Figure 18:
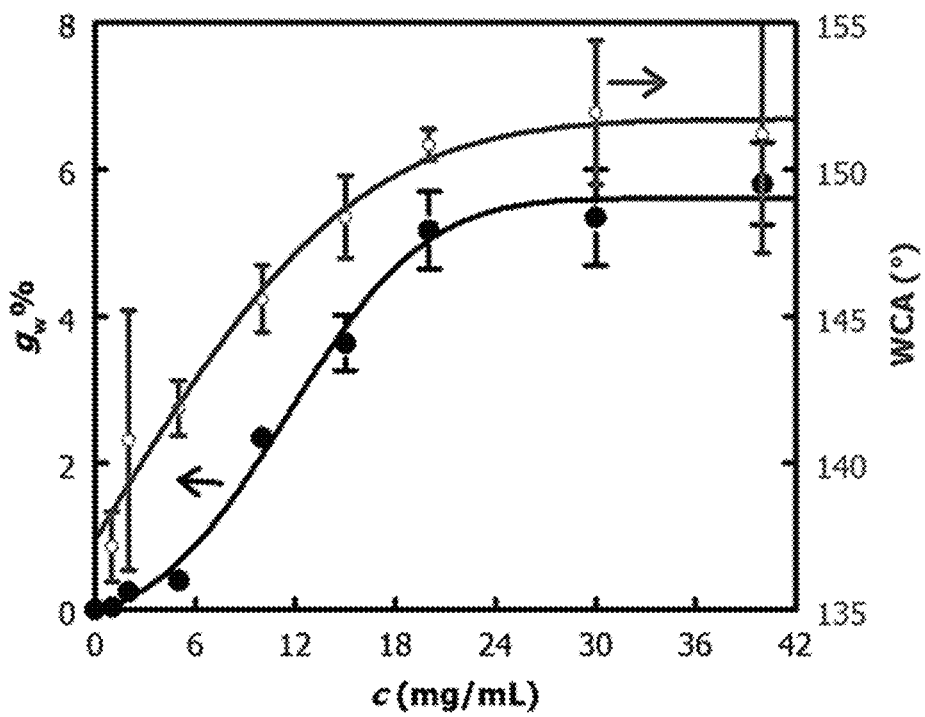
FIG. 18 graphically depicts variation in grafted P1-$A_{18}$ amount $g_w$ % and in water contact angle (WCA) on coated fabric as a function of coating P1-$A_{18}$ solution concentration.

Referring to FIG. 18, a plot is shown depicting variation in grafted P1-$A_{18}$ amount $g_w$% and in water contact angle (WCA) on coated composite material fabric filter as a function of coating P1-$A_{18}$ solution concentration. The $g_w$% value did not increase much with c before c=5 mg/mL, before it increased with c and leveled off at ~5.2 wt % above c=20 mg/mL. Contact angle data did not show an incubation period at low c values.

Figure 19:
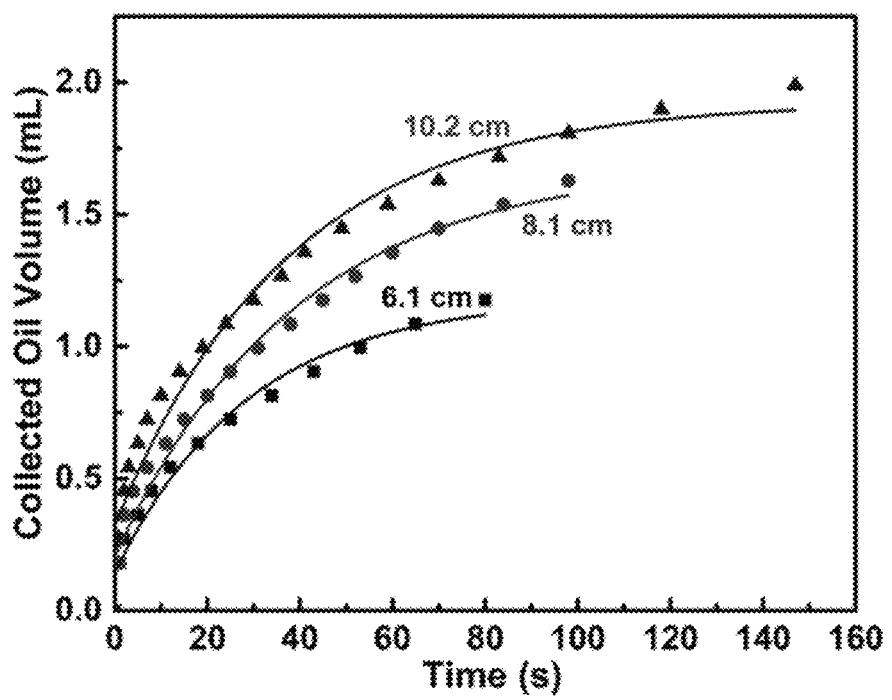
FIG. 19 graphically depicts data of chlorobenzene separation (i.e., Collected Oil Volume) by a P1-$A_{18}$-coated fabric.

Referring to FIG. 19, a plot is shown of data for chlorobenzene separation by a P1-$A_{18}$-coated composite material fabric filter. A burette was used to separate 6.0, 8.0 and 10.0 mL of a chlorobenzene-in-water emulsion, respectively. At these initial volumes, initial emulsion column heights were 61.0, 81.0 and 102.0 mm, respectively, which corresponded to initial hydrostatic pressures of 0.61×, 0.81× and 1.02×10$^3$ Pa on the filter (density of emulsion was 1.02 g/cm$^3$). At full recovery, final collected chlorobenzene volumes were expected to be individually 1.2, 1.6 and 2.0 mL.

In conclusion, functional filter composite materials have been prepared that effectively separate oil from an emulsion that includes, but is not limited to, oil and water. Such separation of oil was possible through the presence of components/moieties that acted to destabilize emulsions (destabilizing components) and create a hydrophobic microenvironment (hydrophobic components). For example, PDMS- and PDMAEMA-bearing Janus fabric composite materials have been shown to function as effective filters to separate oil from various simple oil/water mixtures as well as oil from various oil-in-water emulsions. Further studies showed that filters having two polymers present on all fibers of the scaffold, where one of the two polymers is a destabilizing polymer, and the other is a hydrophobic polymer, have also effectively separated oil from oil and water mixtures. Also, it has been shown that a polymer located on all fibers of a permeable substrate/scaffold, and that bared different sections that each had functional moieties that destabilized emulsions (destabilizing component) or created a hydrophobic microenvironment (hydrophobic component), are also effective functional filter composite materials (i.e., uniform coatings). Also, if the substrate/scaffold is made of hydrophobic material, it is possible to add polymers that bear emulsion-destabilizing components. Similarly, if the scaffold has emulsion-destabilizing character, it is possible to add hydrophobic polymers.

Use of such functional filter composite materials for oil separation, as described herein, is beneficial to the environment since it does not require chemical additives and is rapid and efficient. In aspects of the present application, uses of the herein described composite materials comprise use for isolating oil from oil and water mixtures. In some embodiments, the mixtures are emulsions. In yet other embodiments, the emulsions are oil-in-water emulsions; in other embodiments, the emulsions are water-in-oil emulsions. In yet other embodiments, the emulsion is derived from an industrial or commercial process. In other embodiments, the oil/hydrophobic liquid is a crude oil with a viscosity less than bitumen, or a refined oil, such as motor oil. In yet other embodiments, the oil/hydrophobic liquid is bitumen diluted with another oil such as naphtha. In other aspects, the herein described composite materials are used for cleaning of produced water, and removing oily/hydrophobic liquid contaminates from therein. In other aspects, the herein described composite materials are used in off-shore clean ups due to oil spills from, for example, an oil drilling platform, oil refinery, or oil-transport vehicle. In other aspects, the herein described composite materials are used for treatment of oil and water mixtures that occur in industrial, pharmaceutical, cosmetic, or bulk chemical synthesis. In some embodiments of this aspect, the herein described composite materials are used for treating rag layers.

In yet other aspects, the herein described composite materials are used for separation of animal, plant, and/or nut oils. In embodiments of this aspect, the composite materials are used to isolate olive oils, corn oils, palm oils, and/or coconut oils. In other aspects, the herein described composite materials are used for cleaning waste or waste water from food processing factories. In embodiments of this aspect, the food process factory is a poultry, fish, or mammal (e.g., cow, pig, etc.) processing factory.

As would be understood by one skilled in the art, in respect of the use aspects and embodiments described above, care is to be taken to avoid clogging the composite material, exerting a pressure (e.g., hydrostatic pressure) on the composite material that is greater than its break-through pressure (wherein, for example, both oil and water permeate the composite material), and using the composite material at temperatures that would render the material inoperable or the separation ineffective (e.g., >100° C. for water mixtures, etc.). As would be further understood by one skilled in the art, avoiding break-through pressures and inoperable temperatures requires using a composite material as described herein that would withstand such operating conditions. As would be further understood by one skilled in the art, avoiding clogging of a herein described composite material may require selecting a permeable substrate with a suitable pore size and/or pre-treating the mixture to be filtered to reduce the amount of dissolved or suspended solids.

The following working examples further illustrate the present application and are not intended to be limiting in any respect. Those skilled in the art will gain a further and better understanding of the present application and the new results and advantages thereof from the following illustrative examples of the practice of this invention as it has actually been carried out experimentally.

WORKING EXAMPLES

Materials.

Cotton fabric was purchased from a local store. It was washed with a 5 wt % detergent aqueous solution and water before drying for use. Tetrahydrofuran (THF) (purchased from Fisher-Scientific) was distilled to remove inhibitor. 2-(Dimethylamino)ethyl methacrylate ("DMAEMA" monomer) (purchased from Aldrich, 98%) was distilled under vacuum. 2,2-Azobisisobutyronitrile ("AIBN") (purchased from Fisher Scientific) was recrystallized from ethanol before use. 3-(Trimethoxysilyl)propyl methacrylate ("TMSPMA") (purchased from Aldrich, 98%), acetic acid (Aldrich, 99.7%), hexadecane (Aldrich, 99%), sodium dodecyl sulfate (SDS) and blue ink (Parker Quink) were used as received. PDMS-b-PCEA was synthesized and characterized by reported methods (Y. Wang, et al., *J. Mater. Chem. A* 2014, 2, 8094-8102).

Example 1. Fabrication of Janus Cotton Fabric Composite Material

To prepare a composite material Janus cotton fabric, PDMS-b-PCEA (60.0 mg) was dissolved in 0.60 mL THF. To the resulting solution was then added, using an automatic syringe pump over 1 h, hexane (2.40 mL) to yield a micellar coating solution. A swatch of fabric (2.0 cm×2.0 cm; a permeable substrate) was immersed into the coating solution for 10 min. Then the swatch was withdrawn from the solution and dried in air for 2 h. The dried swatch was then annealed at 120° C. for 15 min in an oven. Subsequently, the cotton swatch was attached onto a black plate and only the top side was irradiated for 5 min by a focused UV beam from a 500-W Hg lamp that was housed in an Oriel 6140 lamp case to form a crosslinked polymer (a hydrophobic component). In order to remove un-crosslinked and partially crosslinked polymer from the non-irradiated side of the swatch, solvent extraction was used. The solvent extraction step involved placing the coated swatch in 15 mL THF at 65° C. for 30 min and stirring. This step was performed three times. The swatch was then rinsed three times with 20 mL THF at room temperature for 20 min. Finally, the coated cotton swatch was completely dried at 120° C. under vacuum for 20 min before further treatment of the non-irradiated side of the swatch.

To graft the cotton fibers with TMSPMA, a fabric swatch was immersed in a mixture of TMSPMA (2.0 mL), acetic acid (0.06 mL), and THF (18.0 mL). The mixture was stirred and heated at 75° C. for 4.0 h before the fabric was removed and dried in air for 2 h. The swatch was then heated at 105° C. for 24 h under vacuum to affix the sol-gelled layer. Afterwards, the fabric was cleaned three times by stirring each time in 15.0 mL THF at 65° C. for 30 min. The swatch was further cleaned three times in 20 mL of THF at room temperature for 20 min. The fabric was then dried at 120° C. under vacuum for 20 min.

To graft PDMAEMA (a destabilizing component), an optimized protocol involved immersing the TMSPMA-modified fabric in a mixture consisting of DMAEMA (2.64 g) and THF (15 mL). After deoxygenation by bubbling the solution with nitrogen for 10 min, a de-oxygenated solution consisting of AIBN (0.066 g) in THF (5.0 mL) was injected. This was followed by heating the system at 65° C. under stirring for 24 h to polymerize DMAEMA. Then, the cotton fabric was withdrawn and cleaned by hot and room-temperature THF extraction using the protocol described above. The produced composite material Janus cotton fabric was dried at 120° C. under vacuum for 20 min.

Example 2. Effect of Varying Amount of Grafted PDMAEMA

To investigate the effect of varying the grafted PDMAEMA amount on the permeation properties of the composite material cotton fabric, PDMAEMA was grafted at three other DMAEMA concentrations in THF. Initial monomer mixtures used consisted of 7.92, 13.20 and 26.40 g rather than 2.64 g in 15.0 mL of THF. Due to the increased DMAEMA concentrations used, the grafted PDMAEMA amounts, determined gravimetrically using a microbalance, increased to (1.5±0.1)%, (1.9±0.2)%, and (2.6±0.4)%, respectively, compared to (0.8±0.1)% determined for Janus cotton prepared under the standard PDMAEMA grafting conditions.

Example 3. Oil-in-Water Emulsion

Hexadecane-in-water emulsions were prepared by mixing sodium dodecyl sulfate (SDS) aqueous solution and hexadecane using mechanical agitation at 1200 rpm for 30 min. Four emulsions with hexadecane (an oil)/water volume ratios of 30/70, 20/80, 10/90 and 1/99 were prepared. The SDS concentration in each case was fixed to 0.50 mg per mL of emulsion. Toluene (an oil)-in-water (v/v=20/80), hexane (an oil)-in-water, and chlorobenzene (an oil)-in-water (v/v=20/80) emulsions were prepared using identical procedure and SDS concentration.

Example 4. De-Emulsification by Cotton Fabric Composite Material Samples

Four cotton fabric samples (1.5×1.5 cm$^2$) were fully grafted with PDMAEMA under the standard grafting conditions. The pieces were then equilibrated with an aqueous HCl solution at $1.0 \times 10^{-4}$ M and aqueous NaOH solutions at $1.0 \times 10^{-6}$, $1.0 \times 10^{-4}$, and $1.0 \times 10^{-2}$ M overnight, respectively. The final pH values of these four solution were 5.2, 8.3, 10.3 and 11.7 respectively. All the treated cotton samples were withdrawn from the solution and rinsed with THF/water at v/v=5/5 and dried under vacuum. The cotton samples treated at different pH were subsequently inserted into vials each of which containing 20.0 mL of hexadecane-in-water emulsion (concentration of surfactant SDS was 0.50 mg per mL of emulsion) at $f_H$=20%. The extent of phase separation or de-emulsification was observed and photographs were captured after 60 min to compare the different de-emulsification behaviors.

Example 5. Separation

Four apparatuses were used for oil and water separation and these consisted of two H-shaped cells, a burette, and a 500-mL round-bottomed flask. Two photographs of the larger H-shaped cell are featured in FIG. 2. Each of the half-cells there had an internal cross-sectional diameter of 2.4 cm and an internal height of 9.6 cm. Thus, the maximal volume of liquid each half cell could hold was 50 mL. For the smaller H-shaped cell, the cross-sectional diameter, height, and volume were 2.2 cm, 5.5 cm, and 25 mL, respectively. The volumes of 25 and 50 mL were larger than 21 and 43 mL calculated for cylindrical cells because the half cells were not perfectly cylindrical but had side opening to connect to the other half cells. The larger H-shaped cell was used because the smaller cell was accidentally broken. The burette was used to examine the effect of changing hydrostatic pressure on the permeation rate of chlorobenzene. The 500-mL round-bottom flask was used to monitor hexadecane permeation for a sample that contained 1.0 vol % of hexadecane and had a total large volume of 300 mL.

Before a new piece of composite material fabric was mounted on a device for separation, it was soaked in HD. After removal from HD, it was placed on a folded piece of lintless tissue. Excess of HD was removed from the top surface using another piece of tissue paper. The pre-wetting was especially important for the experiment using a 500-mL round-bottom flask as the separation device because of the size of the cotton piece used and its ability to sorb substantial HD.

Example 6. Contact Angles (CA) Measurements

All contact angles were measured at room temperature (21±1° C.) using a Dataphysics OCA 15Pro optical contact angle measuring system. For under-oil water CA measurement, the composite material cotton fabric was fixed using double-side tape onto the bottom of a cuvette which was filled with hexadecane. The PDMS-b-PCEA coated side faced the top. Then a 5.0 µL water droplet was carefully dropped onto the cotton surface. For under-water oil CA measurement, the cotton fabric was sitting on the surface of water which was in a transparent glass container. The bottom side of the cotton sample toward to the water phase was that coated with PDMS-b-PCEA. Then several 5.0 µL hexadecane droplets were applied on the bottom surface of the cotton fabric using a U-shape needle. The air plastron between the cotton surface and water was removed after oil absorption. Finally, a 5.0 µL hexadecane droplet was applied on this surface for under-water oil CA measurement.

Example 7. SEM, Optical Microscope, FT-IR, NMR and TGA Analyses

Scanning electron microscope (SEM) images of the cotton samples were recorded using a FEI-MLA Quanta 650 FEG-ESEM instrument that was operated at 10-15 kV. Optical microscope images of oil-in-water emulsion and corresponding filtrate were recorded using a Nikon Elipse TE 2000-U instrument. FT-IR spectra were obtained using a Bruker ALPHA FT-IR Spectrometer with ATR sampling module. $^1$H NMR characterization of the filtrate was performed using a Bruker Avance-500 instrument at 25° C. using pyridine-$d_5$ ($C_5D_5N$) as the solvent. TGA was performed using a TA Q500 instrument in air atmosphere. A typical TGA measurement involved heating the samples from room temperature to 150° C. at 10° C./min, holding the temperature at 150° C. for 15 min, and increasing the temperature further to 650° C. at 10° C./min. Each residual weight reported represented the average of three measurements.

Diblock copolymer PDMS-b-PCEA used in this study was synthesized by atom transfer radical polymerization (ATRP) using a bromo-terminated polydimethylsiloxane macroinitiator (PDMS-Br) containing 58 DMS repeat units. The PDMS precursor was purchased from Aldrich. The synthetic details and characterizations have been reported previously (Y. Wang, et al., *J. Mater. Chem. A* 2014, 2, 8094-8102). Table 1 summarizes the characteristics of the diblock copolymer. The size-exclusion chromatography ("SEC") number-average molecular weight ($M_n$) and polydispersity index (PDI or $M_w/M_n$) were determined by SEC and the system was calibrated using a series of well-defined polystyrene standards. The CEA repeat unit number m was calculated from the known n value and the $^1$H NMR signal integral comparison between CEA and DMS (Y. Wang, et al., *J. Mater. Chem. A* 2014, 2, 8094-8102).

Referring to FIGS. 4A-C, SEM images are shown of pristine cotton fabric, PDMS-b-PCEA coated (hydrophobic) side and PDMAEMA-coated (destabilizing) side of Janus cotton fabric composite material. As shown, after being coated with PDMS-b-PCEA and PDMAEMA on different sides, the cotton fibers did not show obvious change in their surface morphologies. This agreed with the monolayer grafting mechanisms expected for PDMS and PDMAEMA grafting.

Fourier transform infrared spectroscopic (FTIR) was used to confirm the grafting of PDMAEMA unto cotton fabric fibers. For this study, steps 4→6 depicted in FIG. 1B were used to coat a pristine cotton fabric sample. This protocol involved grafting TMSPMA and then PDMAEMA. Referring to FIG. 5, FTIR spectra are compared of pristine cotton fabric, fabric modified with TMSPMA, and fabric further modified with PDMAEMA. There were no obvious differences between the first two samples perhaps because of the trace amount of TMSPMA grafted. However, a new peak at 1730 cm$^{-1}$ appeared after the grafting of PDMAEMA. This peak was due to the stretching vibration of carbonyl groups of DMAEMA. This new peak verified the successful grafting of PDMAEMA, and also indirectly confirmed the previous reaction between TMSPMA and cotton because the PDMAEMA could not graft to or from a cotton surface in the absence of TMSPMA. Free PDMAEMA polymer chains formed in solution during the free radical polymerization could be easily removed after several cycles of extraction using THF.

To determine the grafting density x or the mass fraction of polymer in the coated fabric sample, a literature method (D. Xiong, et al., *Langmuir* 2012, 28, 6911-6918) based on TGA was applied. To determine the weight fraction x of grafted PDMS-b-PCEA on half-coated cotton fabric, residual weight percent was determined at 600° C. of the uncoated fabric ($R_c$), PDMS-b-PCEA ($R_p$), and cotton fabric half coated by PDMS-b-PCEA ($R_{pc}$). Then, eq. (S1) was used to calculate x.

$$(1-x)R_c + xR_p = R_{pc} \quad (S1)$$

Referring to FIGS. 6A and 6B, TGA curves are shown of uncoated cotton, PDMS-b-PCEA, and cotton that was half-coated by PDMS-b-PCEA. $R_c$, $R_p$ and $R_{pc}$ values were determined to be (0.411±0.068)%, (3.874±0.341)%, and (0.589±0.024)%, respectively, from TGA analysis for each sample in triplet. The use of eq. (51) yielded an x value of (5.1±4.7)%.

To determine the amount PDMAEMA grafted in the last step of asymmetric (i.e., Janus) synthesis, the product at stage 5 in FIG. 1B was used to yield the $R_c$ value. TGA analyses of PDMAEMA and the final asymmetric fabric yielded $R_p$ and $R_{pc}$, respectively. FIGS. 6A and 6B show the TGA curves of TMSPMA-modified cotton, PDMAEMA homopolymer and PDMAEMA-grafted cotton. Based on the $R_c$, $R_p$ and $R_{pc}$ of (0.916±0.006)%, (0.479±0.008)% and (0.912±0.010)% this time, we calculated using eq. S1 the grafted PDMAEMA amount x of (0.9±0.3)%.

To confirm the accuracy of the data from TGA, simple gravimetric analysis based on microbalance was also applied to determine the grafted polymer amount (B. Deng, et al., *Adv. Mater.* 2010, 22, 5473-5477). The polymer grafting density x in this method was defined as the weight increases exhibited by the samples, as determined by $$x = (w_1 - w_0)/w_0 \times 100\%$$

where $w_1$ and $w_0$ are the weights of the cotton samples after and before polymer coating. This analysis indicated that the grafted PDMS-b-PCEA on one side of cotton fabric was (4.8±1.3)%, while the grafted PDMAEMA on TMSPMA-modified cotton fabric was (0.8±0.1)%. These values agreed with the TGA results of (5.1±4.7)% and (0.9±0.3)%.

Referring to FIGS. 7A and 7B, to further confirm the high efficiency of the oil-water separation by the composite material Janus cotton fabric filter, the feed and filtrate of the hexadecane-in-water emulsion were analyzed by optical microscopy. The diameters of most hexadecane droplets in the feed emulsion were less than 10 μm. This indicated that the hexadecane was well dispersed in water in the presence of SDS. After separation by the Janus cotton fabric, no droplet could be observed in the filtrate under optical microscopy.

Example 8. Diameters of Emulsion Droplets

An analysis was conducted regarding the average diameters of emulsion droplets prepared from different oils at an oil volume fraction of 20% and the concentration of SDS in each emulsion sample was 0.50 mg per mL of emulsion (see A. K. Kota, et al., *Nat. Comm.* 2012, 3, 1025 and F. Zhang, et al., *Adv. Mater.* 2013, 25, 4192-4198). Specifically, optical microscope images of oil-in-water emulsion were recorded using a Nikon Elipse TE 2000-U instrument (available at Nikon Instruments Inc. in Melville, N.Y., USA). The average diameter of each type of oil droplet was obtained by analyzing droplets in these images. For hexadecane, toluene and chlorobenzene in water, average oil diameters were (3.7±0.6), (4.9±0.8), and (15.3±1.2) μm, respectively.

Example 9. Studies of Hexadecane Separation from an Emulsion

HD separation from a $f_H$=1.0% emulsion (concentration of SDS was 0.50 mg per mL of emulsion) was studied. The amount of oil present in 10.0 mL of a HD/water emulsion at $f_H$=1.0% was too low to allow the acquisition of accurate oil separation kinetic data. Thus, an apparatus was used wherein a three-necked flask having a coated filter covering one of its neck openings was tipped such that an emulsion contained therein was in contact with the composite material filter. In this case, HD that permeated the coated filter was collected in a beaker that was placed on a balance to allow the direct determination of the mass of the collected oil. FIG. 10B shows a plot of the mass of collected HD as a function of time after the 3-neck round-bottomed flask containing 300 mL of the emulsion was tilted to allow full contact between the emulsion and a PDMAEMA-coated side of the composite material Janus fabric filter. The separated HD amount reached 2.1 g by 1.5 h and 2.2 g by 15 h. The latter mass translated into a HD volume of 2.9 mL, which was very close to or the same as the 3.0 mL contained in the original emulsion.

HD permeation data in FIGS. 3A and 3B were fitted using the phenomenological function:

$$V(t)=V_\infty-V_\infty'\exp(-kt))  \quad (S2)$$

where $V_\infty$ is the permeated HD volume at infinitely long times, k is a phenomenological first-order permeation rate constant, and $V_\infty'$ differs slightly from $V_\infty$ because HD permeation could not be described by a simple first-order law. Each set of data displayed an incubation period when the permeated amount was close to zero. Although not wishing to be bound by theory, it was considered that continuous HD paths were being formed in the fabric filter during this period. It was only after the paths had been formed, the permeation followed the first-order behavior. Thus, $V_\infty'$ was used as a floating parameter to ensure better data fitting. Table 2 summarizes the fitting parameters generated from treating the data in FIGS. 3A and 3B using eq. S2.

Equation S2 could not fit the HD permeation data of FIG. 3A. Thus, a double exponential function given in eq. S3 was used to fit the data:

$$m(t)=m_\infty-m_1\exp(-k_1t)-m_2\exp(-k_2t) \quad (S3)$$

This data treatment yielded $m_\infty=2.23$ g, $m_1=0.97$ g, $m_2=1.23$ g, $k_1=7.2\times10^{-3}$ s$^{-1}$, and $k_2=5.7\times10^{-4}$ s$^{-1}$. A justification for the need for two rate constants in this case is that the rate-determining step for HD permeation differed at high and low HD contents. Initially at relatively high HD contents, the permeation rate might be governed by the rate of HD transportation across the fabric. At later stages when the HD content was low, the sorption of HD droplets by the fabric might become rate determining.

Example 10. Effect of Varying Amount of Grafted PDMAEMA

Cotton fabrics were soaked in solutions of polymerizing DMAEMA at different monomer concentrations to obtain different grafted DMAEMA amounts. Microbalance analysis indicated that the PDMAEMA weight fractions grafted onto four sets of fabric samples were (0.8±0.1)%, (1.5±0.1)%, (1.9±0.2)%, and (2.6±0.4)%, respectively. On the PDMS-coated side, the static water contact angles after PDMAEMA grafting were (153±2), (142±3), (123±2), and (106±15)°, respectively, as the grafted PDMAEMA amount increased. These composite material fabrics were then equilibrated with a dilute NaOH solution at pH=10.1 before being cleaned, dried, and used to separate hexadecane from its emulsion in water at $f_H=20\%$ (the concentration of SDS was 0.50 mg per mL of emulsion) in the smaller H-shaped cell. FIG. 8 plots the hexadecane permeation data obtained using the different fabric samples.

The first two fabric samples at the grafted PDMAEMA amounts of (0.8±0.1) wt % and (1.5±0.1) wt % performed essentially identically. By 700 s, hexadecane essentially fully permeated the fabrics. On the other hand, the fabric samples with the grafted PDMAEMA amounts of (1.9±0.2) wt % and (2.6±0.4) wt % did not allow the full permeation of hexadecane by 700 s. In addition, the permeated hexadecane amount by 700 s decreased as the grafted PDMAEMA amount increased. For the sample at the grafted PDMAEMA amount of (2.6±0.4) wt %, permeation stopped after ~300 s.

Although not wishing to be bound by theory, it was considered that hexadecane permeation eventually stopped in the last two composite material fabric samples because water content in these fabrics eventually became too high. Water contact angle on the PDMS-coated side decreased as the grafted PDMAEMA amount increased. This relationship suggested that PDMAEMA chains could be grafted not only on the side bearing regenerated cellulose fibers, wherein regenerated cellulose fibers refers to fibers for which uncrosslinked polymer has been removed, but also on fibers bearing pre-deposited PDMS chains. The increases in the grafted PDMAEMA amounts inside the fabric matrices decreased their water repellency and caused the eventual formation of pore-filling water plugs on the PDMAEMA-coated side of the fabrics. Hexadecane permeation stopped because it could not permeate these water plugs. Therefore, experiments suggested that a good balance of hydrophobicity and hydrophilicity across a fabric matrix was important for oil separation.

Example 11. Effect of Varying Oil Type

A composite material fabric sample was prepared under the standard conditions and last equilibrated in pH=11.7 water before rinsing and drying, as per the conditions described in Example 1. The fabric was then used to separate hexadecane, toluene, or chlorobenzene from its emulsion. The cell used for such experiments was the larger H-shaped shell and the initial emulsion volume of 40.0 mL containing 20 vol % of oil (the concentration of SDS was 0.50 mg per mL of emulsion). FIG. 11 plots the permeated oil amount as a function of time for the three separations.

Essentially identical separation behavior was observed for hexadecane and toluene separation and the final separated hexadecane and toluene amount reached 8.0 mL, the amount of oil contained in 40.0 mL of emulsion at 20 vol % of oil. However, chlorobenzene could not be fully separated from oil. Observation suggested that this oil was readily de-emulsified by the Janus fabric. After demulsification, chlorobenzene due to its density of 1.11 g/mL readily settled to the bottom of the larger H-shaped cell. Despite stirring, chlorobenzene did not readily reach the composite material cotton fabric filter after de-emulsification.

Chlorobenzene readily de-emulsified because its droplets were large to start with. While the average sizes for the emulsified hexadecane and toluene droplets were (3.7±0.6) and (4.9±0.8) μm, respectively, the average size of the emulsified chlorobenzene droplets was (15.3±1.2) μm.

Although not wishing to be bound by theory, it was considered that the rate of oil permeation depends on many parameters including oil viscosity, emulsion droplet size, stirring speed, and apparatus design. As one will see in the next example, the use of a vertical apparatus facilitated separation of chlorobenzene from water.

Example 12. Effect of Varying Hydrostatic Pressure

To examine the effect of varying the applied pressure on oil and water separation, emulsified chlorobenzene was separated from water using a burette that was initially filled with an emulsion at 20 vol % of chlorobenzene (the concentration of SDS was 0.50 mg per mL of emulsion) to different heights. FIG. 9 plots the permeation data for three separations started at the initial emulsion column heights of 5.4, 8.7, and 10.9 cm, respectively. These liquid column heights corresponded to the initial hydrostatic pressures of 0.54×, 0.88×, and 1.11×10$^3$ Pa on the filter (density of emulsion was 1.02 g/cm$^3$) and the emulsion volumes of 5.0, 8.0, and 10.0 mL, respectively. Thus, the volumes of chlorobenzene collected after full oil separation should be 1.0, 1.6, and 2.0 mL, respectively.

Data of FIG. 9 show that full oil separation occurred in every case. This demonstrated that the incomplete chlorobenzene separation shown in FIG. 11 was indeed due to the use of an inappropriate separation apparatus.

FIG. 9 also shows that the rate of oil permeation increased as the initial emulsion column height increased. Since this column height is directly proportional to the hydrostatic pressure applied on the fabric or the permeating liquid, the oil permeation rate increased as the applied pressure increased.

Chlorobenzene permeation rates were obtained from the slopes of the straight lines constructed from the first three data (including time zero and zero permeation data) of the curves shown in FIG. 9. These rates were 0.90, 0.135, and 0.270 mL/s. Since the cross-sectional area of the burette was 0.92 cm$^2$. Thus, the hourly permeation rates in the units of L/(h·m$^2$) were 3.5×, 5.3×, and 10.5×10$^3$, respectively.

It was further noted that the water breakthrough pressure for this coated fabric should not exceed that exerted by the column of liquid at a height of 10.9 cm, otherwise water could be forced into the fabric pores and selectivity for oil would be lost. This breakthrough pressure can be increased by decreasing the pore size of the fabric used when required (A. Tuteja, et al., MRS Bull. 2008, 33, 752-758; H. J. Butt, et al., Soft Matt. 2013, 9, 418-428).

Example 13. Wetting Behavior of HD-Impregnated Fabric Samples

To gain insight into the behavior of the composite material Janus fabric under real oil/water separation conditions when the fabric is wetted by hexadecane and immersed in water, photographs were taken of water and hexadecane ("HD") droplets under these conditions. One such photograph shows a water droplet sitting on the PDMS-coated side of a fabric that had been submerged in HD. The water contact angle was high at 152°. This result suggests that the high repellency of the HD-impregnated PDMS-coated side towards water impinging.

Another photograph of a section of a fabric after a HD droplet was dispensed beneath a HD-wetted fabric immersed in water. The newly added HD droplet, due to its lower density than water, floated upwards toward the fabric and was immediately absorbed by it. Thus, the PDMS-coated side was able to sorb hexadecane even when it is immersed in water.

Results suggest that HD was able to pass the PDMS-coated side of the fabric when it is soaked in water and water was rejected by the HD-impregnated PDMS-coated side.

Example 14. Preparation of PDMAEMA-b-[P(MMA-r-HEMA)-g-PDMS] as a Uniform Coating PDMAEMA-b-[P(MMA-r-HEMA)-g-PDMS] is a diblock copolymer. The first block is poly(N,N-dimethyl-aminoethyl methacrylate) ("PDMAEMA"; a destabilizing component), and the second block is a graft copolymer. While the main chain of the graft copolymer was a random copolymer of methyl methacrylate ("MMA") and 2-hydroxyethyl methacrylate ("HEMA"), the side chains were poly(dimethyl siloxane) ("PDMS"; a hydrophobic component). The preparation of PDMAEMA-b-[P(MMA-r-HEMA)-g-PDMS] was preceded by three steps. First, PDMAEMA-Br was prepared by ATRP. Then, PDMAEMA-Br was used to initiate the copolymerization of MMA and HEMA. PDMS was then grafted onto the P(MMA-r-HEMA) block. Details of these steps are provided below.

Step 1. Preparation of DMAEMA-Br

Ethyl α-bromoisobutyrate ("EBiB") (0.10 mL, 0.69 mmol), DMAEMA (15.0 mL, 89.0 mmol), and 1,1,4,7,10,10-hexamethyltriethylenetetramine ("HMTETA") (0.19 mL, 0.69 mmol) were mixed with dichlorobenzene (15.0 mL) in a Schlenk flask. The resulting solution was bubbled with $N_2$ for 10 min before CuBr (100.2 mg, 0.69 mmol) was added. This addition was followed by system deoxygenation via three freeze-pump-thaw cycles and lastly filling the flask with $N_2$.

Subsequently, the flask was immersed in an oil bath at 70° C. for 1.5 h. $^1$H NMR analysis of a sample taken indicated 64% DMAEMA conversion. Thus, the polymerization was stopped by allowing air in. CuBr was removed by passing the solution through a neutral alumina column using tetrahydrofuran as eluent. A resulting filtrate was subsequently added to hexane to precipitate a polymer. The polymer settled by centrifugation and was dried under vacuum after solvent was removed. Yield of the polymer was 61%. Using the NMR conversion of 64% for DMAEAM and assuming 100% utilization of the initiator, a repeat unit number of 81 was calculated for the product polymer. In terms of polystyrene standards, the size-exclusion chromatography results were $M_n$=1.00×10$^4$ Da, $M_w$=1.10×10$^4$ Da, and $M_w/M_n$=1.10.

Step 2. Preparation of PDMAEMA-b-P(MMA-r-HEMA)

PDMAEMA-Br (5.50 g, 0.30 mmol), MMA (0.82 mL, 7.6 mmol), 2-[(trimethylsilyl)oxy]ethyl methacrylate ("HEMA-TMS") (1.78 mL, 7.6 mmol) and HMTETA (0.20 mL, 0.7 mmol) were dissolved in toluene (10.0 mL). The solution was bubbled with $N_2$ for 10 min before CuBr (55.2 mg, 0.4 mmol) was added. Subsequently, the air in the flask was removed by three freeze-pump-thaw cycles and by back filling the flask with $N_2$. The polymerization was conducted at 80° C. for 4 h. $^1$H NMR analysis of a sample taken by this time indicated a 64% conversion for the sum of MMA and HEMA. Polymerization was stopped by allowing air in. CuBr was removed by passing the solution through a neutral alumina column using tetrahydrofuran as eluent. The resulting filtrate was concentrated by rotary evaporation. Then, THF (20 mL) and methanol (20 mL) were added to form a mixture. The mixture was stirred overnight to remove trimethylsilyl groups. The solution was subsequently added into hexane to precipitate the product polymer. The polymer was dissolved in THF and precipitated into hexane again. The polymer was settled by centrifugation and dried under vacuum after solvent removal. NMR analysis indicated that this polymer was PDMAEMA$_{81}$-b-P(MMA$_{17\%}$-r-HEMA$_{83\%}$)$_{30}$ where the integer subscripts denoted the repeat unit numbers and the fractional numbers denoted the molar fractions. In terms of polystyrene standards, size-exclusion chromatography results were $M_n$=1.3×10$^4$ Da, $M_w$=1.5×10$^4$ Da, and $M_w/M_n$=1.16.

Step 3. PDMS Grafted onto P(MMA-r-HEMA)

PDMS-OH (PDMS bearing a hydroxyl terminal group) was reacted with oxalyl chloride to produce PDMS-COCl. To prepare PDMS-COCl, PDMS-OH ($M_n$=5000 Da, Aldrich) was dried under vacuum for 4 h before 10 mL anhydrous THF was added. The PDMS-OH solution was then added dropwise into 10 equivalents of oxalyl chloride under vigorous stirring and the mixture was reacted for 24 h. Excess oxalyl chloride and THF were removed by drying under vacuum for another 24 h.

Step 4. Preparation of PDMAEMA-b-[P(MMA-r-HEMA)-g-PDMS]

PDMAEMA-b-P(MMA-r-HEMA) (1.31 g) was dissolved in anhydrous THF (7.5 mL) to form a polymer solution. PDMS-COCl (0.467 g) was added dropwise into the polymer solution under vigorous stirring and the resultant mixture was stirred for 24 h. Solvent was removed under vacuum to produce a white paste. PDMS weight fraction in final polymer product was 26.3%.

Example 15. Preparation of P(DMAEMA-r-MMA-r-HEMA)-g-PDMS as a Uniform Coating

This preparation involved two steps. First, the random copolymer backbone P(DMAEMA-r-MMA-r-HEMA) was prepared by catalytic chain transfer polymerization. Then, PDMS-COCl was grafted onto the random copolymer backbone.

Step 1. Preparation of P(DMAEMA-r-MMA-r-HEMA)

DMAEMA (4.4 mL), HEMA (2.0 mL), MMA (2.0 mL), AIBN (0.106 g), CoPhBF (5.7 mg) (a bis(methanol) complex of bis[(difluoroboryl)diphenylglyoximato] cobalt(II)), butyl acetate (6 mL), and p-xylene (3 mL) were mixed in a Schlenk flask. The mixture was purged with $N_2$ for 1 h before it was heated at 72° C. for 24 h. The polymerized mixture was added into hexane to precipitate the polymer. After vacuum drying, copolymer product (6.3 g) was obtained. According to NMR analysis, the composition of the polymer was P(DMAEMA$_{0.49}$-r-MMA$_{0.27}$-r-HEMA$_{0.24}$)$_{49}$. SEC analysis yielded $M_n=1.3 \times 10^4$ Da, $M_w=1.8 \times 10^4$ Da, and $M_w/M_n=1.47$.

Step 2. Preparation of P(DMAEMA-r-MMA-r-HEMA)-g-PDMS

P(DMAEMA-r-MMA-r-HEMA) (1.2 g) was dissolved in 5 mL anhydrous THF before PDMS-COCl (0.46 g) was added dropwise. The resultant mixture was stirred for 24 h. Solvent was evaporated under vacuum and a white paste was obtained. The PDMS weight fraction of this final polymer was 27.8%.

Example 16A. Coating of Cotton Fabric Using PDMAEMA-b-[P(MMA-r-HEMA)-g-PDMS]

PDMAEMA-b-[P(MMA-r-HEMA)-g-PDMS] (30.0 mg) was dispersed into 3.0 mL deionized water. Three pieces of cotton fabric swatches (1.5×1.5 cm$^2$; a permeable substrate) were then soaked in the solution for 10 min before the swatches were withdrawn from the solution and air-dried. The dried fabric samples were further annealed at 180° C. for 4 h under vacuum. After this, the fabrics were rinsed with hot THF three times to remove ungrafted polymer.

Example 16B. Coating of Cotton Fabric Using P(DMAEMA-r-MMA-r-HEMA)-g-PDMS

P(DMAEMA-r-MMA-r-HEMA)-g-PDMS (60.0 mg) was dispersed into 3.0 mL deionized water. Three pieces of cotton fabric swatches (1.5×1.5 cm$^2$) were then soaked in the solution for 10 min before the swatches were withdrawn from the solution and air-dried. The dried fabric samples were further annealed at 180° C. for 4 h under vacuum. After this, the fabrics were rinsed with hot THF three times to remove ungrafted polymer.

Example 17A. Oil Separation Using Fabric Coated by PDMAEMA-b-[P(MMA-r-HEMA)-g-PDMS]

An oil/water emulsion was separated using a home-made H-shape apparatus, as shown in FIGS. 2A and 2B. The apparatus consisted of two half cells connected via an arm that sandwiched a fabric swatch that was coated with PDMAEMA-b-[P(MMA-r-HEMA)-g-PDMS] (i.e., a composite material), serving as the membrane for oil/water separation. Each cell was 6.0 cm tall and had a 2.3-cm inner diameter. The permeation area of the fabric had a circular shape with a diameter of 9.0 mm.

In a typical procedure of oil/water separation, an oil/water cloudy emulsion was poured into the left cell and stirred at a certain speed with a magnetic stirring bar. When the emulsion came into contact with the composite material coated fabric filter, clear oil permeated the fabric filter and began to collect in the right cell. The emulsion on the left side became less and less cloudy as the oil collected on the right side. That is, both de-emulsification and separation occurred. Although not visible in the bulk solution, phase separation occurred in the left cell. Oil then aggregated, wetted the coated fabric, and permeated it.

Specifically, in this example, 20 mL of a hexadecane-in-water emulsion containing 20 vol % of hexadecane (the concentration of SDS was 0.50 mg per mL of emulsion) was added into the left cell. The amount of hexadecane collected in the right cell as a function of time was determined and data is shown in FIG. 10. Using the slope of a straight line constructed from the initial three points of this permeation data, a permeation rate of 0.0088 mL/s was determined. This rate together with the permeation area of 0.64 cm$^2$ yielded a high flux of $5.0 \times 10^2$ L·m$^{-2}$·h$^{-1}$.

Example 17B. Oil Separation Using Fabric Coated by P(DMAEMA-r-MMA-r-HEMA)-g-PDMS This experiment was conducted under conditions as described in the previous example. Using a fabric coated by polymer P(DMAEMA-r-MMA-r-HEMA)-g-PDMS, the hexadecane separation rate was lower than that reported in the previous example. After 10 min, 2.0 mL hexadecane permeated the fabric.

Example 18. Uniform Coating with a Trifunctional Polymer

A uniform coating approach for preparing functional composite material cotton fabrics has been developed. All fibers of a fabric swatch were coated with pre-made trifunctional copolymer PDMAEMA-b-[P(MMA-r-HEMA)-g-PDMS] or P(DMAEMA-r-MMA-r-HEMA)-g-PDMS. One of the three functional groups allowed the copolymer to bind with cotton fibers. For example, a polymer's hydroxyl groups bind to cotton's hydroxyl groups via a crosslinking reaction at temperatures of about 170° C. The second type of functional group was hydrophobic, for example, PDMS. The third type of functional group was destabilizing (i.e., emulsion breaking), for example, PDMAEMA. By adjusting the relative lengths of the chains of the hydrophobic and emulsion breaking polymers it was possible to achieve the same effect as that seen with the Janus fabric composite materials. It was determined that the shorter the PDMAEMA chain, the lower the demulsification efficiency, but the higher the hydrophobicity of the final coated cotton. However, if the PDMAEMA chain was too long, it may affect the hydrophobicity of the final coated cotton although the demulsification efficiency would be higher. Therefore, the relative chain length should be controlled in a particular range so that the final coated cotton can provide both high hydrophobicity and high demulsification efficiency. Two types of architectures for such tri-functional polymers are described herein.

The first type of architecture used for the trifunctional polymers was PDMAEMA-b-[P(MMA-r-HEMA)-g-PDMS] which is a diblock copolymer. Its first block is PDMAEMA, and its second block is the graft copolymer [P(MMA-r-HEMA)-g-PDMS]. While the main chain of the graft copolymer is a random copolymer of MMA and HEMA, the side chains are PDMS.

The second type of architecture used for the trifunctional polymers is P(DMAEMA-r-MMA-r-HEMA)-g-PDMS, which is a simple graft copolymer. The main chain of the graft copolymer is a random copolymer of DMAEMA, MMA and HEMA, while the side chains are PDMS. Coated fabrics with such functional copolymers were able to de-emulsify and separate oil from oil-in-water emulsions.

Use of a trifunctional polymer on all fibers of a fabric scaffold allowed for facile application of the coating using the following steps: an aqueous polymer solution was prepared, a fabric swatch was soaked in an aqueous solution for about 10 minutes, the swatch was removed and water was allowed to evaporate at room temperature or higher, and the fabric swatch was heated at about 170 degrees Celsius for about 3 h.

Example 19A. In-situ-Generated Janus Fabric Composite Materials for Rapid and Efficient Separation of Oil from Oil-in-Water Emulsions A family of diblock copolymers were designed and synthesized: P1-b-$A_m$ (FIG. 12A), where P1 denotes P(MMA-s-HEMA)-g-PDMS (a graft copolymer where the main chain is a statistical copolymer of MMA and HEMA, the side chains are PDMS) with molar fractions of 91%, 8.1%, and 0.9% for MMA (methyl methacrylate), HEMA (2-hydroxyethyl methacrylate), and PDMS-bearing HEMA units respectively. $A_m$, s, g, and b signify a PDMAEMA block of m repeat units, statistical, graft, and block, individually. HEMA and MMA were chosen because P(MMA-s-HEMA) could form a crosslinked layer around fabric fibers (e.g., cotton fibers; a permeable substrate) via attack of MMA and HEMA ester bonds by HEMA hydroxyl groups to eliminate methanol and ethylene glycol (C. M. Grozea, et al., *Rsc Advances* 2016, 6, 20135-20144; M. S. Choudhary, K. Lederer, *Eur. Polym. J.* 1982, 18, 1021-1027). HEMA was also selected for its ability to react with PDMS-COCl, PDMS bearing a terminal acid chloride group, to graft PDMS.

It was considered that, in air, a P1-b-$A_m$ coating that was crosslinked by P(MMA-s-HEMA) would be covered by low-surface-tension PDMS chains (Structure 1, FIG. 12b) if they were sufficiently long. However, due to PDMAEMA's preferential solubility in water, it was considered that the PDMAEMA chains would rise to the top when the fabric contacted an oil-in-water emulsion (1→2, FIG. 12b). The emerged PDMAEMA chains would then destabilize an emulsion and any coagulated oil would fill pores on the fabric side that was not reconstructed (i.e., that the PDMAEMA units have not emerged to cover the fabric's surface). It was considered that this side may retain its hydrophobicity after oil impregnation because of PDMS's preferential solubility in oil. Thus, an in-situ-generated Janus fabric structure may be maintained, generating a fabric with an enduring separation capability.

As further discussed in Example 19B, a total of five P1-b-$A_m$ samples with m=4, 18, 23, 42 and 103, respectively, were prepared. As for P1, its backbone consisted of 91 MMA units and 9 HEMA units. On average, each P(MMA-s-HEMA) chain was grafted with 0.91 PDMS chain and the repeat unit number was 62 for PDMS. Thus, a weight fraction of PDMS in P1 was 34%.

For demonstrative purposes, a plain-woven cotton fabric was used as a permeable substrate and this textile had inter-thread pore sizes reaching 200 µm. To coat the cotton fabric, swatches were immersed into a P1-b-$A_m$ solution in tetrahydrofuran (THF) for 30 min before they were removed and heated under vacuum at 180° C. for 4 h to crosslink the P(MMA-s-HEMA) layer around the fibers. Polymer chains that were not incorporated into the crosslinked layer were removed by extraction with hot THF (see Example 19B).

The fabric samples thus coated by P1-b-$A_m$ with m=0, 4, 18, 23, and 42 featured water contact angles (WCAs) of (152±2), (150±1), (151±1), (150±1), and (150±2) °, respectively, when they were measured within 10 s after water droplets had been dispensed. It was considered that, as the WCAs did not vary much with m, this suggested that, in air, the coating surfaces were covered by PDMS.

However, these angles decreased as the resting time of water droplets on the coated fabrics increased. FIG. 13a shows such data for fabrics coated by P1-b-$A_m$ with m=0, 4, 18, 42, and 103. While WCAs on P1-b-$A_0$- or P1-coated fabrics were relatively unchanged with time, water droplets were readily absorbed by P1-b-$A_{103}$-coated fabrics. As for samples coated by P1-b-$A_m$ with intermediate m numbers, the WCA decreased relatively faster with time as m increased.

Data of FIG. 13a suggested that the air-impregnated, P1-b-$A_m$-coated fabrics with m>0 underwent surface reconstruction, as anticipated. Further, rate of surface reconstruction increased as length of the PDMAEMA block increased. This trend was considered reasonable as the collapsed PDMS layer, initially at the top of the coating, had a certain thickness. Without wishing to be bound by theory, it was considered that, as m decreased, the PDMAEMA chains were buried more deeply and more time was required for them to break through the PDMS layer. Further, a short PDMAEMA chain would need to stretch more to reach the coating surface, and stretching of polymer chains was not favored entropically.

In another example, a series of composite material P1-b-$A_m$-coated fabric swatches (sized at 1.5×1.5 cm$^2$) were placed into a series of vials containing 20 mL of a hexadecane (HD)-in-water emulsion that was stabilized by sodium dodecyl sulfate at a HD volume fraction $f_{HD}$ of 20%. FIG. 13b shows a photograph of the emulsions 15 min after addition of the P1-b-$A_m$-coated fabric swatches. The extent of HD phase separation increased as m increased. It was considered that de-emulsification was made possible by the PDMAEMA chains reaching the coating surface. Thus, without wishing to be bound by theory, it was considered that said results suggested that the fabric surfaces reconstructed when they contacted the water-rich emulsion phase.

Another image was taken 19 h after fabric addition into the series of vials shown in FIG. 13b. No clear HD phase was observed in the vial containing a P1-b-$A_4$-coated swatch, suggesting that this coating had only limited de-emulsification ability.

In general, it was considered that, for separations, surface reconstruction on a fabric's side contacting an emulsion is followed by local de-emulsification, and pore filling on an un-reconstructed side by coagulated oil, yielding an oil-impregnated side and an overall Janus fabric structure. To determine if such a Janus structure could be sustained, a water droplet was dispensed on a HD-impregnated P1-b-$A_{18}$- or P1-b-$A_{105}$-coated fabric; FIG. 13c compares photographs of droplets that were taken immediately and 80 min after they had been dispensed on a P1-b-$A_{18}$-coated, HD-impregnated fabric. The droplets were considered to be essentially stable, exhibiting only a minor decrease from their initial contact angle of 88±2° to 82±2°. This was in contrast with the behavior on a P1-b-$A_{105}$-coated fabric, for which a dispensed water droplet was absorbed within 2 s. These results suggested that the Janus structure was better sustained by the P1-b-$A_{18}$-coated fabric, than by the P1-b-$A_{105}$-coated fabric.

For oil separation, two halves of an H-shaped cell were compartmented by a composite material coated fabric filter (FIG. 14a). In one set of experiments, 20 mL of an $f_{HD}$=20% emulsion was then added to the right half-cell. Under vigorous stirring, the emulsion bombarded the fabric filter and de-emulsification and separation began. FIG. 14b shows how collected HD volume in the left half-cell increased with separation time when fabric swatches coated by P1-b-$A_m$ with m=4, 18, 23, and 42 were used. Data was not shown for the P1-b-$A_0$- and P1-b-$A_{105}$-coated fabric because no permeation occurred in the former case and both de-emulsified HD and the emulsion permeated the latter fabric.

Nothing permeated the P1-b-$A_0$-coated fabric because it was superhydrophobic, and stable emulsion droplets that had diameters of 3.7±0.6 µm were rejected by the fabric together with the water surrounding them. Emulsions also permeated the P1-b-$A_{105}$-coated swatches because such a fabric, after impregnation with HD, still reconstructed when it contacted the water-rich emulsion (i.e., PDMAEMA chains were too long and readily broke through the initial PDMS layer to contact water). A P1-b-$A_4$-coated fabric did not fully separate HD from the emulsion because it demonstrated a poor de-emulsification capability (FIG. 13b). In contrast, swatches that were coated by P1-b-$A_{18}$, P1-b-$A_{23}$, and P1-b-$A_{42}$ allowed for a relatively complete separation of HD (4.0 mL theoretically), because these coatings sustained their Janus structure.

Since separation was fastest with the P1-b-$A_{18}$-coated swatch, the P1-b-$A_{18}$-coated swatches were investigated further. To probe robustness of P1-b-$A_{18}$-coated swatches, the same fabric was used in one example to perform 7 consecutive separations. In such an experiment, some 15 min was allowed for each separation to proceed before an aqueous residue and separated HD were removed, and another 20 mL emulsion at $f_{HD}$=20% was added to a right half-cell. FIG. 14c compares data gathered from separations 1, 3, and 7. Even after 7 trials, it was observed that the filter's performance did not degrade. This suggested that the fabric was robust and had the potential to perform many separations, given that the fabric's active separation area was only 1.13 cm$^2$, and it separated at least approximately 28 mL of HD and treated 140 mL of emulsion.

To probe separation limits for HD, one mouth of a three-neck round-bottom flask was covered with a coated swatch. The flask was then tilted so that HD could be separated from 300 mL of a feed $f_{HD}$=1.00% emulsion. FIG. 14d shows the separation data in this case. The separated HD amount reached 2.7 mL by 1.5 h and 2.9 mL by 3 h. The latter value was found to be close to or identical, within experimental error, to the 3.0 mL of HD contained in the feed emulsion. Thus, residual HD in the final 297 mL emulsion was less than 0.1 mL, and the fabric was found to have a HD separation limit of (0.034±0.034)%.

The composite material fabric also separated other oils from their emulsions. FIG. 14e shows separation data for toluene-in-water and chlorobenzene-in-water emulsions containing 20 vol % of oil. A H-shaped cell was used for the former separation, and the volume of fully separated toluene was expected to be 4.0 mL. In the latter case, a burette with its bottom end covered by a coated fabric was used as the separation device. A different device was used here because the high-density, de-emulsified chlorobenzene settled to the bottom, and could not reach the fabric if it was sandwiched by two halves of a H-shaped cell. According to details provided in the Example 19B, the volume of fully separated chlorobenzene was expected to be 2.0 mL. It was observed that complete separation was achieved in both cases. It was further observed that chlorobenzene was separated more rapidly than toluene or HD. Quantitative analysis using the fabric's active surface areas and the first three data points of each graph in FIG. 14d, as well as data for the P1-b-$A_{18}$-coated fabric in FIG. 14a, yielded permeation rates of 0.49×, 0.87×, and 6.7×10$^3$ L·h$^{-1}$·m$^{-2}$ for toluene, HD, and chlorobenzene, respectively. It was considered that chlorobenzene was separated more rapidly because of the vertical apparatus used; hydrostatic pressure exerted on the fabric by the column of the emulsion in the burette accelerated the separation.

It was noted that a composite material fabric filter used to separate oil from oil-in-water emulsions experiences an asymmetric environment: while the emulsion side is water-rich and polar, the side contacting the separated oil is nonpolar. This asymmetric environment pulled different components to the surface of a coating on a fabric, generating in situ a Janus fabric. Such Janus fabrics de-stabilized emulsions on one side and separated coagulated oil from water on the other side.

Example 19B. Further Information on In-Situ-Generated Janus Fabric Composite Materials for Rapid and Efficient Separation of Oil from Oil-in-Water Emulsions Experimental Section Materials.

Cotton fabric and ink were purchased from a local store. The fabric was washed with a 5 wt % detergent aqueous solution thrice before rinsing with distilled water ten times, acetone thrice, and drying under vacuum for 24 h. Tetrahydrofuran (THF, Fisher) was distilled to remove inhibitor. 2-(Dimethylamino)ethyl methacrylate (DMAEMA, 98%), methyl methacrylate (MMA, 99%) and 2-hydroxyethyl methacrylate (HEMA, 98%) purchased from Sigma-Aldrich were distilled under vacuum before use. Hexamethyldisilazane (Acros, 98%), trimethylsilyl chloride (Aldirch, 99%), 2-methoxyethanol (Aldrich, 99.8%), α-bromoisobutyryl bromide (Aldrich, 98%), trimethylamine (Aldrich, 99%), 1,1,4,7,10,10-hexamethyltriethylenetetramine (Aldrich, 97%), magnesium sulfate anhydrous (Fisher), sodium dodecyl sulfate (SDS, Aldrich), chlorobenzene (Aldrich, 99%), toluene (Aldrich, >99.5%), and monocarbinol terminated polydimethylsiloxane (PDMS-OH, Gelest) were used as received.

Methoxyethyl 2-Bromoisobutyrate.

Initiator methoxyethyl 2-bromoisobutyrate for atom transfer radical polymerization (ATRP) was synthesized following a literature method. (J. P. Sun, et al., *J. Polym. Sci.: A: Polym. Chem.* 2011, 49, 1282-1288). To synthesize it, 2-methoxyethanol (5.0 mL, 63 mmol) was dissolved in 5.0 mL anhydrous CHCl$_3$. α-Bromoisobutyryl bromide (7.8 mL, 63 mmol) was then injected dropwise into this solution that was pre-cooled in an ice bath before triethylamine (10.5 mL, 76 mol) was added and the resultant mixture was left stirring overnight. In the following day, the solution was extracted with 45 mL of water and centrifuged to remove a water phase. This protocol was repeated thrice. To the final oil phase was subsequently added 5 g of $MgSO_4$ to sorb water. After several hours, the drying agent was compacted by centrifugation and a supernatant was decanted. Volatile components in the supernatant were removed by rotary evaporation to yield 18.366 g of the final product at a 95% yield.

2-(Trimethylsilyl)oxy]ethyl Methacrylate (HEMA-TMS).

HEMA-TMS was prepared following a literature procedure. (A. Hirao, et al., *Macromolecules* 1986, 19, 1294-1299; A. Guo, et al., *Macromolecules* 1996, 29, 2487-2493). In a typical synthesis, hexamethyldisilazane (30 g, 0.18 mol) was added dropwise over 1 h to 2-hydroxyethyl methacrylate (24 g, 0.18 mol). Temperature was maintained at 10° C. by immersing the solution in an ice bath. A few drops of trimethylsilyl chloride were then added to the mixture. The reaction mixture was stirred at room temperature overnight under a nitrogen atmosphere. Crude product was obtained by distillation. Product was further purified by fractional distillation. Silylated monomer thus obtained was dried over calcium hydride with stirring for 24 h and distilled under vacuum for use.

Preparation of P(HEMA-s-MMA)-Br.

To prepare statistical copolymer P(HEMA-s-MMA) via ATRP, methoxyethyl 2-bromoisobutyrate (0.32 mL, 1.88 mmol), HEMA-TMS (3.3 mL, 15 mmol), and MMA (16.2 mL, 150 mmol) were dissolved in 18.0 mL THF in a 50 mL Schlenk flask. 2,2'-Dipyridyl (0.5856 g, 3.75 mmol) was then added to the mixture. The mixture was bubbled with $N_2$ for 10 min before CuCl (0.1238 g, 1.875 mmol) was added and gaseous contents in the flask were removed by three freeze-pump-thaw-$N_2$ filling cycles. The final $N_2$-filled flask was immersed in a preheated oil bath at 70° C. for 3.5 h before it was cooled to room temperature and opened to atmosphere. Crude mixture was filtered through a neutral alumina column using THF as eluent to remove the copper salts. Subsequently, 1.5 mL of an aqueous 13.3-M HCl solution and 50 mL methanol were slowly added into the collected polymer solution under vigorous stirring to hydrolyze the TMS group. After stirring overnight, the solvent was removed by rotary evaporation. The polymer was then re-dissolved into THF and the resultant solution was added into excess hexane to precipitate the polymer. The precipitated polymer was collected by centrifugation and dried under vacuum in a desiccator for 48 h to give 16.6 g of the targeted polymer in a 87% yield.

Synthesis of PDMS-COCl.

To prepare PDMS bearing a terminal acid chloride group, PDMS-OH ($M_n$=5000, 4.4 mL, 9.14 mmol) was pumped under vacuum at 60° C. for 6 h to remove possible volatile components including water. To the heated PDMS-OH was then added dropwise oxalyl chloride (4.4 mL, 52.0 mmol) into a well-sealed flask under vigorous stirring. The resultant mixture was stirred overnight and unreacted oxalyl chloride was removed next day by pumping under vacuum at 60° C. for 6 h.

Preparation of [P(HEMA-s-MMA)-Br]-g-PDMS.

To graft PDMS-COCl unto P(HEMA-s-MMA)-Br, P(HEMA-s-MMA)-Br (7.60 g, 0.905 mmol) was dissolved in 20.0 mL of fresh distilled anhydrous THF in a Schlenk flask. PDMS-COCl was diluted with 5 mL fresh distilled anhydrous THF in another Schlenk flask before the solution was added, using a syringe, dropwise into the polymer solution under vigorous stirring. The second Schlenk flask was rinsed with 5 mL anhydrous THF and the rinsing solution was again added dropwise into the polymer solution. This was repeated a second time and the final mixture was left stirring overnight.

To purify [P(HEMA-s-MMA)-Br]-g-PDMS, the mixture was rotary evaporated to remove the solvent. The residue was then vortexed with 10 mL of hexane for 5 min before the resultant cloudy dispersion was centrifuged to settle the solid and the clear supernatant was decanted. This rinsing step was repeated thrice before the polymer was dried under vacuum for 48 h to yield 8.84 g of [P(HEMA-s-MMA)-Br]-g-PDMS at a yield of 73%.

Synthesis of P1-b-$A_m$.

Five P1-b-$A_m$ samples were prepared using a recipe shown in Table 3. In such a synthesis, [P(HEMA-s-MMA)-Br]-g-PDMS and DMAEMA were first dissolved in THF in a 50 mL Schlenk flask. 1,1,4,7,10,10-Hexamethyltriethylenetetramine was then added. The mixture was bubbled with $N_2$ for 10 min before CuCl was added and the flask's contents were degassed by three freeze-vacuum-thaw-$N_2$ filling cycles. The final $N_2$-filled flask was immersed in a preheated 65° C. oil bath. The reaction was stopped by removing the flask from the oil bath and introducing air after ~80% DMAEMA was converted, as determined by $^1H$ NMR analysis of aliquots taken of the reaction mixture. The polymerized mixture was diluted with 10-mL THF and precipitated into hexane to remove unreacted monomer. The precipitate was settled by centrifugation and the supernatant was decanted. The polymer was re-dissolved in 10 mL of THF. The protocol for polymer precipitation and hexane removal was repeated. This purification protocol involving polymer re-dissolution, precipitation, and hexane removal was repeated twice. Subsequently, the polymer dissolved in THF was added into water. While the polymer was settled by centrifugation, the aqueous phase containing residual copper salts or ligand was decanted. The precipitated polymer was pumped under vacuum for 48 h before further characterization.

Cotton Coating.

P1-b-$A_{18}$ solutions at 1.0, 2.0, 5.0, 10, 20, 30, and 40 mg/mL, respectively, were prepared in THF. To coat fabric samples, swatches at 1.5×1.5 $cm^2$ were dipped into a P1-b-$A_{18}$ solution for 30 min. The swatches were then withdrawn from solution and heated at 180° C. for 4 h under vacuum. Subsequently, fabrics were rinsed in stirring THF at 60° C. for 5 min. This procedure was repeated thrice each time with fresh THF. The composite material fabric samples were dried before further usage.

P1-b-$A_m$ polymers with other m values were analogously used to coat the cotton fabric. In each case, the polymer was used at 30 mg/mL.

Surfactant-Stabilized Oil-in-Water Emulsion.

Hexadecane-in-water emulsions were prepared by stirring, at 1200 rpm with a mechanical stirrer, water, hexadecane, and sodium dodecyl sulfate (SDS) for 30-60 minutes. The final SDS concentration in the final emulsion was 0.50 mg/mL. Other oil-in-water emulsions were prepared analogously.

Oil/Water Separation.

Three apparatuses were used for oil/water separation. A H-shape cell possessed two half cells and each of them possessed a tubular side arm. After placing a composite material fabric filter sandwiched by a pair of rubber disks with a central circular opening of 1.13 $cm^2$ between the tubular side arms, the arms were held together by a clamp. Before a new piece of fabric was mounted on a device for HD separation, it was soaked in HD. After removal from hexadecane, it was placed on a folded piece of low-lint tissue paper. Excess of hexadecane was removed from the top surface using another piece of tissue paper. After the cell was assembled, an emulsion to be separated was poured into the right half of the cell. Timing of a separation started once a complete drop of oil had emerged from the left side (incubation period typically less than 1 min and this time was deducted). Volumes of oil collected in the left half of the cell were determined from oil height readings.

A composite material fabric filter was pre-wetted with HD to account for the fact that the fabric would retain this HD after a separation experiment. The pre-wetting was done to ensure that correct volumes of separated HD were reported but was not essential for oil/water separation. In practical situations, air-impregnated fabrics could be used directly for oil separations.

Amount of HD in 20.0 mL of a $f_{HD}$=1.00% emulsion was too little for an accurate study of HD separation kinetics using the above H-shape cell. Thus, a 300 mL three-neck round bottom flask with one mouth covered by a fabric was used to separate HD in this case. The flask's neck opening had an area of was 2.83 cm$^2$. Permeated hexadecane was collected in a beaker, which was placed on a balance to determine collected weight of hexadecane as a function of time.

The H-shape cell was ineffective in separating chlorobenzene. A burette with its bottom wrapped by a P1-A$_{18}$-coated fabric was used to separate chlorobenzene emulsions. The fabric's separation area in this case was 1.13 cm$^2$, which coincided with the H-shaped cell's separation area.

Contact Angle Measurement.

Contact angles (CAs) were measured at room temperature (21±1° C.) with a Dataphysics OCA 15Pro system. For measurement on air-impregnated fabric samples (e.g., composite materials as described herein), 5.0 µL water droplets were dispensed and droplet pictures were taken within 10 s after droplets were dispensed.

For under-oil water CA measurement, cotton fabric (e.g., a composite material as described herein) was fixed using double side tape onto the bottom of a cuvette before hexadecane was added, and a 5-µL water droplet was carefully dispensed onto the cotton surface.

For under-water oil CA measurement, cotton fabric (e.g., a composite material as described herein) placed on the surface of water which was in a transparent glass container. Then several 5.0 µL hexadecane droplets were dispensed from water underneath using a U-shape needle. The air plastron between the cotton surface and water was removed after oil absorption. Finally, a 5.0 µL hexadecane droplet was applied on this surface for under-water oil CA measurement.

Characterization.

Size exclusion chromatography (SEC) was performed at 25° C. using a system equipped a Wyatt Optilab rEX refractive index detector. The three columns were packed by MZAnalysentechnik with 5-µm AM 500, 10,000 and 100,000 Å gels. The system was calibrated with monodisperse polystyrene (PS) standards. Chloroform was used as eluent with a flow rate of 1.00 mL/min. Solution samples were filtered by syringe filters (Dikma, PTFE, 0.22 µm) before they were injected into the SEC system. $^1$H NMR characterization was performed using a Bruker Avance-300 and Bruker Avance-500 instrument at 25° C. using chloroform-$d_3$ (CDCl$_3$) as solvent and a 1 s relaxation delay time for small molecules and 3 s relaxation delay time for polymers.

FT-IR spectra were obtained using a Bruker ALPHA FT-IR Spectrometer with ATR sampling module.

Additional Results and Discussion

P1-b-A$_m$ Synthesis.

To prepare P1-b-A$_m$, P(MMA-s-HEMA)-Br was first synthesized by atom transfer radical polymerization (ATRP), where Br denotes a terminal bromide group. In a second step, PDMS was grafted unto P(MMA-s-HEMA)-Br to yield [P(MMA-s-HEMA)-Br]-g-PDMS. This was followed by producing a second block PDMAEMA via ATRP again using [P(MMA-s-HEMA)-Br]-g-PDMS as a macro-initiator. For ATRP of DMEAMA, an optimized set of conditions established by Matyjaszewski and coworkers was used (X. Zhang, J. H. Xia, K. Matyjaszewski, *Macromolecules* 1998, 31, 5167-5169.). Diblock copolymers P(MMA-s-HEMA)-b-PDMAEMA were not first prepared, and then grafted with PDMS because it was considered that this approach may create challenges in ensuring an identical degree of PDMS grafting for all samples. Using the adopted approach, the P1 block was constant with the variable among different P1-b-A$_m$ samples being m.

P(HEMA-s-MMA)-Br Characterization.

FIG. 16 shows a $^1$H NMR spectrum run in CDCl$_3$ for P(HEMA-s-MMA)-Br and assignments for distinct peaks of MMA, HEMA, and the initiator fragment. It was from integrated area ratios of 3.0/17.6/274 among peaks a, d and f that it was found that there were, on average, 9 HEMA units and 91 MMA units in each chain. Therefore, the copolymer could be denoted as P(HEMA$_{0.09}$-s-MMA$_{0.91}$)$_{100}$-Br.

A size-exclusion chromatography (SEC) trace was obtained for P(HEMA$_{0.09}$-s-MMA$_{0.91}$)$_{100}$-Br, using CHCl$_3$ as an eluant. Based on PS standards, this polymer had a number-average molecular weight M$_n$ of 9.2×10$^3$ and a polydispersity M$_w$/M$_n$ of 1.27.

[P(HEMA-s-MMA)-Br]-g-PDMS Characterization.

A $^1$H NMR spectrum was run in CDCl$_3$ for [P(HEMA-s-MMA)-Br]-g-PDMS. Integral ratio between the signal of two protons of the initiator and that of protons of PDMS at 0.8 ppm was 3.0/343. Since each PDMS chain had an average of 62 DMS units, the average number of grafted PDMS chain per P(HEMA-s-MMA)-Br chain was 0.91.

FIG. 17 compares SEC traces of [P(HEMA-s-MMA)-Br]-g-PDMS and P(HEMA-s-MMA)-Br. No negative peak for PDMS precursor PDMS-COOH at 26.5 min was observed, suggesting an absence of un-grafted PDMS in this sample. The [P(HEMA-s-MMA)-Br]-g-PDMS peak was left-shifted relative to the P(HEMA-s-MMA)-Br peak in agreement with a higher molecular weight for the former. A shoulder on the right side did not appear shifted for [P(HEMA-s-MMA)-Br]-g-PDMS because of two reasons: first, some P(HEMA-s-MMA)-Br chains remained; second, a signal representing unlabeled P(HEMA-s-MMA)-Br chains may appear stronger than that of [P(HEMA-s-MMA)-Br]-g-PDMS because the PDMS component in said graft copolymer had a negative refractive index increment relative to the solvent. The negative component canceled a part of the [P(HEMA-s-MMA)-Br]-g-PDMS signal. In terms of polystyrene (PS) standards, the graft copolymer had a polydispersity index of 1.46.

P1-A$_m$ Characterization.

$^1$H NMR spectra for the P1-A$_m$ series were obtained. An initiator peak was sufficiently resolved and so was a HEMA peak. However, a PDMAEMA peak overlapped with a HEMA peak. From an integrated intensity of the HEMA peak, the expected intensity for the HEMA peak that overlapped with the PDMAEMA peak could be calculated. This HEMA component was then deducted from the PDMAEMA peak. From ratioing the corrected PDMAEMA peak intensities with that of the initiator peak, it was determined that the PDMAEMA repeat unit numbers were 4, 18, 23, 42 and 103, respectively.

SEC traces of P1-A$_4$, P1-A$_{18}$, P1-A$_{23}$, P1-A$_{103}$ were obtained. As m increased, the P1-A$_{18}$ peak shifted increasingly towards the left, agreeing with an expected trend. Table 4 lists characterization results for the P1-A$_m$ series.

Cotton Fabric.

A plain-woven cotton fabric was used and this textile had inter-thread pore sizes reaching hundreds of micrometers (i.e. reaching 200 µm).

PDMAEMA Stability Under Crosslinking Conditions.

A crosslinking mechanism of P(HEMA-s-MMA) has been previously published (C. M. Grozea, et al., *Rsc Advances* 2016, 6, 20135-20144; M. S. Choudhary, K. Lederer, *Eur. Polym. J.* 1982, 18, 1021-1027). Two experiments were performed to demonstrate intactness of PDMAEMA.

First, the P(HEMA-s-MMA)-Br sample and a PDMAEMA-Br sample consisting of 23 units were separately heated at 180° C. under vacuum for 4 h. While the P(HEMA-s-MMA)-Br sample became insoluble, the PDMAEMA-Br sample turned yellow but remained soluble. The yellowing was considered to be due to oxidation of some amino groups. However, extent of this or these reactions were expected to be minor as $^1$H NMR analysis did not show a compositional change in this polymer.

Second, the P(MMA-s-HEMA) sample (170 mg) and the PDMAEMA-Br sample (47 mg) were dissolved in 0.5 mL of THF in a flask. After a water bath of a rotary evaporator had been pre-heated to 70° C. and its vacuum had been turned on, the flask was attached to the rotating shaft of the rotary evaporator. This was followed by a quick evaporation of the solvent to maximize mixing between P(HEMA-s-MMA)-Br and PDMAEMA-Br. Good mixing between the two components was attested by clarity of the resultant film on the flask after THF evaporation from this protocol. When THF was rotary evaporated under otherwise identical conditions but at room temperature, a cloudy film was produced, suggesting macrophase separation of the two components. Mixing was maximized to approximate the environment that the PDMAEMA block of P1-b-A$_m$ would be in during P(HEMA-s-MMA) crosslinking. This mixed polymer sample was then heated at 180° C. under vacuum for 4 h. The heated sample was subsequently vortexed with 1.0 mL CDCl$_3$ for several minutes and a resultant yellow extract was analyzed by $^1$H NMR. This analysis indicated only PDMAEMA was present in the extract. Further gravimetric analysis after CDCl$_3$ evaporated indicated that 95% of the original PDMAEMA-Br was in the extract. Thus, the PDMAEMA chains were not crosslinked under the crosslinking conditions even when they were surrounded by P(HEMA-s-MMA).

Effect of Changing P1-b-A$_{18}$ Solution Concentration on Coating Properties.

Weight gains $w_f$-$w_i$ of composite material fabric samples coated in P1-b-A$_{18}$ solutions were measured at different concentrations c, and percentage weight gains $g_w$ % were calculated, which were $(w_f$-$w_i)/w_i \times 100\%$ with $w_i$ being weight of a fabric before coating. Water contact angles were also measured on this series of fabric samples. Both sets of data are plotted in FIG. 18 as a function of c. FIG. 18 shows that the $g_w$ % value did not increase much with c before c=5 mg/mL, before it increased with c and finally leveled off at ~5.2 wt % above c=20 mg/mL. However, contact angle data did not show an incubation period at low c values.

It was previously found that amount of polymer physically deposited on cotton fibers after removal of a fabric from a coating solution and solvent evaporation increased as the coating solution concentration increased. (D. Xiong, G. Liu, E. J. S. Duncan, *Langmuir* 2012, 28, 6911-6918.) Without wishing to be bound by theory, it was considered that this relatively slow initial $g_w$ % increase with c was due to the fact that discrete crosslinked polymer patches were formed on the fiber surfaces at low c values, and the patches were removed during the THF rinsing step. Without wishing to be bound by theory, it was also considered that the $g_w$ % value increased with c above c≈5 mg/mL because an integral crosslinked wrapping polymer layer was formed at c≈5 mg/mL, and increasing c beyond this c increased chain density in the polymer layer; plateauing of the anchored polymer amount above c=20 mg/mL maybe due to saturation of this layer.

Levelling of the WCAs at 151° also suggested saturation of the crosslinked polymer layer above c=20 mg/mL. To ensure a saturated layer around the fabric fibers, subsequent samples were all coated with P1-b-A$_m$ at 30 mg/mL.

De-emulsification by P1-b-A$_m$-Coated Fabrics.

A series of composite material fabric samples at 1.5×1.5 cm$^2$ each were placed into a series of $f_{HD}$=20% emulsions. For the series of emulsion samples, 19 h after addition of one fabric swatch into each vial, no clear HD phase was observed in the vial containing the P1-b-A$_4$-coated fabric. This result suggested a limited de-emulsification capability of said P1-b-A$_4$ coating.

Optical Microscopic Images of Different Emulsions.

An optical microscopic image of an $f_{HD}$=20% emulsion was taken. This image, and others for toluene and chlorobenzene emulsions at the oil volume fraction of 20%, were quantitatively analyzed. For hexadecane, toluene, and chlorobenzene in water, average droplet diameters were (3.7±0.6), (4.9±0.8), and (15.3±1.2) µm, respectively.

Wetting Properties of P1-b-A$_{18}$-Coated Fabrics.

It has been previously claimed that only superhydrophobic/oleophilic fabrics effectively separate oil from water. A superhydrophobic fabric should have water contact angles above 150°. FIG. 13c referenced in Example 19A shows that water had an equilibrium contact angle of 82° on a HD-saturated P1-b-A$_{18}$-coated fabric. This composite material fabric was still able to separate oil from water despite this low WCA.

Without wishing to be bound by theory, this was considered that this was due to different conditions being used for measuring the herein described WCAs and past reported WCAs. Past reported WCAs were measured either on air-impregnated fabrics in air, or oil-impregnated fabrics under oil. The herein described WCAs were measure on a HD-impregnated fabric in air. When the measurement was done in air within 10 s after droplet dispensing on air-impregnated fabrics, the WCA was 150°. The WCA of an HD-impregnated fabrics under HD was also measured at a value of 153°, and this value remained relatively unchanged after 12 h. Thus, the composite material P1-b-A$_{18}$-coated fabric was superhydrophobic under classically used WCA measurement conditions.

It was further observed that water readily shed off P1-b-A$_0$-coated fabrics. The water shedding angles on these fabrics were ~27°.

HD Separation.

HD separation from an $f_{DD}$=20% emulsion was undertaken. The emulsion was cloudy as expected, and exhibited a reddish tint because the HD phase was doped with a hydrophobic red dye—Oil Red O. The system status at t=0 s showed a reddish-tinted cloudy emulsion. However, at t=300 s after the emulsion was added to the right half of the cell, a clear red liquid permeated through the fabric. $^1$H NMR analysis demonstrated that the newly emerged liquid was HD that was free of detectable water.

Results of Control Separation Experiments.

Several control experiments were performed to establish basic properties of the modified fabrics. First, P1-A$_0$-modified fabric samples were used to separate a f$_{HD}$=20% emulsion. No liquid permeated in this case because the HD droplets were small at (3.7±0.6) µm and were too stable to coalesce.

Second, P1-A$_0$-coated and P1-A$_{18}$-coated fabric samples were used to separate a simple HD/water mixture at f$_{HD}$=20%. HD droplets were visually observed to coalesce during pouring of the physical mixture into the right half of a H-shaped cell. Thus, HD could permeate the fabric samples. By the end, HD was fully recovered by both types of fabric samples.

Separation of HD-in-Water Emulsions at Different f$_{HD}$ Values.

A H-shaped cell was used to separate HD-in-water emulsions at f$_{HD}$=10% and f$_{HD}$=30% as well, and the results were compared in FIG. 15 with those obtained at f$_{HD}$=20%.

A first trend was that the final separated HD amount approached 2.0, 4.0, and 6.0 mL, respectively, as f$_{HD}$ increased; this suggested that essentially complete HD separation was achieved in each case.

A second trend was that initial rate of HD separation increased as f$_{HD}$, as expected.

Chlorobenzene Separation.

Apparatus 3 was used to separate chlorobenzene from its emulsion in water at 20% of chlorobenzene. A burette was used to separate 6.0, 8.0 and 10.0 mL of the emulsion, respectively. At these initial volumes, initial emulsion column heights were 61.0, 81.0 and 102.0 mm, respectively, which corresponded to initial hydrostatic pressures of 0.61×, 0.81× and 1.02×10$^3$ Pa on the filter (density of emulsion was 1.02 g/cm$^3$). At full recovery, final collected chlorobenzene volumes were expected to be individually 1.2, 1.6 and 2.0 mL. FIG. 19 shows the separation data in this case.

Fully recovered chlorobenzene volumes, as shown in FIG. 19, approached theoretical amounts. Rate of separation increased as initial emulsion column height or hydrostatic pressure increased. Permeation rate in each case was determined from the slope of the straight line constructed from the first three points of each data set. Permeation rates were 0.126, 0.158 and 0.211 mL/s. Permeation area of the filter was 1.13 cm$^2$. Thus, hourly permeation rates were 4.0×, 5.0× and 6.7×10$^3$ L·h$^{-1}$·m$^{-2}$, respectively.

Example 20. Preparation of Filter Composite Materials Bearing LA-OEG for Coalescing Emulsion Droplets Materials Cotton fabric and ink were purchased from a local store. The fabric was washed with a 5 wt % detergent aqueous solution thrice before rinsing with distilled water ten times, acetone thrice, and drying under vacuum for 24 h. Tetrahydrofuran (THF, Fisher) was distilled to remove inhibitor. Methyl methacrylate (MMA, 99%) and 2-hydroxyethyl methacrylate (HEMA, 98%) purchased from Sigma-Aldrich were distilled under vacuum before use. 2,2'-Azobis(2-methylpropionitrile) (AIBN, 98%, Sigma) was recrystallized before using. Poly(ethylene glycol) monolaurate was purchased from Sigma-Aldrich and used without special treatments. Poly(dimethylsiloxane) (Mw=5000 g/mol) (PDMS-MA, 95%, Gelest) was purchased from Gelest and used as received.

Synthesis of P(HEMA-r-MMA)

HEMA (0.60 mL, 4.9 mmol), MMA (1.1 mL, 10 mmol), and AIBN (80 mg, 0.48 mmol) were dissolved in 8 mL THF and bubbled with N$_2$ for 10 min in a Schlenk flask. After sealing the flask, the resulting solution was then heated at 65° C. for 20 h under stirring at 600 rpm. The formed polymer was purified by adding the polymerized mixture into hexanes to precipitate it.

Synthesis of LA-OEG-COCl

Oxalyl chloride (1.7 mL, 20 mmol) was added dropwise into oligo(ethylene glycol) monolaurate (LA-OEG-OH, 0.77 Ml, M$_n$=400, 1.9 mmol) in a well-sealed flask under vigorous stirring. The resultant mixture was stirred overnight and the unreacted oxalyl chloride was removed the next day by pumping under vacuum at 60° C. for 6 h.

Synthesis of Destabilizing Component P(HEMA-r-MMA)-g-(OEG-LA)

P(HEMA-r-MMA) (1.40 g) was dissolved in 20 mL fresh distilled anhydrous THF in a Schlenk flask. LA-OEG-COCl was diluted with 5-mL freshly-distilled anhydrous THF in a Schlenk flask before it was added, using a syringe, dropwise into the polymer solution under vigorous stirring. The LA-OEG-COCl flask was rinsed with an additional 5 mL anhydrous THF and the rinsing solution was again added dropwise into the polymer solution. This protocol was repeated another time and the final mixture was left stirring overnight. To purify the resultant product, the mixture was rotary evaporated to remove solvent. The resulting residue was then vortexed with 10 mL of hexane for 5 min before the cloudy dispersion was centrifuged to settle the solid and the clear supernatant was decanted. This rinsing step was repeated thrice before the polymer was dried under vacuum for 48 h.

Synthesis of Hydrophobic Component P[HEMA-r-MMA-r-(PDMS-MA)]

PDMS-MA (0.85 mL, 0.16 mmol), MMA (1.20 mL, 11.2 mmol), HEMA (0.6 mL, 4.9 mmol), and AIBN (120 mg, 0.731 mmol) were dissolved in 8.0 mL THF and bubbled with N$_2$ for 10 min. The solution was then heated at 65° C. for 20 h under stirring at 600 rpm. The solvent was dried via rotary evaporation. The product was purified by extraction by hexanes for 3 times.

Preparation of the Janus Fabric Composite Material

P(HEMA-r-MMA)-g-(OEG-LA), an emulsion destabilizing component, and P[HEMA-r-MMA-r-(PDMS-MA)], a hydrophobic component, were dissolved in THF separately to yield 40.0 mg/mL solutions. Cotton fabric swatches were soaked into the P[HEMA-r-MMA-r-(PDMS-MA)] solution for 30 min and then dried in air for 10 min. The dried fabric samples were then heated at 120° C. for 30 min. This was followed by sandwiching the samples between a hot plate heated at 185° C. and a beaker containing water at 85° C. This differential heating was maintained for 3 h and caused the polymer next to the hot plate to crosslink around the fibers. The un-crosslinked polymer next to the beaker was removed by extraction with THF at 60° C. for 3 times. To qualitatively test the hydrophobicity of the resultant coating, a water droplet was disposed on the coating. It was observed that the droplet was not absorbed into the coated substrate, and that it easily rolled off. The half-coated fabric samples were then soaked in the P(HEMA-r-MMA)-g-(OEG-LA) solution for 30 min and then dried in air for 10 min. The fabrics were then heated at 120° C. for 30 min and at 170°

C. for 3 h. The un-grafted polymer was removed by extraction with THF at 60° C. for 3 times.

Oil/Water Separation

Hexadecane emulsions at $f_H$=20% were prepared using either the anonic surfactant SDS, the cationic surfactant CTAB (cetyl trimethylammonium bromide), or the non-ionic surfactant TWEEN-80 as the stabilizer. The bulk concentrations of TWEEN-80, SDS, and CTAB in the final mixtures were 0.40 mg/mL, 0.50 mg/mL and 0.3 mg/mL, respectively. The composite material OEG-LA-modified fabrics were then used to separate hexadecane (HD) from emulsions using a H-shaped cell. Clean oil separation was achieved regardless of the surfactant used to stabilize the emulsion droplets. Qualitatively, it was found that approximately all of the oil was separated from the emulsion via use of the composite material as a filter. Thus, Janus fabric composite materials with grafted OEG-LA as a destabilizing component could separate oil from oil-in-water emulsions stabilized by non-ionic, anionic, and cationic surfactants.

Water-in-oil emulsions were also separated using the composite material. A water-in-hexadecane emulsion ($f_H$=20%; 16 mL hexadecane) was formed using SPAN-80 (0.4 mg/mL) as surfactant. The SPAN-80 was soluble in hexadecane, and thus was suitable for use as a surfactant stabilizing a water-in-oil emulsion. The OEG-LA-modified composite material was then used to separate hexadecane from said emulsion using an H-shaped cell. Clean oil separation was achieved. Approximately 8 mL of hexadecane was collected, a consequence of using a H-shaped cell. Without wishing to be bound by theory, it was considered that an alternative set-up would permit essentially complete separation.

Example 21. Free-Radical Polymerization for Preparing Composite Materials

Materials

Cotton fabric and ink were purchased from a local store. The fabric was washed with a 5 wt % detergent aqueous solution thrice before rinsing with distilled water ten times, acetone thrice, and drying under vacuum for 24 h. Tetrahydrofuran (THF, Fisher) was distilled to remove inhibitor. Methyl methacrylate (MMA, 99%) and 2-(Dimethylamino) ethyl methacrylate (HEMA, 98%) purchased from Sigma-Aldrich were distilled under vacuum before use. 2,2'-Azobis (2-methylpropionitrile) (AIBN, 98%, Sigma) was recrystallized before using. Poly(ethylene glycol) monolaurate was purchased from Sigma-Aldrich and used without special treatments. Poly(dimethylsiloxane) (Mw=5000 g/mol) (PDMS-MA, 95%, Gelest) was purchased from Gelest and used as received.

Synthesis of P[DMAEMA-r-MMA-r-(PDMS-MA)]

PDMS-MA (hydrophobic component; PDMS bearing a terminal methacrylate unit; 2.0 mL, 0.40 mmol), MMA (1.00 mL; 9.4 mmol), and DMAEMA (destabilizing component; 1.6 mL, 9.5 mmol) and AIBN (120 mg; 0.731 mmol) were dissolved in 8.0 mL THF and bubbled with $N_2$ for 10 min. The mixture was then heated at 65° C., for 20 h, with stirring at 600 rpm before the solvent was removed via rotary evaporation. To remove PDMS-MA that might not have been polymerized, the product was extracted with hexane thrice. The synthesized polymer was characterized by $^1$H NMR and GPC using $CDCl_3$ as solvent. According to the integral ratios of the peaks belonging to DMAEMA, MMA and PDMS-MA in the NMR spectrum, the molar ratios of incorporated DMAEMA, MMA and PDMS-MA were 42:57:1. The polymer was thus P[DMAEMA$_{0.42}$-r-MMA$_{0.57}$-r-(PDMS-MA)$_{0.01}$]$_n$. The number average molecular weight (Mn) of the polymer was 4.1×10$^4$ g/mol and the weight average molecular weight (Mw) was 6.6×10$^4$ g/mol, thus yielding a PDI of 1.59.

Cotton Fabric (Permeable Substrate) Coating to Form Composite Material

The above polymer was dissolved in THF to yield a 40.0 mg/mL solution. Cotton fabric samples were soaked in the solution for 30 min and subsequently removed and dried in air. The fabrics were then heated at 120° C. for 30 min to allow polymer to spread on the fibers before they were heated at 170° C. for 3 h to crosslink the MMA and DMAEMA parts of the polymer. The un-crosslinked polymer was removed by extraction in THF at 60° C. for 3 times.

Surfactant Stabilized Oil-Water Emulsion Separation

A hexadecane in water emulsion was formed with a SDS surfactant concentration of 0.5 mg/mL to yield $f_H$=20%. The emulsion was then poured into one side of an H-shape cell that was separated from the other side of an H-shape cell by a coated fabric composite material as described above. Oil selectively permeated the fabric filter. Qualitatively, it was found that approximately all of the oil was separated from the emulsion via use of the composite material as a filter.

Example 22. Further Oil Separation Tests Using Herein Described Composite Materials Materials A composite material comprising a cotton fabric and a coating of poly(DMAEMA$_{0.32}$-MMA$_{0.67}$-PDMS$_{0.01}$) was used for mineral oil separations. The polymer was prepared by radical polymerization, as described in Example 21. Light mineral oil (a colourless liquid, density of 0.838 g/mL at 25° C.; viscosity, kinematic >20.5 mm$^2$/s at 40° C.), sodium dodecyl sulfate (SDS), and trimethyl octadecyl ammonium chloride (OTAC) were purchased from Sigma-Aldrich and used as received. Deionized water was obtained from a water purification system (PURELAB ELGA). An overhead homogenizer, IKA T25 DIGITAL ULTRA-TURRAX, was used for mixing oil with water to form an emulsion system.

Emulsion Preparation

Three emulsions, each comprising either sodium dodecyl sulfate (SDS), or trimethyl octadecyl ammonium chloride (OTAC), were prepared with 20% mineral oil in water (v/v; total volume of mineral oil: 4 mL) and a surfactant loading of 0.5 mg/mL of emulsion. To form each emulsion, the mixture of water, mineral oil, and surfactant was stirred with using a homogenizer for more than 30 minutes, at a stirring speed fixed at 5400 rpm.

Oil Separation Tests

For separation tests, 20 mL of each emulsion was added to a 25 mL two-neck round bottom flask with one mouth covered by the composite material filter. The composite material was pre-soaked with mineral oil for over 20 min prior use, and extra oil was removed by patting the composite material filter between two sheets of paper towel. With stirring at 1000 rpm using a magnetic egg-shaped stir bar (diameter 9.5 mm, length 19 mm), the flask was placed horizontally to begin the separation test.

Oil Separation Test Results

Mineral oil was separated from both the SDS-stabilized emulsion (anionic surfactant) and the OTAC-stabilized emulsion (cationic surfactant). In particular, 1.52 g of oil was separated in 40 min from the SDS-stabilized emulsion; and, 1.28 g of oil was separated in 75 min from the OTAC-stabilized emulsion. These results indicate that herein described composite materials can separate more complex oil mixtures from oil and water mixtures. It further indicates that composite materials that comprise destabilizing components such as PDMAEMA, which becomes positively charged depending on solution pH, can destabilize both anionic and cationic surfactant-stabilized emulsions.

TABLE 1

Characteristics of PDMS-b-PCEA

| Polymer | SEC $M_n$ (g/mol) | $M_w/M_n$ | n | m |
|---|---|---|---|---|
| PDMS$_n$-b-PCEA$_m$ | $7.8 \times 10^3$ | 1.19 | 58 | 16 |

TABLE 2

Fitting parameters generated from treating datashown in FIGS. 3A and 3B using eq. S2.

| Sample | FIG. | $V_\infty$ (mL) | $V'_\infty$ (mL) | $10^3 \times k$ (s$^{-1}$) |
|---|---|---|---|---|
| pH = 5.2 | 3c | 2.06 | 2.28 | 7.2 |
| pH = 10.3 | 3c | 2.03 | 2.24 | 8.3 |
| pH = 11.7 | 3c | 2.01 | 2.14 | 10.4 |
| 1$^{st}$ Run | 3d | 2.02 | 2.18 | 9.3 |
| 2$^{nd}$ Run | 3d | 2.01 | 2.15 | 9.5 |
| 3$^{rd}$ Run | 3d | 2.01 | 2.16 | 8.9 |

TABLE 3

Recipes used to prepare P1-b-A$_m$ and the amounts of polymer produced

| Sample | First Block (g) | DMAEMA/ mL | HMTETA/ μL | CuCl/ mg | product/g | Yield$^a$ |
|---|---|---|---|---|---|---|
| P1-A$_4$ | 1.00 | 0.067 | 26.3 | 12.5 | 0.768 | 72% |
| P1-A$_{18}$ | 1.00 | 0.27 | 26.3 | 12.5 | 1.003 | 80% |
| P1-A$_{23}$ | 1.00 | 0.40 | 26.3 | 12.5 | 1.050 | 76% |
| P1-A$_{42}$ | 1.00 | 0.75 | 26.3 | 12.5 | 1.418 | 83% |
| P1-A$_{103}$ | 0.30 | 0.68 | 7.9 | 2.9 | 0.766 | 82% |

$^a$Defined as mass of final polymer/(total mass of P1-Br and DMAEMA) × 100%.

TABLE 4

Characterization Results for the P1-A$_m$ series.

| Sample | m from $^1$H NMR | SEC $M_n$ | SEC $M_w/M_n$ |
|---|---|---|---|
| P1-A$_0$ | 0 | $1.19 \times 10^4$ | 1.46 |
| P1-A$_4$ | 4 | $1.24 \times 10^4$ | 1.55 |
| P1-A$_{18}$ | 18 | $1.29 \times 10^4$ | 1.62 |
| P1-A$_{23}$ | 23 | $1.69 \times 10^4$ | 1.43 |
| P1-A$_{42}$ | 42 | $1.79 \times 10^4$ | 1.35 |
| P1-A$_{103}$ | 103 | $1.98 \times 10^4$ | 1.46 |

We claim:

1. A composite material, comprising:
a permeable substrate, which has a first surface and an opposing second surface, that has pore sizes in a range of about 3.7 μm to about 200 μm,
a destabilizing coating, which comprises a destabilizing component, that is disposed on the first surface, and
a selectively-permeable coating, which is different than the destabilizing coating and which comprises a hydrophobic or hydrophilic component, that is separate and discrete from the destabilizing coating and that is disposed on the second surface, wherein when a liquid comprising (i) an oil-and-water mixture, (ii) an oil-and-water emulsion, and/or (iii) a surfactant-stabilized oil-and-water emulsion is disposed on the first surface of the composite material, and when the composite material includes a hydrophobic component in its selectively-permeable coating, the composite material is selectively permeable to hydrophobic liquid and substantially impermeable to aqueous liquid, wherein when a liquid comprising (i) an oil-and-water mixture, (ii) an oil-and-water emulsion, and/or (iii) a surfactant-stabilized oil-and-water emulsion is disposed on the first surface of the composite material, and when the composite material includes a hydrophilic component in its selectively-permeable coating, the composite material is selectively permeable to aqueous liquid and substantially impermeable to hydrophobic liquid, and wherein the composite material is selectively permeable under hydrostatic pressure exerted by the liquid.

2. The composite material of claim 1, wherein the coated substrate further comprises a binding component.

3. The composite material of claim 2, wherein any one, or combination of the coating, the permeable substrate, the hydrophobic component, or the destabilizing component comprise a binding component.

4. The composite material of claim 1, wherein the hydrophobic component comprises a hydrophobic oligomer, a hydrophobic polymer, a hydrophobic copolymer; a cross-linked hydrophobic oligomer, a cross-linked hydrophobic polymer, a cross-linked hydrophobic copolymer; a poly(alkylacrylate); poly(isobutylene), poly(alkyl vinyl ether), poly(alkyl vinyl ester), a poly(alkylmethacrylate); a poly(dialkylsiloxane); poly(diarylsiloxane); a fluorinated polymer; a polystyrene; a poly(alkylstyrene); a nylon; a polyester; a copolymer comprising an oligo(dialkylsiloxane), an oligo(diarylsiloxane), a fluorinated oligomer, styrene moieties, alkyl styrene moieties, alkyl methacrylate moieties, alkyl acrylate moieties; an oligomer of any one of the foregoing or of any combination thereof; each of which optionally forms part of a copolymer; each of which is optionally substituted, grafted, or crosslinked; PDMS, PDMS-MA; crosslinked polymers comprising PDMS or PDMS-MA; or, a combination thereof.

5. The composite material of claim 1, wherein the destabilizing component comprises an emulsion-destabilizing oligomer, an emulsion-destabilizing polymer, an emulsion-destabilizing copolymer; a cross-linked emulsion-destabilizing oligomer, a cross-linked emulsion-destabilizing polymer, or a cross-linked emulsion-destabilizing copolymer; a grafted anionic surfactant, a grafted cationic surfactant, a grafted non-ionic surfactant, a grafted amphoteric surfactant, a grafted biosurfactant, or a surfactant-like moiety thereof; a polyglycol; polyamine; a polyimine; a polypyridine; a polyallylurea; a polyacid; a polyelectrolyte; a copolymer comprising amino, imino, tertiary amine, carboxyl, sulfonic acid, phosphonic acid, or charged moieties, or any combination thereof; an oligomer of any one of the foregoing of or any combination thereof; each of which optionally forms part of a copolymer; each of which is optionally substituted, grafted, or crosslinked; PDMAEMA; PDMAPMAm; oligo(ethylene glycol) monolaurate; or, a combination thereof.

6. The composite material of claim 1, wherein the permeable substrate comprises a fluorinated polymer having charged side groups.

7. The composite material of claim 1, wherein the permeable substrate comprises paper, fused carbon black, fused silica, glass wool, ceramic, fabric, metal mesh, polymer meshes, sintered glass, porous polymer membrane, stainless steel mesh, sintered glass filter, sintered glass filters made of fused glass beads, or a combination thereof.

8. The composite material of claim 1, wherein the hydrophobic liquid is an oil, or combination of oils.

9. The composite material of claim 1, wherein the aqueous liquid is water, or an aqueous solution.

10. A method for making a composite material of claim 1, comprising:
   adding a permeable substrate, which has pore sizes in a range of about 3.7 μm to about 200 μm, to a solution comprising a first coating component;
   the first coating component being adapted to be disposed on the permeable substrate;
   removing the permeable substrate from the solution;
   crosslinking the first coating component on a surface of the coated substrate;
   removing uncrosslinked first coating component from the permeable substrate; and
   grafting a second coating component to a second surface, which is opposing the first surface, of the coated substrate.

11. The composite material of claim 1, wherein the destabilizing component comprises a surfactant.

12. The composite material of claim 11, wherein the surfactant is an anionic surfactant, a cationic surfactant, an amphoteric surfactant, a biosurfactant, or a combination thereof.

\* \* \* \* \*